(12) United States Patent
Ha

(10) Patent No.: US 10,663,172 B2
(45) Date of Patent: May 26, 2020

(54) KNOB ASSEMBLY FOR COOK TOP

(71) Applicant: LG ELECTRONICS INC., Seoul (KR)

(72) Inventor: Yeonsik Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 15/900,251

(22) Filed: Feb. 20, 2018

(65) Prior Publication Data

US 2018/0238551 A1 Aug. 23, 2018

(30) Foreign Application Priority Data

Feb. 17, 2017 (KR) .................. 10-2017-0021878
Jul. 26, 2017 (KR) .................. 10-2017-0094807
Dec. 6, 2017 (KR) .................. 10-2017-0167072

(51) Int. Cl.
*F24C 3/12* (2006.01)
*F24C 3/10* (2006.01)
(Continued)

(52) U.S. Cl.
CPC .............. *F24C 3/124* (2013.01); *F24C 3/103* (2013.01); *G01B 7/003* (2013.01); *G01D 5/145* (2013.01);
(Continued)

(58) Field of Classification Search
CPC .......... F24C 3/124; F24C 3/103; G01B 7/003; G01D 5/145; G05G 1/08; G05G 1/10; G06F 3/0362

See application file for complete search history.

(56) References Cited

U.S. PATENT DOCUMENTS 2,341,647 A * 2/1944 Parkhurst ................ F24C 3/124
236/94
2,810,525 A 10/1957 Clarence
(Continued)

FOREIGN PATENT DOCUMENTS

CN 2619240 6/2004
CN 1724981 1/2006
(Continued)

OTHER PUBLICATIONS

European Extended Search Report in European Application No. 18157447.6, dated Jul. 18 2018, 5 pages.
(Continued)

*Primary Examiner* — Thomas C Diaz
(74) *Attorney, Agent, or Firm* — Fish & Richardson P.C.

(57) ABSTRACT

A knob assembly includes a front panel, a knob located at a front side of the front panel and configured to rotate based on operation by a user, a knob shaft that is coupled to the knob and that extends through the front panel, a supporting pipe that receives the knob shaft and that supports the knob shaft, the supporting pipe being configured to maintain a position relative to the front panel, a valve configured to control supply of gas to the appliance, a valve shaft connected to the valve and configured to control the valve to adjust a flow rate of gas based on rotation of the valve shaft, and a joint that couples the knob shaft to the valve shaft and that is configured to transfer at least one of a rotational motion or a linear motion of the knob shaft to the valve shaft.

20 Claims, 57 Drawing Sheets

(51) Int. Cl.

| | | |
|---|---|---|
| *G05G 1/10* | (2006.01) | |
| *G01D 5/14* | (2006.01) | |
| *G01B 7/00* | (2006.01) | |
| *G06F 3/0362* | (2013.01) | |
| *G05G 1/08* | (2006.01) | |
| *G05G 5/05* | (2006.01) | |
| *H01H 3/02* | (2006.01) | |

(52) U.S. Cl.
CPC ............... *G05G 1/08* (2013.01); *G05G 1/10* (2013.01); *G06F 3/0362* (2013.01); *G05G 5/05* (2013.01); *H01H 3/0206* (2013.01)

(56) References Cited

U.S. PATENT DOCUMENTS

| | | | |
|---|---|---|---|
| 3,999,442 A | 12/1976 | Decker et al. | |
| 4,037,490 A | 7/1977 | Wilson | |
| 4,140,048 A | 2/1979 | Grove et al. | |
| 4,300,525 A | 11/1981 | Delgado et al. | |
| 8,683,992 B2* | 4/2014 | Rauth ................... | H03K 17/96 126/39 BA |
| 9,646,783 B1* | 5/2017 | Stoufer ................. | H01H 19/02 |
| 2004/0070574 A1 | 4/2004 | Wylie et al. | |
| 2014/0260775 A1 | 9/2014 | Freeman et al. | |
| 2015/0153048 A1 | 6/2015 | Moro et al. | |
| 2016/0333990 A1 | 11/2016 | Edinger et al. | |

FOREIGN PATENT DOCUMENTS

| | | |
|---|---|---|
| CN | 203671669 | 6/2014 |
| CN | 106705138 | 5/2017 |
| DE | 102005045300 | 9/2006 |
| DE | 102007035564 | 1/2009 |
| KR | 200193805 | 8/2000 |
| KR | 100646087 | 11/2006 |
| KR | 1020060118648 | 11/2006 |
| KR | 101140121 | 6/2007 |
| KR | 101018332 | 3/2011 |
| WO | WO2015008092 | 1/2015 |

OTHER PUBLICATIONS

United States Office Action in U.S. Appl. No. 15/900,389, dated Aug. 21, 2019, 13 pages.
Extended European Search Report in European Application No. 19187011.2, dated Nov. 14, 2019, 8 pages.

* cited by examiner

KNOB ASSEMBLY FOR COOK TOP

CROSS-REFERENCE TO RELATED APPLICATIONS

This application claims priority to and the benefit of Korean Patent Application No. 10-2017-0021878, filed on Feb. 17, 2017, Korean Patent Application No. 10-2017-0094807, filed on Jul. 26, 2017, and Korean Patent Application No. 10-2017-0167072, filed on Dec. 6, 2017, the disclosures of which are incorporated herein by reference in its entirety.

FIELD

The present disclosure relates to a knob assembly for adjusting a timer and a firepower level of a cooking appliance, and a cooking appliance including the same.

BACKGROUND

A cooking appliance can be classified variously, for example, according to the kind of fuel, a heat source, a form, etc., and may be one of home appliances for cooking food.

For example, the cooking appliance may be classified into an open type and a closed type depending on the form of a space where food is placed.

A closed type cooking appliance is a cooking appliance that closes the space where food is placed and cooks food by heating a closed space. For example, an oven, a microwave oven, etc. may belong to the closed type cooking appliance.

An open type cooking appliance is a cooking appliance that cooks food by heating a food item or a food container in an open space. For example, a cooktop, a hob, etc. may belong to the open the cooking appliance.

In some examples, the closed type cooking appliance and the open type cooking appliance may be installed in a single product, and a composite cooking appliance is proposed in which a plurality of heat sources are combined to cook various types of food or a plurality of items of food.

For example, in the composite cooking appliance, the open type cooking appliance may be arranged on the upper side of the closed type cooking appliance. The open cooking appliance may include a plurality of heaters or burners to enable cooking of a plurality items of food at the same time.

One example of the open type cooking appliance is a gas range that uses gas as a fuel. A gas range is a device that cooks food using a flame generated by burning gas.

There are various ways for a user to control an intensity of the flame of the cooking appliance. For example, a method of controlling firepower by adjusting the amount of rotation of a knob by using the knob rotating around a predetermined adjustment shaft are mostly used.

In some examples, the cooking appliance using gas may include a structure in which the amount of opening and closing of the valve of supplying gas is controlled according to the amount of rotation of the knob. In some cases, for safety, a gas valve may rotate with the knob only when the knob is pressed and rotated.

In some examples, the closed type cooking appliance may be used for a long time cooking, and may include a timer for setting a cooking time. In other examples, the open type cooking appliance may include a timer having a cooking time alarm function in order to improve a user convenience.

SUMMARY

The present disclosure may provide a fire power controlling knob assembly capable of setting a timer by using a knob ring arranged around a knob for controlling the fire power and displaying information, and a cooking appliance including the same.

The present disclosure may mitigate a misalignment of the knob due to an accumulation of an assembly tolerance. A misalignment may cause a degrade of an appearance quality due to a position error of the knob, or operation failure, for example, for fitting the knob.

The present disclosure may provide a support structure in which the knob connected to a valve assembly can be stably supported, thereby improving a reliability of a knob operation.

The present disclosure may provide a structure that can stably couple a display device to a knob ring in which the display device can be properly insulated.

The present disclosure may provide a structure that restricts rotation of the knob in a state where the knob is not pushed, in a knock operation structure in a push and turn manner.

The present disclosure may enable a fine adjustment of a flow rate of the valve assembly according to an installation environment, and to facilitate the fine adjustment of the flow rate without separating the cooking appliance.

The present disclosure may provide a knob assembly in which a joint is arranged between a knob and a valve assembly so that assembly tolerance, etc. generated in the valve assembly may not be transferred to the knob.

The present disclosure may provide a knob assembly for allowing the joint to absorb a position error of a valve shaft so that the knob can be assembled at a predetermined position with regard to a front panel at a predetermined amount of protrusion.

The present disclosure may provide a knob assembly that is rotatable about a knob ring arranged in the periphery of the knob, wherein the knob ring can stably rotate and always return to a predetermined position by an elastic force.

The present disclosure may provide a knob assembly that allows the knob ring to be fixed constant in its initial position.

The present disclosure may provide a knob assembly having a sensor capable of sensing the amount of rotation of a valve shaft and capable of display the size of the fire power on the display device provided on the knob ring by using the sensed amount of rotation of the valve shaft.

The present disclosure may provide a knob assembly that uses a Hall sensor and a magnet as a sensor for sensing the amount of rotation of the valve shaft, and can maintain a constant spacing between the Hall sensor and the magnet even when an operation of the knob is repeated.

The knob assembly according to the present disclosure can be fixed in a state in which the knob handle is aligned in the front panel, thereby improving the appearance quality of the cooking appliance.

In addition, the knob assembly according to the present disclosure absorbs the position error of the valve shaft of the valve assembly in the joint, and a knob shaft coupled to the knob handle can be stably supported on the knob ring, which may mitigate a fitting problem generated during operation of the knob handle.

The knob assembly according to the present disclosure may include a knob ring which can be independently operated at a circumference of the knob handle so that the timer time of the cooker such as the corresponding burner or the oven can be set through the operation of the knob ring.

In some implementations, the display device is provided in the knob ring, and the fire power or the timer time, etc. of the corresponding cooker can be displayed on the display device, thereby resulting in an effect of improving convenience for a user. For example, the display device may have the structure which is coupled to a knob ring body in a state surrounded by a side to the display housing, which is an insulating material, resulting in an effect of securing insulation performance of the display device even when the knob ring body is formed of a metal material.

In some implementations, the knob assembly according to the present disclosure can be stably operated in a state which the position of the knob ring is fixed with regard to the front panel, and by providing a structure in which the knob shaft of the knob is supported to the knob ring, resulting in an effect which can be aligned at a predetermined position with regard to the front panel of the knob handle and the knob ring.

According to the present disclosure, it may be possible to stably provide a measurement result of the knob rotation amount with high accuracy without a noise, and to provide an effect of stably perform an operation control for outputting a rotation state of the knob handle, or the control with regard to the operation performed through the rotation of the knob handle.

In some implementations, the present disclosure not only contributes to a significant reduction in the risk of generating fire due to gas leakage but also secures information on the failure of components for securing the rotation of the knob handle quickly and accurately. It may be possible to provide a highly reliable sensing result since an error due to a noise or an error of an electronic component may be prevented.

In some implementations, by providing an independent operation switch having a function and a shape different from those of an existing knob ring by using a knob ring installed for finishing the knob handle, so that the user can easily select an operation switch suitable for the use, thereby providing improved use convenience, and, by reducing the number of the operation switch arranged on the front surface of the cooking appliance, thereby improving a sense of beauty of the front surface of the device.

In some implementations, the present disclosure may provide a function in which a physical power transmission operation through a knob handle operation and a sensing operation for sensing an operation of the knob handle are simultaneously performed, while suppressing an increase of parts, an assembly process, and a manufacturing cost required for implementing this function. The manufacturing operation may be performed more easily. The present disclosure may effectively improve sensing performance of the operation of the operation switch such as the knob handle and the knob ring.

In some implementations, when two shafts are connected to both ends of the joint, respectively, a connection angle between the first shaft supporting portion and the second shaft connecting portion may be set to a state suitable for connecting the two shafts, and this state can be maintained or changed in accordance with the situation by the elastic force of the elastic member.

Therefore, the present disclosure may provide an effect of capable of effectively absorbing the position error between two shafts without a separate operation for controlling the connecting angle of the first shaft supporting portion and the second shaft supporting portion, and separate operation for fixing an adjusted connecting angle of the first shaft supporting portion and the second shaft supporting portion, and accordingly, effectively connecting two parts which are difficult to be connected to the same axis.

In some implementations, an installation process is possible without the additional operation for adjusting the connection angle, by making the joint be assembled with only a small number of parts, the part management and an assembly operation can be easily made and the cost and time required for the manufacturing of the joint can be reduced.

In some implementations, the present disclosure can prevent a return position deviation of the knob ring provided by the independent operation switch from being generated, thereby effectively preventing an appearance defect of the cooking appliance due to the return defect of the knob ring from being generated.

In some implementations, since a rotation operation of knob ring is possible by applying force beyond a predetermined degree, an operating mistake of the knob ring may be prevented, and the operation feeling for easily recognizing the start of rotation of the knob ring can be provided to the user.

In some implementations, the present disclosure also provides a valve pushing force compensating structure which absorbs an influence due to performance deviation of the valve pressing force so that the valve can be opened only by a pushing force of beyond predetermined level, and thus, it may be possible to reduce a risk generating safety accidents such as fire due to a potential opening of the valve that is not made by an intended operation of the user.

According to one aspect of the subject matter described in this application, a knob assembly includes a front panel that defines an appearance of an appliance, a knob located at a front side of the front panel and configured to rotate based on operation by a user, a knob shaft that is coupled to the knob and that extends through the front panel, a supporting pipe that receives the knob shaft and that supports the knob shaft, the supporting pipe being configured to maintain a position relative to the front panel, a valve located in the appliance and configured to control supply of gas to the appliance, a valve shaft connected to the valve and configured to control the valve to adjust a flow rate of gas based on rotation of the valve shaft, and a joint that couples the knob shaft to the valve shaft and that is configured to transfer at least one of a rotational motion or a linear motion of the knob shaft to the valve shaft.

Implementations according to this aspect may include one or more of the following features. For example, the supporting pipe may include an outer supporting pipe that extends forward of the front panel along a line, and an inner supporting pipe that extends rearward of the front panel along the line. The knob shaft is configured to pass through the outer supporting pipe and the inner supporting pipe. The knob assembly may further include a knob ring located between the front panel and the knob and configured to receive the knob shaft in which the supporting pipe extends from the knob ring. The knob ring may be configured to rotate independently of rotation of the knob based on operation by a user, and the knob ring may include a handle that protrudes forward of the knob and that is configured to receive input from the user.

In some implementations, the joint may include a first shaft coupling portion configured to couple to the valve shaft, a second shaft coupling portion configured to couple to the knob shaft, a joint spring that is located between the first shaft coupling portion and the second shaft coupling portion, and that allows the knob shaft to couple to the valve shaft regardless of deviation of at least one of the knob shaft or the valve shaft from a coaxial direction, and a joint housing that accommodates the first shaft coupling portion, the second shaft coupling portion, and the joint spring, and that is configured to transfer a rotational motion of the first shaft coupling portion to the second shaft coupling portion.

In some examples, the valve may include a valve body that defines a gas flow path, a main adjustment part that is located inside of the valve body, and that is configured to, based on the main adjustment part being rotated by the valve shaft, control a flow rate of gas in the gas flow path, an auxiliary adjustment part that is located at a side of the main adjustment part in of the valve body, and that is configured to, based on the auxiliary adjustment part being rotated by a separate tool, control the flow rate of gas in the gas flow path, and a valve cap that is coupled to a front side of the valve body and that covers the front side of the valve body. The front panel may define a service hole that is located at a position corresponding to a projection of the auxiliary adjustment part to the front panel, and that allows access to the auxiliary adjustment part in a state in which the knob is separated from the front panel.

In some implementations, the knob assembly may further include a knob sensor configured to sense rotation of the valve shaft, and the valve cap includes a sensor fixing portion coupled to the knob sensor. The knob sensor may include a sensor plate configured to couple to the sensor fixing portion, a knob sensor housing configured to maintain a posture relative to the sensor plate, a sensor board configured to couple to the knob sensor housing, a plurality of Hall sensors that are radially arranged on the sensor board and that defines a sensing range, a rotating plate configured to couple to the valve shaft and rotate based on rotation of the valve shaft, and a knob sensor magnet located at the rotating plate and configured to pass the sensing range of the plurality of Hall sensors based on rotation of the valve shaft. The valve shaft may be configured to penetrate the sensor plate, the knob sensor housing, and the sensor board.

In some implementations, the knob assembly may further include a sensor spring that is located between the sensor plate and the knob sensor housing, and that is configured to provide elastic force to the knob sensor housing toward the rotating plate. In some examples, the knob assembly may further include a fixed pipe configured to couple to a rear side of the front panel and to support the knob shaft between the supporting pipe and the joint. The knob assembly may further include a support frame that is configured to receive the supporting pipe, that is configured to couple to the rear side of the front panel, and that defines a support frame through hole; and a fixed frame that is configured to couple to the support frame and that extends across the support frame through hole in which the fixed pipe is configured to couple to the fixed frame. In some examples, the fixed pipe may include a second tube part configured to rotatably couple to a front end of the joint.

In some implementations, the knob assembly may further include a locking bracket including a locking piece that is configured to couple to the front side of the front panel, that protrudes to an inside of the knob, and that defines a passage groove at a rear side of the locking piece. The knob may include a guide surface that has a ring shape and that is configured to interfere with the locking piece in which the guide surface defines a cutting section configured to receive the locking piece in an initial position. The guide surface is further configured to (i) based on the knob being in the initial position, interfere with the locking piece to restrict rotation of the knob, and (ii) based on the knob being pushed from the initial position, define a plane coplanar with the passage groove to allow rotation of the knob.

In some examples, the knob may include a knob body that defines an appearance of the knob, and a knob back plate that is coupled to an inside of the knob body, and the guide surface is located at the knob back plate.

According to another aspect, an appliance including a burner may include a valve configured to control a flow rate of gas that flows to the burner, and a knob assembly configured to operate the valve. The knob assembly may include a front panel that defines a surface of the appliance, a knob located at a front side of the front panel and configured to rotate based on operation by a user, a knob shaft that is coupled to the knob and that extends from the knob through the front panel, a supporting pipe that receives the knob shaft and that supports the knob shaft, the supporting pipe being configured to maintain a position relative to the front panel, a valve shaft connected to the valve and configured to control flow of gas in the valve, and a joint that is configured to couple the knob shaft to the valve shaft and to transfer at least one of a rotational motion or a linear motion of the knob shaft to the valve shaft.

Implementations according to this aspect may include one or more of the following features. For example, the joint may include a first shaft coupling portion configured to couple to the valve shaft, and a second shaft coupling portion configured to couple to the knob shaft, and the joint is configured to, regardless of deviation of at least one of the knob shaft or the valve shaft from a coaxial direction, transfer at least one of a rotational motion or a linear motion of the second shaft coupling portion to the first shaft coupling portion. The knob assembly may further include a knob ring located between the front panel and the knob and configured to receive the knob shaft, and the supporting pipe may include an outer supporting pipe that extends forward from the knob ring, and an inner supporting pipe that extends rearward from the knob ring.

In some implementations, the knob ring may be configured to rotate independently of rotation of the knob based on operation by a user, and the knob ring may include a handle that protrudes forward of the knob and that is configured to receive input from the user. The joint further may include a joint spring that is located between the first shaft coupling portion and the second shaft coupling portion, and that allows the knob shaft to couple to the valve shaft regardless of deviation of at least one of the knob shaft or the valve shaft from the coaxial direction, and a joint housing that accommodates the first shaft coupling portion, the second shaft coupling portion, and the joint spring, and that is configured to transfer the rotational motion of the first shaft coupling portion to the second shaft coupling portion.

In some examples, the valve may include a valve body that defines a gas flow path, a main adjustment part that is located inside of the valve body and that is configured to, based on the valve shaft rotating the main adjustment part, control a flow rate of gas in the gas flow path, an auxiliary adjustment part that is located inside of the valve body at a side of the main adjustment part, and that is configured to, based on the auxiliary adjustment part being rotated by a separate tool, control the flow rate of gas in the gas flow path, and a valve cap that is coupled to a front side of the valve body and that covers the front side of the valve body. The front panel may define a service hole that is located at a position corresponding to a projection of the auxiliary adjustment part to the front panel, and that allows access to the auxiliary adjustment part in a state in which the knob is separated from the front panel.

DETAILED DESCRIPTION

Figure 1:
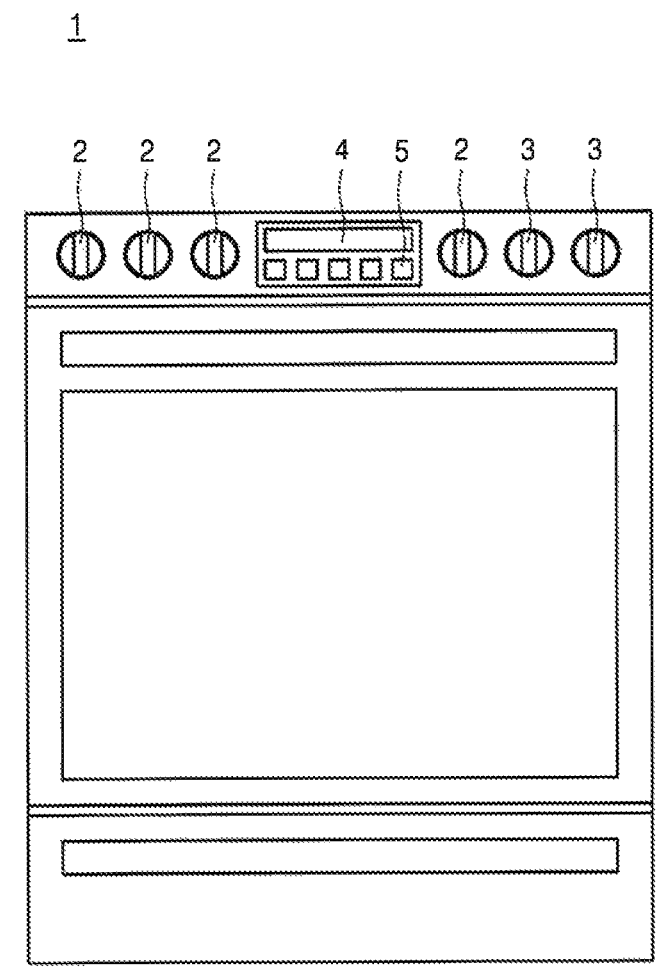
FIG. 1 is a view showing an example of a composite cooking appliance having a timer function.

Hereinafter, the implementations of a fire power controlling knob assembly and a cooking appliance including the same according to the present disclosure will be described in detail with reference to the accompanying drawings. For convenience of explanation, the thicknesses of the lines and the size of the component shown in the drawings may be shown with exaggerated for clarity and convenience of explanation. In addition, the terms described below are the terms defined in consideration of a function of the present disclosure, which may vary depending on an intention or custom of the user and the operator. Therefore, the definition of these terms should be based on the contents throughout this specification.

FIG. 1 is a view showing an example of a composite cooking appliance having a general timer function.

The illustrated cooking appliance is a composite cooking appliance 1 including an oven and a cooktop.

The composite cooking appliance 1 may include a fire power controlling knob 2 for controlling the fire power of the cooking appliance on the front upper portion, a timer knob 3 for setting the timer time, a display device 4 for displaying various states of the cooking appliance, and a switch 5 for separate operation.

In the case of the cooking appliance such as an oven or a grill, since there are many cases that a long time operation is required, a timer is almost necessarily installed.

A fire power controlling knob 2 and the timer knob 3 perform different functions from each other, but have the advantage of being able to display a firepower or time through the amount of rotation. For unity of design and convenience of operation, it is general that knobs having the same outer shape are provided as a form arranged side by side.

In addition, the display device 4 serves to display an operation state of the cooking appliance, etc. Information displayed on the display device 4 may be an output (or temperature) of a burner, a timer time, a cooking of the automatic cooking function, etc.

However, when the number of burner provided with the timer function is increased, the number of the timer knob 3 has to be also increased, so that the problem that the front surface shape of the cooking appliance 1 becomes complicated is generated. In addition, a concern of confusing as to which timer knob 3 that performs cooking at the same time in various burners will indicate the cooking time of which burner.

Figure 2:
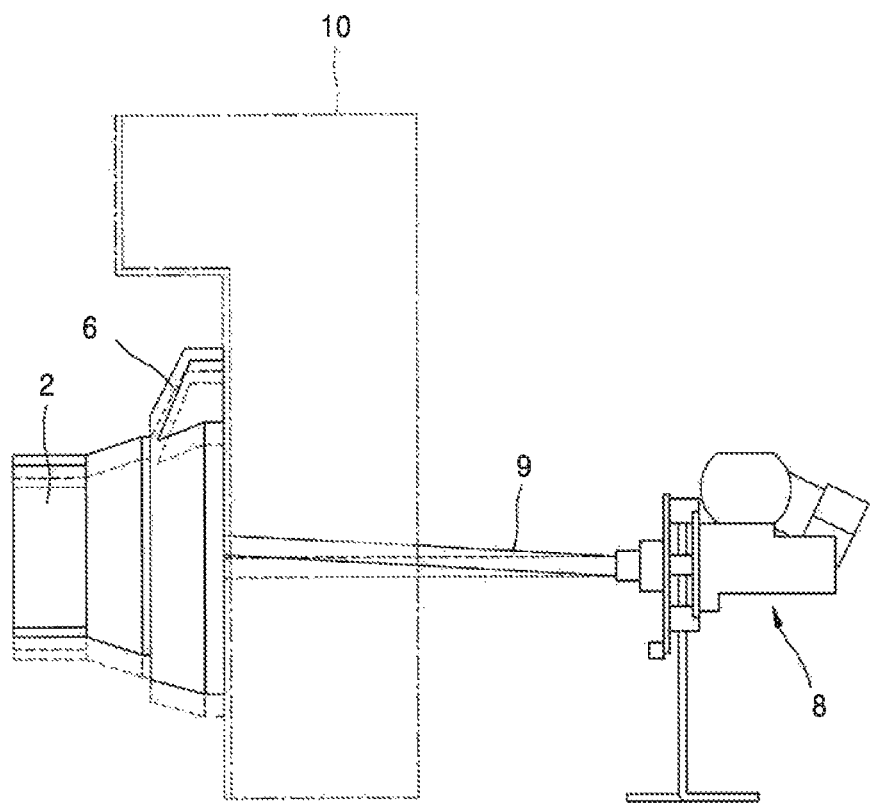
FIG. 2 is a view showing an example of a position error of an example knob.

FIG. 2 is a view for explaining a generation of position error of the fire power controlling knob.

As shown, the burner provided in the cooking appliance has a valve assembly 8 for controlling a gas supply amount, and the valve assembly 8 is operated by a knob 2 exposed to the front surface of a front panel 10 and adjusts the gas supply amount provided to the burner.

The connection between the valve assembly 8 and the knob 2 is made by a valve shaft 9 installed to connect between the valve assembly 8 and the knob 2. When the knob 2 is turned in a state the connection between the valve assembly 8 and the knob 2 is made, this rotational force is transmitted to the valve assembly 8 through the valve shaft 9, thereby operating the valve assembly 8.

The opening and closing amount of the valve is controlled by the operation of the valve assembly 8 made as described above.

The knob 2 and a knob ring 6 that annularly surrounds the periphery of the knob 2 are exposed to the appearance of the front panel 10.

The knob 2 is rotatably installed in the left and right direction and the valve shaft 9 is rotatably coupled in connection with the rotation of the knob 2. The valve shaft 9 having one side in the axial direction coupled to the knob 2 is rotated in connection with the rotation of the knob 2 and the rotational force transmitted through the valve shaft 9 is a power for the operation of the valve assembly 8.

In some examples, the valve assembly 8 is manufactured by a welding method on a casting. Thus, in the manufacture of the valve assembly 8, the valve shaft 9 has a positional tolerance. This tolerance of the valve shaft 9 results in a positional deviation of the knob 2 which is eventually assembled to the valve shaft 9. Further, the positional deviation of the knob 2 becomes larger as the length of the valve shaft 9 becomes longer.

That is, the tolerance of the valve shaft 9 is directly connected by the assembly tolerance of the knob 2 and the knob ring 6 assembled to the valve shaft 9.

In the figure, the correct assembled positions the knob 2 and the knob ring 6 are the positions indicated by dotted lines. However, when the tolerance of the valve shaft 9 is generated as indicated by a solid line, the assembled position of the knob 2 and the knob ring 6 is changed as indicated by the solid line.

A single cooking appliance may include a plurality of burners. In some cases, the knob 2 and the knob ring 6 connected to the respective valves needs to be arranged with a predetermined alignment. In some cases, due to a tolerance in each of the valve shaft 9, the alignment the knob 2 and the knob ring 6 may be externally misaligned, thereby degrading the appearance quality.

In some examples, the tolerance of the valve shaft 9 not only causes a simple appearance defect, but also causes an operation defect. The rotation operation of the knob 2 is not smoothly made due to the misalignment of the valve shaft 9 and it causes the defect which is not returned since the knob 2 is fitted.

The present disclosure is provided so as to improve the appearance quality of the cooking appliance and reduce the operation defect of the knob 2 by assembling the knob 2 and the knob ring 6 at a correct position, in order to resolve the above-mentioned problem.

Figure 3:
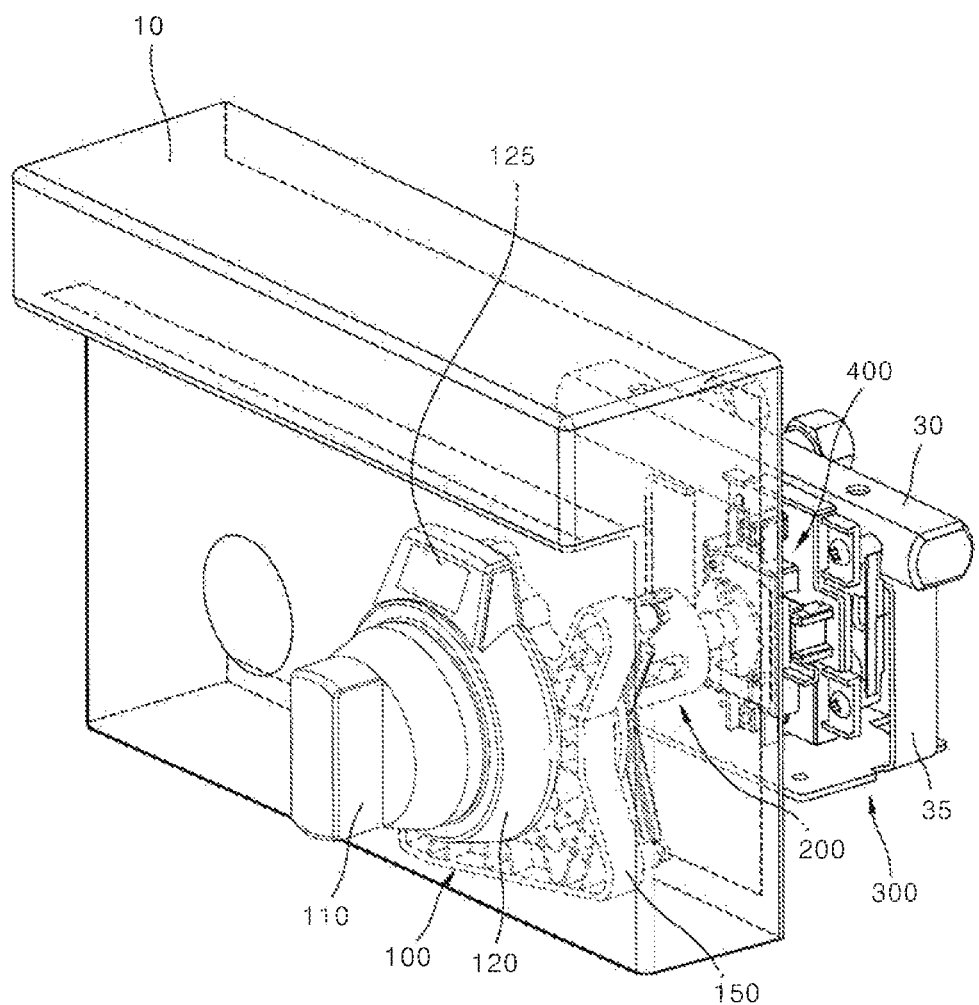
FIG. 3 is a perspective view illustrating an example fire power controlling knob assembly disposed in an example case.
Figure 4:
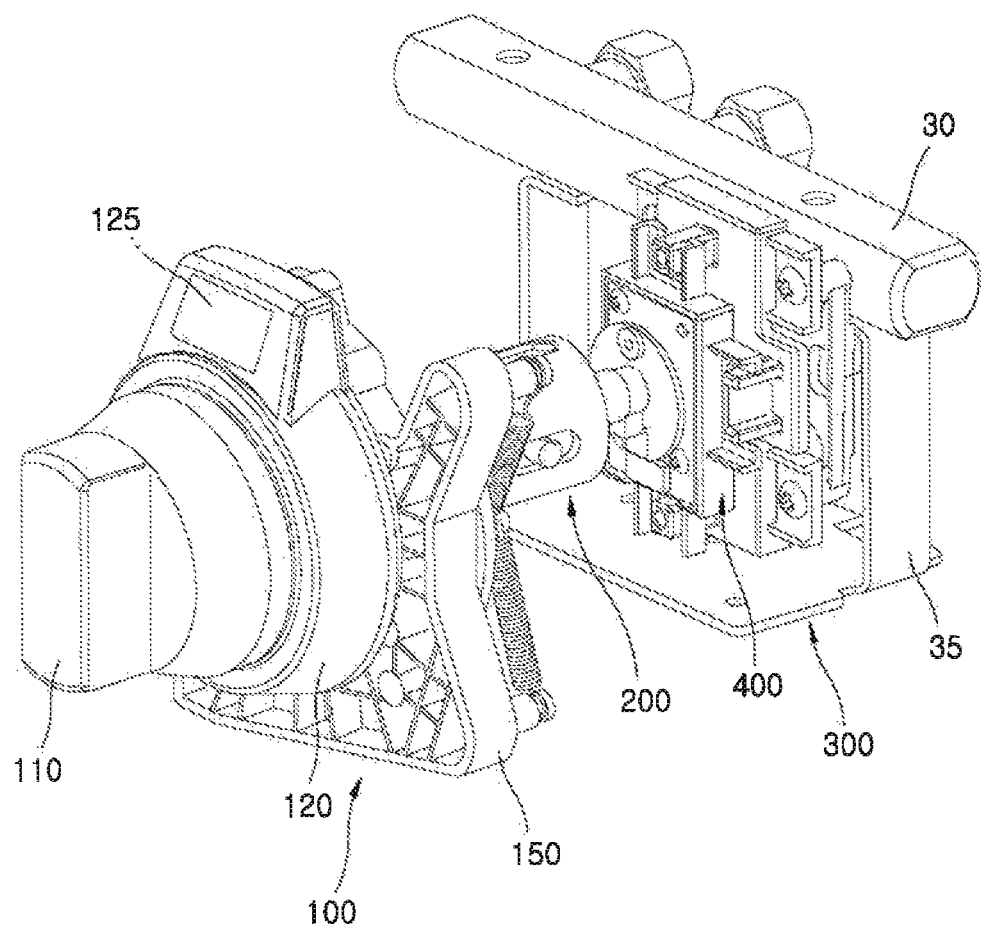
FIG. 4 is a perspective view showing the knob assembly without a front panel in FIG. 3
Figure 5:
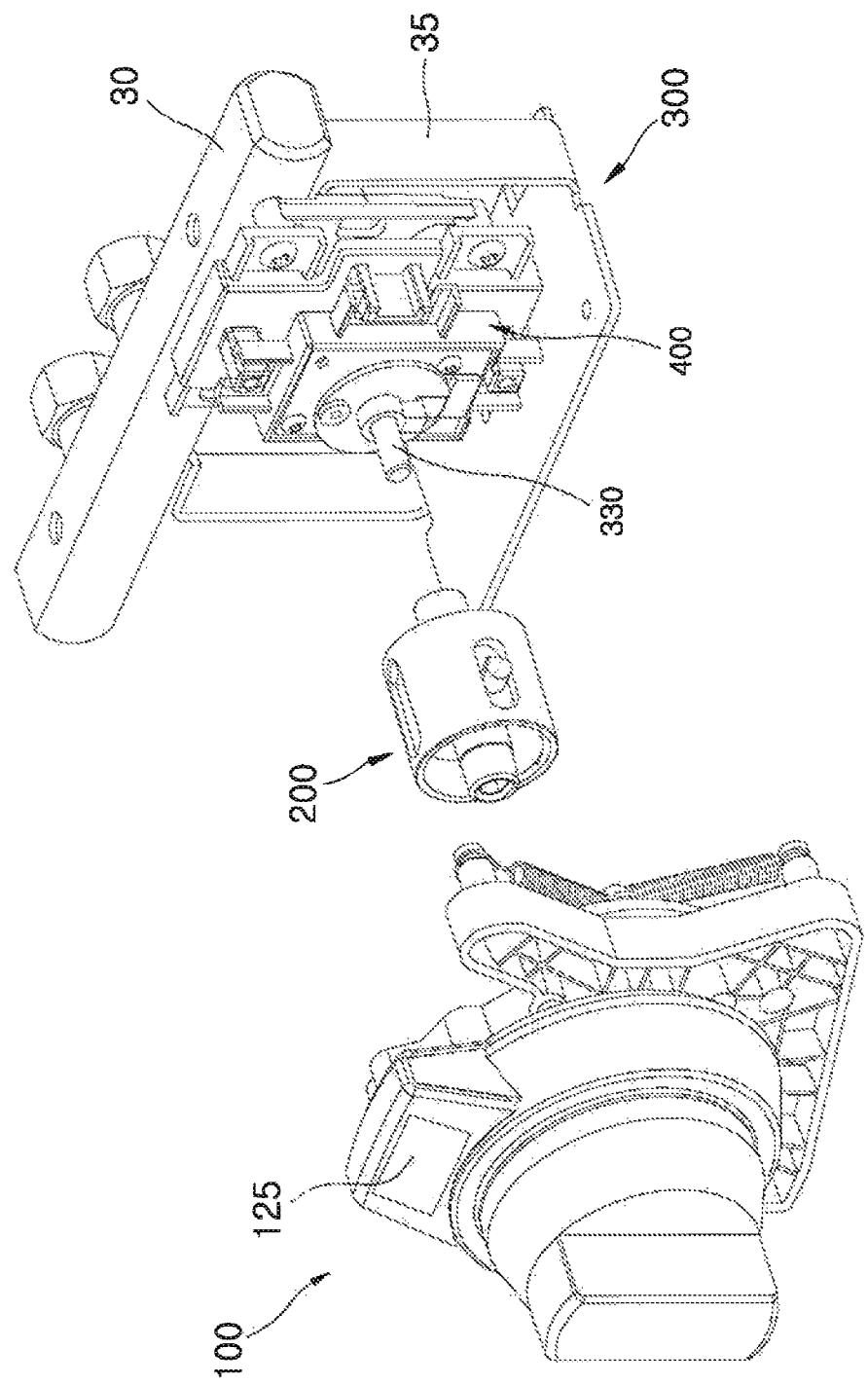
FIG. 5 is a perspective view showing the fire power controlling knob assembly separated into three portions.
Figure 6:
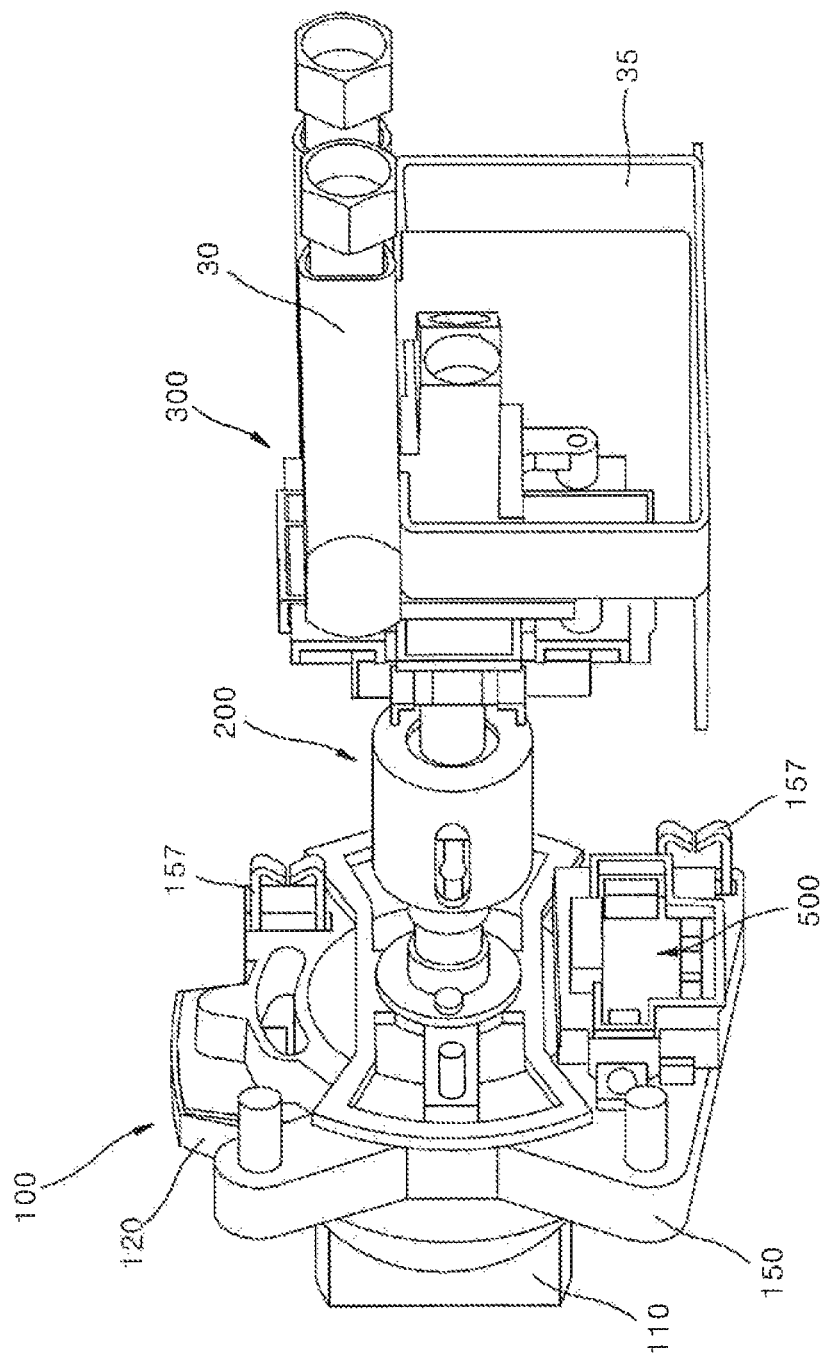
FIG. 6 is a perspective view showing the knob assembly of FIG. 4 viewed from a rear surface.
Figure 7:
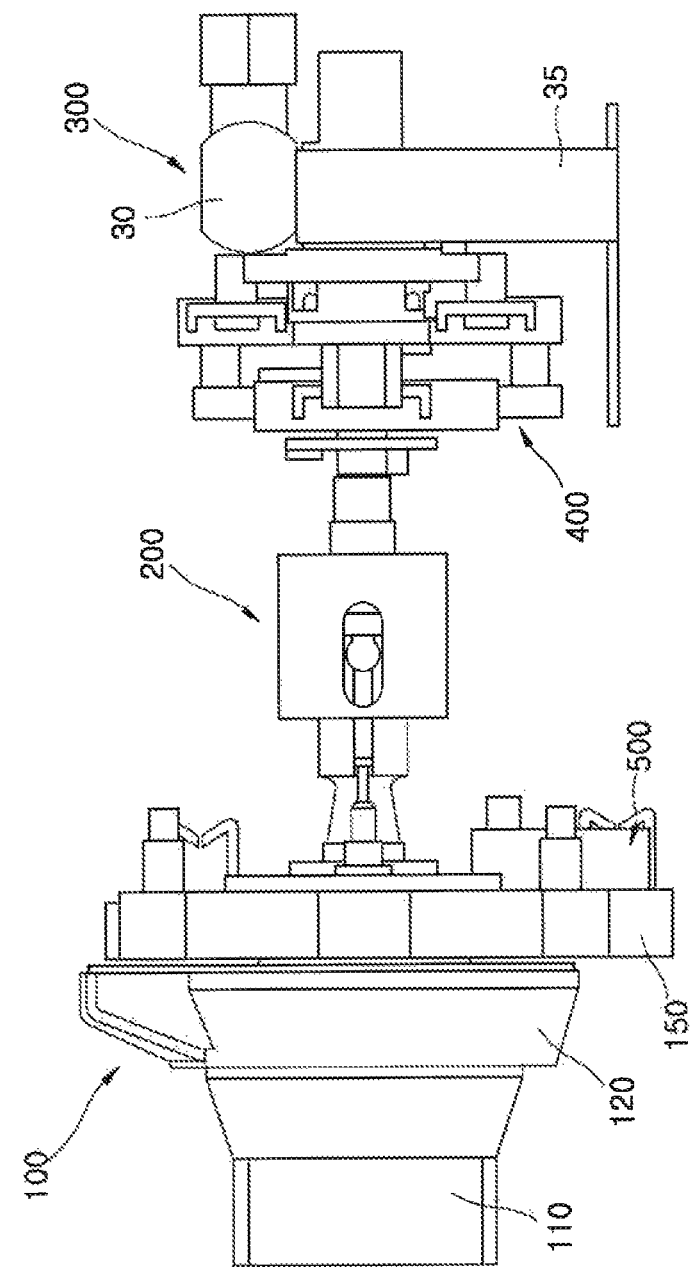
FIG. 7 is a side view of the knob assembly of FIG. 4.

FIG. 3 is a perspective view showing a state in which the fire power controlling knob assembly in accordance with an exemplary implementation of the present disclosure is assembled into a front panel, FIG. 4 is a perspective view showing by removing a front panel from FIG. 3, FIG. 5 is a perspective view showing a state which a fire power controlling knob assembly in accordance with an exemplary implementation of the present disclosure is separated into 3 portions, FIG. 6 is a perspective view of the knob assembly of FIG. 4 viewed from the rear side, and FIG. 7 is a side view of the knob assembly of FIG. 4.

As shown, the fire power controlling knob assembly in accordance with an exemplary implementation of the present disclosure includes a case assembly 100 assembled to the front panel 10, a valve assembly 300 fixed in the cooking appliance, a joint 200 connecting a knob shaft (116 of FIG. 8) of the case assembly 100 and the valve shaft (330 of FIG. 5) of the valve assembly 300.

In addition, a knob sensor 400 for sensing a rotation angle of the knob shaft 116 is arranged on the valve assembly 300 and a knob ring sensor 500 for sensing the rotation of the knob ring 120 is arranged on the case assembly 100.

The case assembly 100 includes a knob 110 and a knob ring 120 which are exposed to the outside the front panel 10. Inside of the case assembly 100, a support frame 150 is coupled. The support frame 150 is directly fastened to the front panel 10 and the other components of the case assembly 100 have the structure coupled to or supported by the support frame 150.

The knob 110 serves to control an ignition and firepower of the burner. The knob 110 is operated in such a manner that it is rotated while being pushed. Therefore, the knob 110 has to be movable in the front and rear direction of the front panel 10. Hereinafter, the frontward and rearward working distance of the knob 110 is referred to as a front and rear direction stroke.

Since the knob 110 has frontward and rearward stroke, the knob 110 has to be spaced from the front panel 10 by a spacing corresponding to the forward and rearward strokes in a state of an external force is not applied. Such spacing of the knob 110 adversely affects the appearance quality.

The original knob ring 120 has begun to be applied for the purpose of covering that the knob 110 is separated from the front panel 10. The knob ring 120 is fixed to the front panel 10 so as to surround the periphery of the knob 110 not to be exposed for the spacing of knob 110 from the front panel 10. Thus, the knob ring 120 had a structure fixed to the front panel 10, unlike the knob 110.

As a result, the knob ring is fixed to the front panel 10, and the knob 110 is the structure fixed to the valve shaft inside the cooking appliance. In such a structure, when a position error occurs in the valve shaft, it had a problem that the knob 110 is not arranged in a centering.

In order to solve such problem, the methods have been attempted to support the knob 110 so that it can be arranged at the center of the knob ring 120. However, in this case, when an error occurs in the valve shaft, the knob is excessively rubbed with the knob ring, or the valve shaft is excessively rubbed at the support member, resulting in a result that the operation of the knob is not smooth.

In order to solve such a problem, the present disclosure provides that the fire power controlling knob assembly is divided into three portions, and the joint 200 is arranged between the case assembly 100 and the valve assembly 300, so that the joint absorbs the positional error and secures operation performance of the knob 110.

In addition, according to the present disclosure, the knob ring 120, which had a character of an ornament for improving a conventional appearance quality, can perform a function as an operation switch for timer setting. In addition, it is characterized in that a display device 125 may be arranged on the knob ring 120 so that the set timer time can be displayed through the display device 125 arranged on the knob ring 120.

At this time, the display device 125 attached to the knob ring 120 may display an intensity of the fire power together with the timer time. A display cover is provided outside the display device 125, but a detailed assembly structure of the display device 125 will be described later. In the shown drawings, a reference numeral of the display device is displayed at a position corresponding to the position of the display device 125.

The display device 125 is arranged at the upper center of the knob ring 120. In addition, the display device 125 is arranged in an inclined form toward the upper portion so that it can be arranged to keep at a state close to right angle from the display device 125 and a view of the user, when the user positioned forward the cooking appliance views the display device 125. It results in an effect of improving a visibility of the display device 125.

This arrangement results in an effect of making it easy to identify the timer time displayed on the display device 125 during an operation of the knob ring 120. The user turns to the left or right of the knob ring 120 and set the timer time. In this operation process, it results in an effect that the display device 125 is not covered by the user's hand.

The valve assembly 300 is assembled to a gas pipe 30 and a gas pipe frame 35, which are fixed inside a cooking appliance body.

In the assembly process of a product, it is made by the method that the front panel 10 is assembled after manufacturing the cooking appliance body. When the gas pipe 30 and the gas pipe frame 35 are assembled to the cooking appliance body, the valve shaft 330 is fixed to the cooking appliance body.

In this state, after assembling the joint 200 to the valve shaft 330 and finally, the front panel assembled with the case assembly is assembled to the cooking appliance, main body and the knob shaft 116 is fitted into the joint 200, and the assembly is coupled.

The joint 200 absorbs the position error between the knob shaft 116 and the valve shaft 330 and serves to transmit a rotation and pushing of the knob shaft 116 to the valve shaft 330. Therefore, since the error of the valve shaft 330 is not transmitted to the knob 110, it is possible to reduce the position error of the knob 110 and secure operation performance of the knob 110.

Conventionally, it has the structure that the knob is directly assembled to the valve shaft, so that the position error generated in the valve shaft is transferred directly to the knob, as itself, that is exposed to the appearance, and it has a problem of degrading the appearance quality of the cooking appliance.

In some implementations, the knob assembly of the present disclosure is assembled with a state that the knob 110 aligned with regard to the front panel 10, and the position error of the valve shaft 330 is absorbed in the joint 200, and thus, the knob 110 does not transfer the position error of the valve shaft 330 even when the position error is generated due to an assembly tolerance in the valve shaft 330 because the position error of the valve shaft 330 is absorbed in the joint 200.

This is because the knob 110 is independently assembled at an aligned position with regard to the front panel 10 and then connected to the valve shaft 330 inside the cooking appliance by the joint 200.

Figure 8:
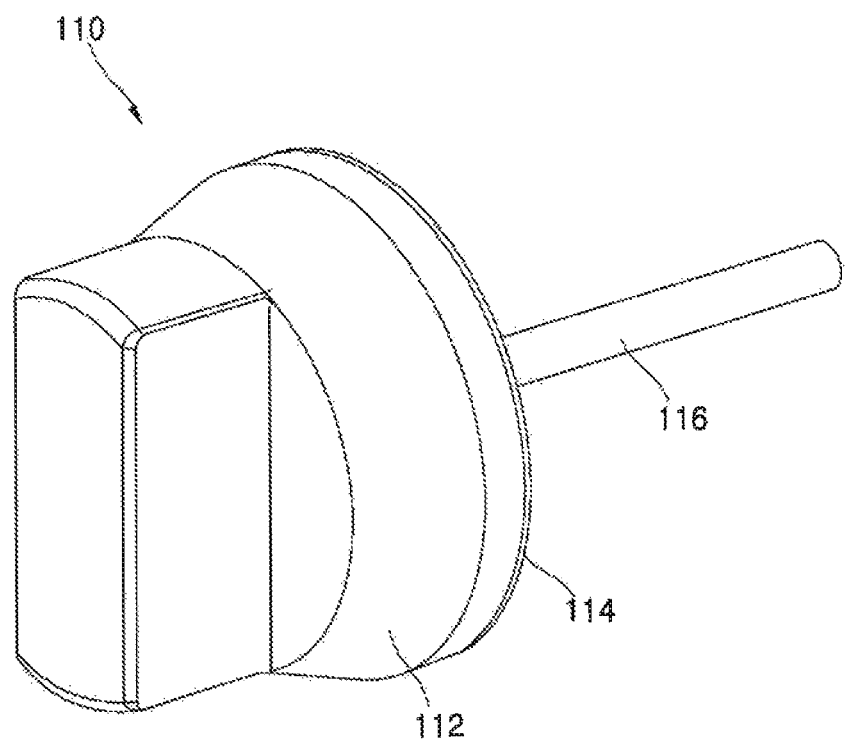
FIG. 8 is a perspective view showing an example knob arranged at an outermost portion of an example case assembly.
Figure 9:
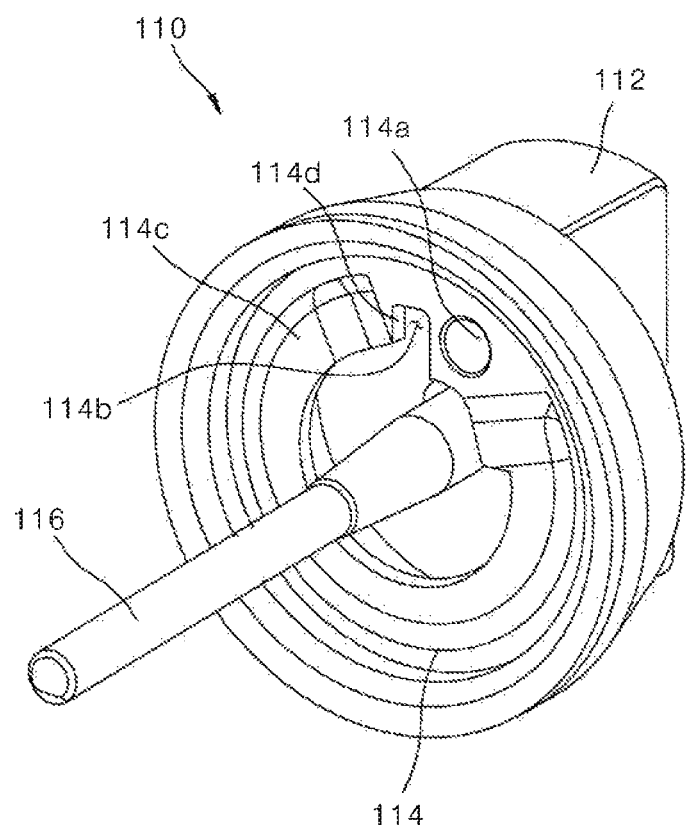
FIG. 9 is a perspective view showing an example rear surface of the knob shown in FIG. 8.
Figure 10:
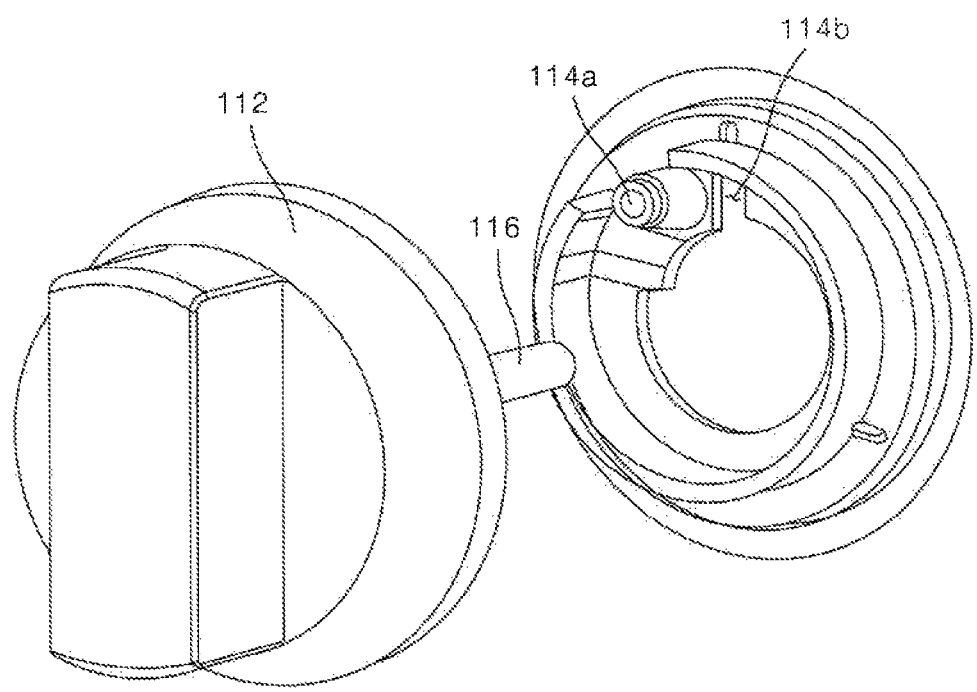
FIG. 10 is a perspective view showing the knob of FIG. 8.

FIG. 8 is a perspective view showing a knob arranged at an outermost portion of the case assembly, FIG. 9 is a perspective view showing a rear surface of the knob in FIG. 8, and FIG. 10 is a perspective view showing a state in which a knob back plate shown in FIG. 8 is separated.

In some examples, the knob 110 has the structure directly fitted to the valve shaft 330, but it is characterized in that the knob 110 of the knob assembly according to the present disclosure provides the knob shaft 116 separately when the valve shaft 330. As described above, the knob shaft 116 is connected to the valve shaft 330 through the joint 200.

The knob 110 includes a knob body 112 that forms an appearance, a knob back plate 114, and a knob shaft 116. The knob body 112 and the knob shaft 116 may be integrally formed as a single portion and may be manufactured as separate portions and then coupled.

In some implementations, the knob shaft 116 may be made of a metal material for high strength and reliability. The knob body 112 may be manufactured of an injection portion forming the appearance, but a metal material processed goods is used in the case of an expensive product group.

In some examples, when the portion integrally made of the knob body 112 and the knob shaft 116 is manufactured through the metal processing, the time and cost required for manufacturing the portions become excessive. In order to manufacture the metal part having such a shape, a cutting processing is generally. However, since the size of a raw material for cutting processing is increased, there are many the cut scraps, thereby increasing the processing time and the processing unit cost.

However, even when the knob body 112 and the knob shaft 116 are the same metal material, the processing cost may be lowered when separately manufacturing it, and coupling it. In this case, the knob body 112 is manufactured by cutting processing, and the knob shaft 116 is applicable to a method of manufacturing a wire material such as rolling, etc.

At this time, the coupling between the knob body 112 and the knob shaft 116 can use the method of a shrinkage fitting, an indentation, and a welding, etc.

In some examples, the knob back plate 114 coupled to the rear surface of the knob body 112 is advantageous from the viewpoint of cost using a molding portion because it is less exposed externally and has a complicated shape.

The knob back plate 114 functions in order for not to be operate the knob 110 in a state without pushing the knob 110 together with a locking bracket (140 of FIG. 11) described later.

The knob back plate 114 provides a guide surface 114c extending to the center side of the knob shaft 116 and the guide surface 114c provides a cutting section 114b at the portion corresponding to the position of the locking bracket 140 when the knob 110 is in the origin position (the position in an off state).

In other words, when the knob is not pushed when the knob 110 is in the off state, the locking piece (142 in FIG. 14) of the locking bracket is positioned inside the cutting section 114b, one side of the guide surface 114c becomes an engaging surface 114d and interferes with the locking bracket 140, and thus, a user may not rotate the knob 110.

When the knob 110 is pushed, the engaging surface 114d becomes a position corresponding to a knob passage groove 144 provided in the locking bracket 140, and the engaging surface 114d passes through the knob passage groove 144 and it is in a state of being able to rotate. Accordingly, in a state which the knob 110 is pushed, the knob 110 can be rotated.

General push and turn type knobs have a structure in which the knob 110 itself can rotate even in a state which the knob is not pressed, but the rotational force of the knob 110 is not transmitted to the valve. The present disclosure provides a structure which cannot be rotated even for the knob 110 in a state the knob 110 is pushed by using an interference of the locking bracket 140 and the knob back plate 114, as described above.

In some examples, the engaging surface 114d defined on the guide surface 114c of the knob back plate 114 may be aligned with the locking bracket 140, and the locking bracket 140 may be aligned with the origin position of the knob body 112. Accordingly, the knob body 112 and the knob back plate 114 may be constrained and may not rotate with regard to each other.

In some implementations, the knob back plate 114 may be fastened to the knob body 112 through the fastening hole 114a. Although the shown knob body 112 is shown as a straight handle shape, it may be formed simply as a conical shape, and may have a shape in which the origin position is engraved or colored, and a knob design having various other shapes may be applied in addition to that.

Hereinafter, all configuration of the case assembly except the knob will be described.

Figure 11:
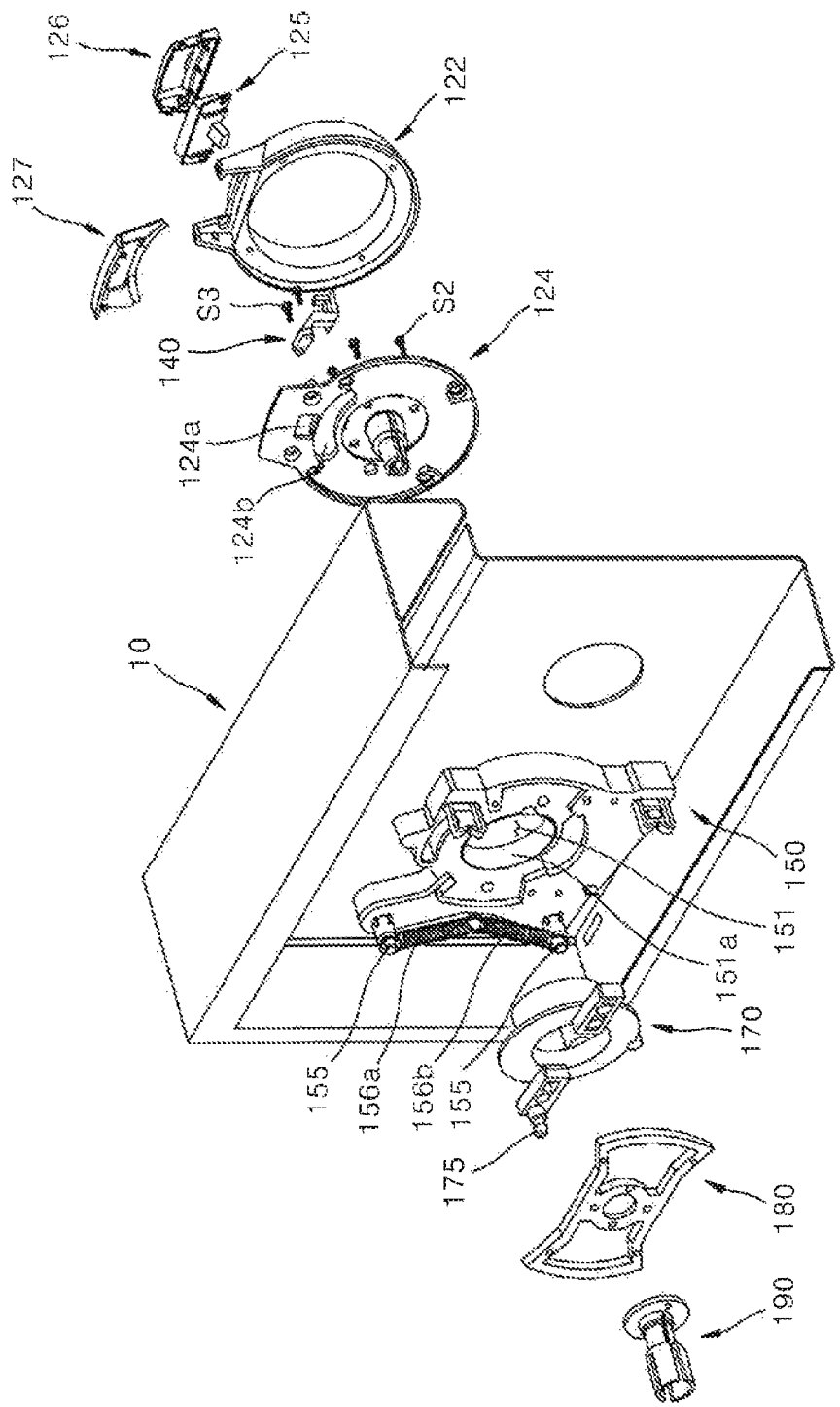
FIG. 11 is an exploded view showing the case assembly.
Figure 12:
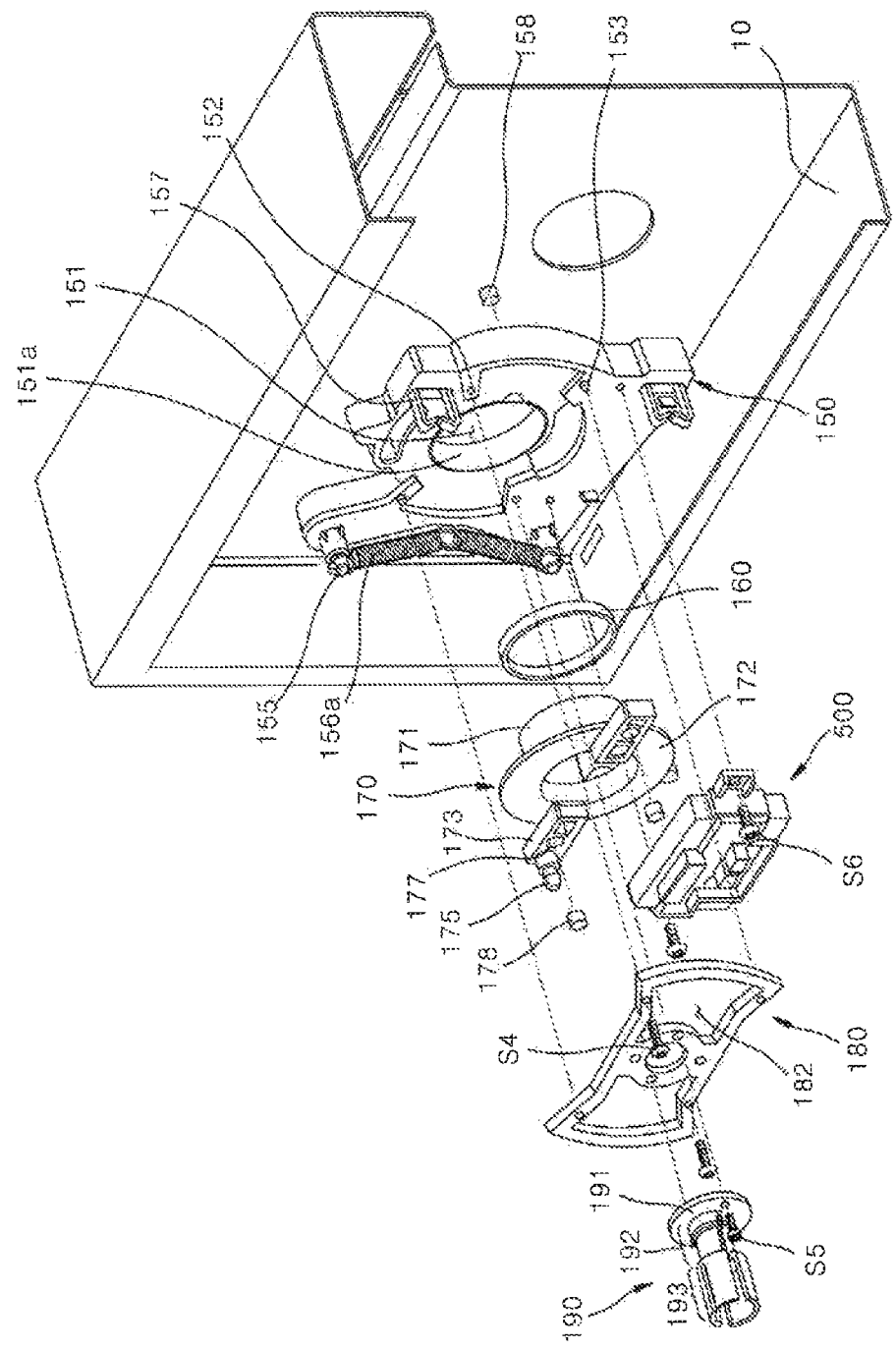
FIG. 12 is an exploded view showing an example inside of the case assembly.
Figure 13:
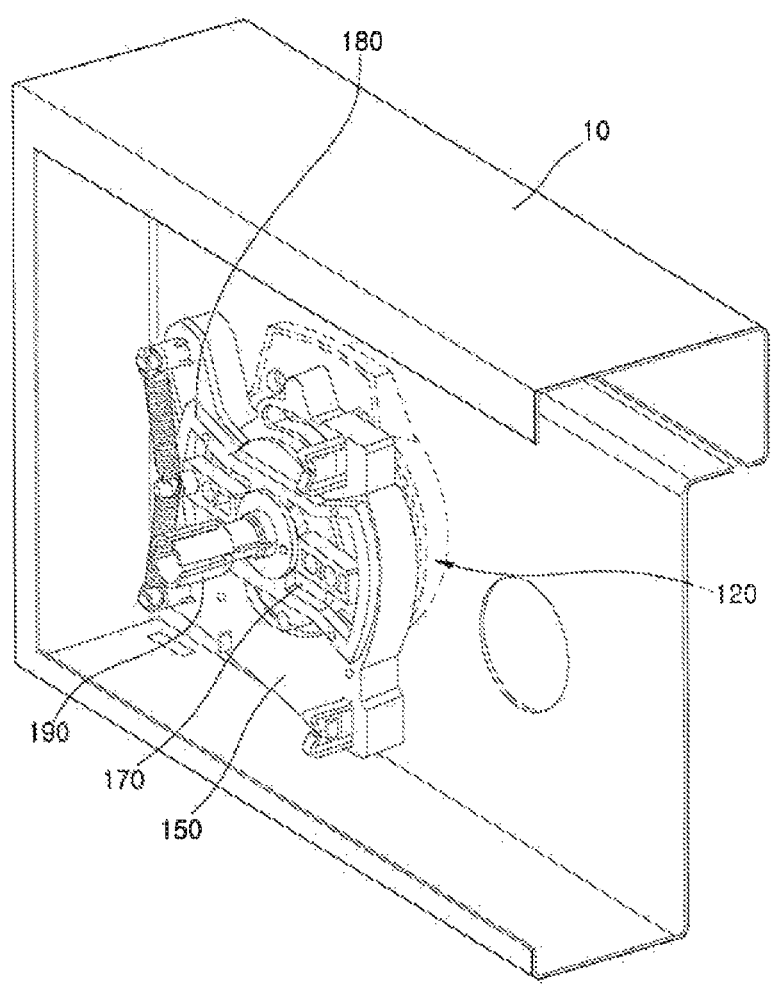
FIG. 13 is a view showing an example arrangement inside of the front panel of the case assembly.
Figure 14:
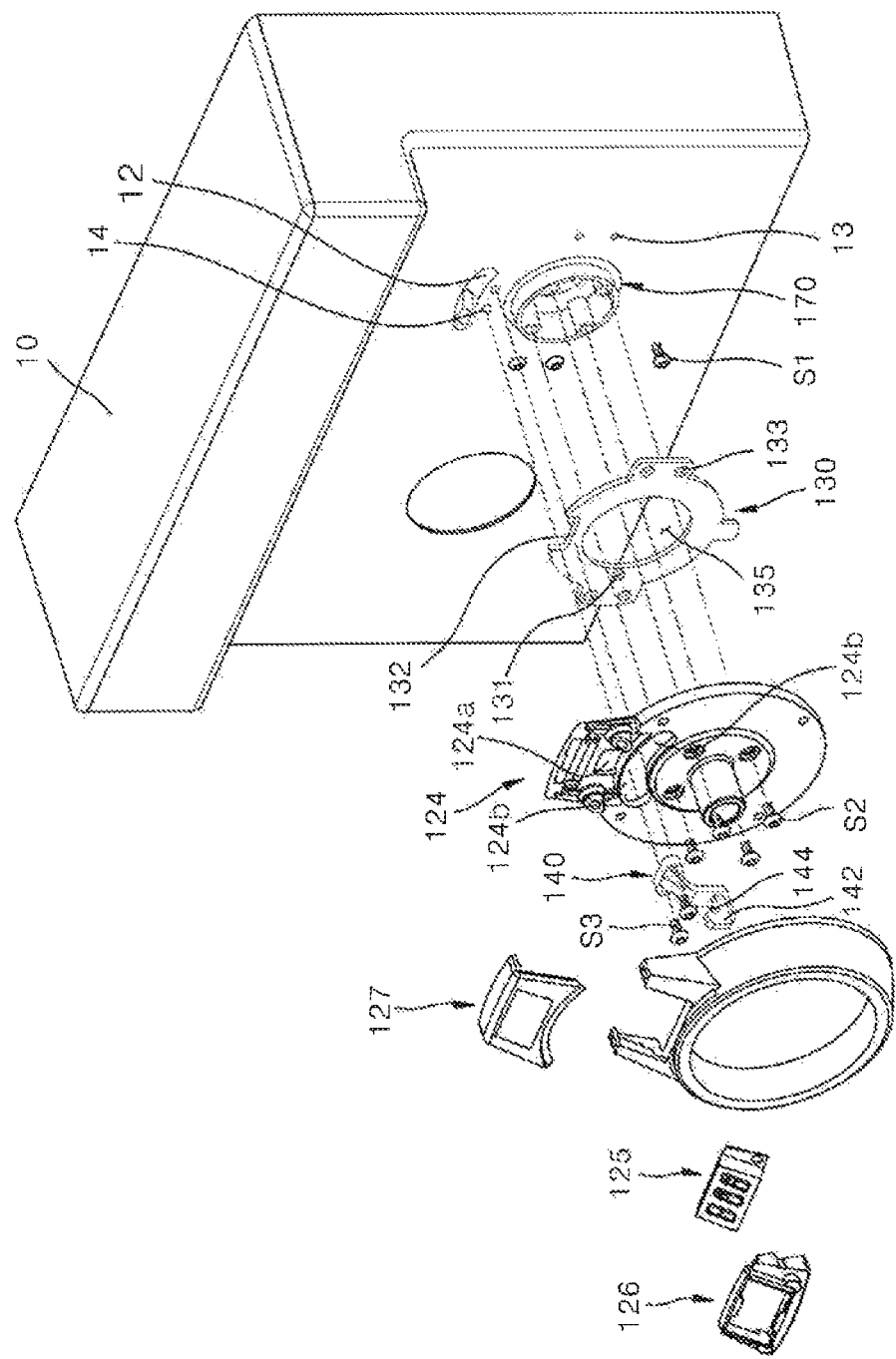
FIG. 14 is an exploded view showing example components arranged outside of the front panel of the case assembly.
Figure 15:
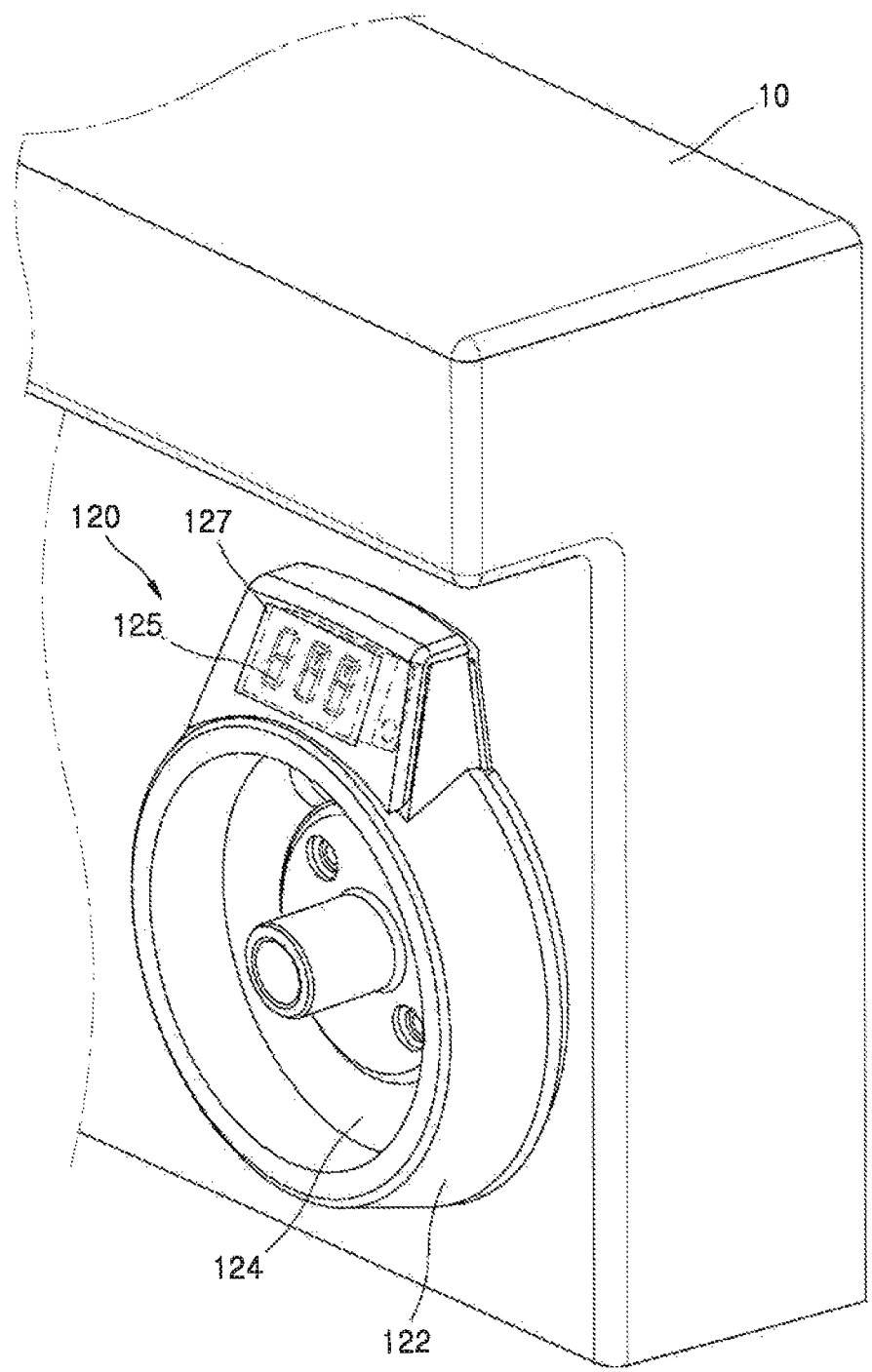
FIG. 15 is a view showing an example state arranged outside of the front panel of the case cooking assembly.

FIG. 11 is a view showing the separated state of all configurations of the case assembly, FIG. 12 is a view showing a separated state of the configurations arranged inside the front panel of the case assembly, FIG. 13 is a view showing a state which the configurations inside the front panel of the case assembly is arranged, and FIG. 14 is a view showing a separated state of the configurations arranged to the outside the front panel of the case assembly, and FIG. 15 is a view showing a state which the configurations arranged outside the front panel of the case assembly are assembled.

As shown, the case assembly 100 includes the knob (110 of FIG. 8), the knob ring 120, a spacing plate 130, the locking bracket 140, the support frame 150, a spacing pipe 160, an actuating member 170, a fixed frame 180, and a fixed pipe 190.

Among them, the knob 110, the knob ring 120, the spacing plate 130, and the locking bracket 140 are arranged outside the front panel 10.

The support frame 150, the spacing pipe 160, the actuating member 170, and the fixed frame 180, and the fixed pipe 190 are arranged inside the front panel 10.

The present disclosure provides the structure which the knob ring 120 provided in the case assembly 100 is rotatable in both directions in a predetermined range and includes a knob ring sensor 500 of sensing the rotation of the knob ring 120. In addition, a knob sensor 400 for sensing the amount of rotation of the knob 110 to be described later is arranged in the valve assembly 300 and connected to the valve shaft 330.

The knob ring 120 includes a knob ring body 122, a knob ring back plate 124, a display device 125, a display housing 126, and a display cover 127.

The knob ring body 122 forms the appearance of the knob ring 120 and serves to fix the display device 125. The display housing 126 secures insulating performance of the display device 125, which is an electronic component, and secures to be fastened to the knob ring body 122. The display cover 127 together with the knob ring body 122 forms the appearance of the knob ring 120.

The knob ring body 122 may be made of a metal material similar to the knob body 112. Since the knob ring body 122 is a portion which the user's hand has to be continuously contacted like the knob body 112, a metal material may be used for improving a sensitive quality, improving the appearance quality, and improving a durability.

The display cover 127 is coupled as a form of surrounding the outer surface of the display device 125 and the display housing 126 received therein. The display cover 127 may be made of a semi-translucent material so that only information displayed on the display device 125 can be viewed while the inner component is not visible to the outside.

Here, the translucency may be a degree of transmitting of a portion of a light emitted from a display, and does not mean of limiting the range of a predetermined translucent ratio.

The display device 125 is coupled to the display housing 126 and the display housing 126 coupled with the display device 125 is coupled to the knob ring back plate 124, and then, the knob ring back plate 124 coupled with the display housing 126 is coupled to the knob ring body 122.

In some implementations, the display housing 126 and the knob ring body 122 may provide the groove and the protrusion at positions corresponding to each other, so that the display housing 126 can be assembled at an aligned position with regard to the knob ring body 122.

The display cover 127 which forms the appearance of the knob ring 120 together with the knob ring body 122 is a structure which is fitting coupled to the knob ring body 122 in a state which the knob ring body 122 and the knob ring back plate 124 are fastened.

In some examples, a spacing plate 130 is arranged between the knob ring back plate 124 of the knob ring 120 and the front panel 10. The spacing plate 130 is a kind of thrust bearing and serves not to directly rub the knob ring 120 and the front panel 10, and maintain the predetermined spacing between the knob ring 120 and the front panel 10.

It is possible to set the spacing between the rear surface of the knob ring 120 (the rear surface of the knob ring back plate) and the outer surface of the front panel 10 by adjusting the thickness of the spacing plate 130.

The spacing plate 130 may be made of a material having a low coefficient of friction such as Teflon, and a lubricant having viscosity may be applied to the surface of the spacing plate 130.

The configuration which is directly fastened to the front panel 10 of the external configurations of the front panel 10 is the locking bracket 140. The locking bracket 140 serves not to rotate without pushing the knob 110 in Push & Turn method.

The locking bracket 140 is directly fastened to the front panel 10 through a bracket hole 124b provided in the knob ring back plate 124.

Since the knob ring back plate 124 rotates in both directions together with the knob ring 120, the bracket hole 124b is formed as an arc long hole in the knob ring back plate 124. It is such that the knob ring back plate 124 is rotated in a state which the locking bracket 140 is fastened to the front panel.

In addition, the spacing plate 130 is closely attached to the outer surface of the front panel 10. In the shown implementation, the spacing plate 130 is provided with a bracket groove 132 at a portion corresponding to the fastening position of the locking bracket 140.

It is for the locking bracket 140 to be directly attached to the surface of the front panel 10 and fastened. However, since the spacing plate 130 does not rotate with the knob ring but maintains the fixed position, it is sufficient that the bracket groove 132 is formed to have a size corresponding to the fastening surface of the locking bracket 140.

Of course, as another implementation, the locking bracket 140 may be fastened to the front panel through the spacing plate 130. In this case, the spacing plate 130 may be provided with a fastening hole which can be extension formed to the portion corresponding to the fastening surface of the locking bracket 140 and can penetrate a fastening vole S3 for fastening the locking bracket 140. The locking bracket 140 can be repeatedly applied with a lateral force, and the fixing of the center position is important. In some implementations, the locking bracket 140 may be fastened to the front panel 10 with at least two fastening bolts S3.

In some examples, the front panel 10 is provided with a wiring hole 12 for passing through the wiring connected to the display device 125. The wiring hole 12 is for passing the wiring that supplies power and a signal to the display device 125. The display device 125 is fixed to the knob ring 120 and rotates together with the knob ring 120 so that the wiring is rotated together with the knob ring 120. Therefore, the wiring hole 12 is formed as an arc-shaped long hole.

The support frame 150, the spacing member 160, the actuating member 170, the fixed frame 180, the fixed pipe 190, and the knob ring sensor 500 of FIG. 12 are arranged inside the front panel 10.

The support frame 150 is directly fastened to the front panel 10 through the fastening bolt S1 penetrating through the front panel 10 in a state which is arranged on the inner surface of the front panel 10. The head of the fastening bolt S1 is inserted into the bolt receiving hole 133 of the spacing plate 130 to serve as a fixing protrusion for fixing the position of the spacing plate 130.

The support frame 150 provides a pair of spring fixing portions 155 to which the restoring springs 156a and 156b of providing the restoring force of the actuating member 170 are fixed. In addition, a restoring magnet 158 is fixed to the support frame 150 so that the actuating member 170 can have a fixing force at the origin.

The actuating member 170 is fitted inside the support frame 150 and then is fastened to the knob ring 120 through a fastening bolt S2. Thus, the actuating member 170 can rotate integrally with the knob ring 120. The actuating member 170 provides the spring fixing portion 175 to which the restoring spring 156a, 156b is fixed. The spring fixing portion 175 of the actuating member 170 is arranged between the spring fixing portions 155 of the support frame 150 and they are connected by a pair of restoring spring 156a, 156b.

When the knob ring 120 is rotated to one side, it is configured such that one restoring spring is tensioned and the other restoring spring is compressed. When the external force applied to the knob ring 120 is released, it is configured such that the knob ring 120 can be returned to the origin position by the elastic force of the restoring spring 156a, 156b.

In addition, the actuating member 170 is provided with a restoration magnet 178 paired with the restoration magnet 158 of the above-mentioned support frame 150. The restoring magnet 158 arranged in the support frame 150 and the restoring magnet 178 arranged in the actuating member 170 are arranged at a position corresponding to each other such that the knob ring 120 is the closest position in a state which it is located at the origin.

In the illustrated implementation, four fastening bolts S2 are applied to firmly fasten the actuating member 170 having a cylindrical shape and the knob ring back plate 124. However, three fastening bolts S2 can be fastened at a spacing of 120°.

In some examples, the actuating member 170 is partially protruded from the front surface of the front panel 10 through the support frame 150 so as to be in direct contact with the knob ring back plate 124 and can be fastened. This is to make the actuating member 170 protruding outside the front panel 10 support the knob ring back plate 124.

The actuating member 170 includes an operating portion 171 inserted into the support frame 150, a support portion 172 formed in a flange shape at the inner end of the operating portion 171, and an extended portion 173 from both sides of the support portion 172 to the outside. A spring fixing portion 175 is provided on the extended portion 173 on one side.

In addition, the extended portion 173 is provided with a magnet groove 177 into which the restoring magnet 178 is inserted. The restoration magnet 178 fixed to the actuating member 170 is arranged so as to generate a magnetic force in a direction closely attached to the restoring magnet 178 fixed to the support frame 150. It is for the actuating member 170 to be fixed by the attaching power of the restoring magnets 158,178 at the origin position.

In addition, the outer circumferential surface of the actuating member 170 operates by the rubbing with the inner surface of a support frame through hole 151 of the support frame 150.

In some examples, the spacing member 160 is made of Teflon, etc. having a low coefficient of friction like the spacing plate 130 and inserted between the outer circumferential surface of the actuating member 170 and the inner circumferential surface of the support frame through hole 151. The spacing member 160 may be formed in a cylindrical shape which one surface is cut so as to have a variable diameter.

In the case of the illustrated implementation, the spacing plate 130 and the spacing member 160 are shown as separate portion. However, the spacing plate 130 and the spacing member 160 are made of the same material such as Teflon having a low coefficient of friction and they may be integrally formed as a single part because there are the portions which are in contact with each other.

In addition, a lubricant (for example, grease) for reducing the rubbing and the noise can be applied to the surface of the spacing plate 130 and the spacing member 160.

The fixed frame 180 secures to support the rear surface of the actuating member 170 to prevent the actuating member 170 from being pushed and entered into the inside of the front panel.

The fixed frame 180 may be provided for convenience of the assembly. The actuating member 170 has to be fastened to the knob ring 120 as described above. When the fixed frame 180 is not provided, a fastening work has to be performed in a state when the knob ring 120 and the actuating member 170 are fixed by hands or a tool.

However, when the fixed frame 180 is provided, when the actuating member 170 is inserted into the support frame 150 and the fixed frame 180 is fastened to the rear surface of the actuating member 170, the actuating member 170 cannot deviate from the support frame 150. Therefore, when the knob ring 120 is assembled, the knob ring 120 is aligned to the actuating member 170 on the front side of the front panel, and then the fastening operation can be performed, and thus, workability is improved. The fixed frame 180 has a rotatable region 182 that defines a rotation angle of the extended portion 173 of the actuating member 170.

In addition, since the actuating member 170 is integrally rotated with the knob ring 120, the knob ring sensor 500 senses the knob ring sensor magnet 530 fixed to the actuating member 170 and can recognize the operation of the knob ring 120.

The knob ring sensor 500 is fastened to the support frame 150 directly fastened to the front panel 10. Since the knob ring sensor 500 is sufficient to be fixed at a position close to the actuating member 170, it may be fastened to the fixed frame 180 or directly fastened to the front panel 10, depending on the shape.

In addition, a fixed pipe 190 is fastened to the rear surface of the fixed frame 180. The fixed pipe 190 serves to support the knob shaft 116 provided on the knob 110 and guide the assembly of the joint 200.

Referring to FIG. 14, the head of the fastening bolt S1 of fixing the support frame 150 and the front panel 10 is a state exposed on the outer surface of the front panel 10. An appearance exposure of the fastening bolt S1 results in a degradation of the appearance quality.

In some examples, in order to make the knob ring 120 rotate in both directions, a gap may be defined between the knob ring 120 and the front panel 10.

As described above, the gap between the knob ring 120 and the front panel 10 can be secured by the spacing plate 130. In addition, the present disclosure provides a structure in which the spacing plate 130 surrounds the support frame fastening bolt S1 to which the appearance is exposed, so that the fastening bolt S1 is not externally exposed.

Of course, since the knob ring 120 is arranged on the front surface of the fastening bolt S1, the fastening bolt S1 is not exposed on the front surface. However, when the user views it from the side, this is because that the fastening bolt S1 can be viewed through a gap (a gap for the rotation of the knob ring) between the knob ring 120 and the front panel 10.

For this, the spacing plate 130 is provided with a bolt receiving hole 133 at a position corresponding to the support frame fastening bolt S1. In addition, the spacing plate 130 has a through hole 135 at the center and an inner circumferential surface of the through hole 135 has the surface of being supported by the actuating member 170 protruding to the outside the front panel 10.

Therefore, the spacing plate 130 may not require separate fastening. This is because the knob ring 120 which is closely attached to the front surface of the spacing plate 130 is fastened to the actuating member 170 with the front panel 10 therebetween.

Next, the assembly structure of the knob ring 120 will be described in more detail.

Figure 16:
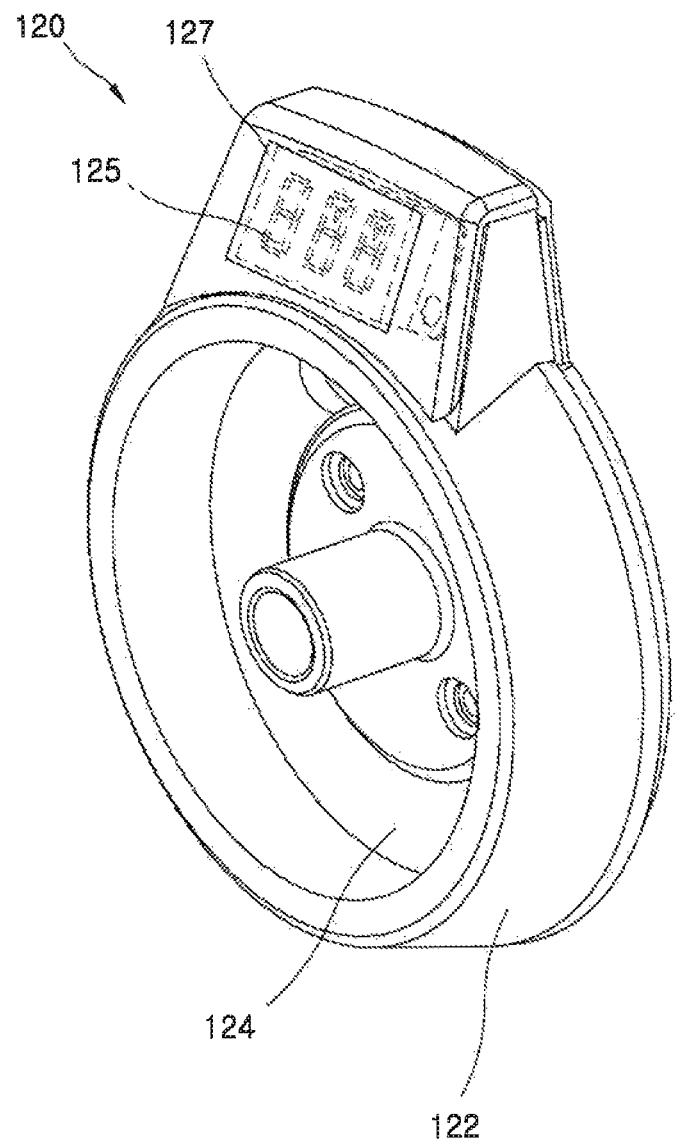
FIG. 16 is a perspective view showing an example appearance of the knob ring in an assembled state.
Figure 17:
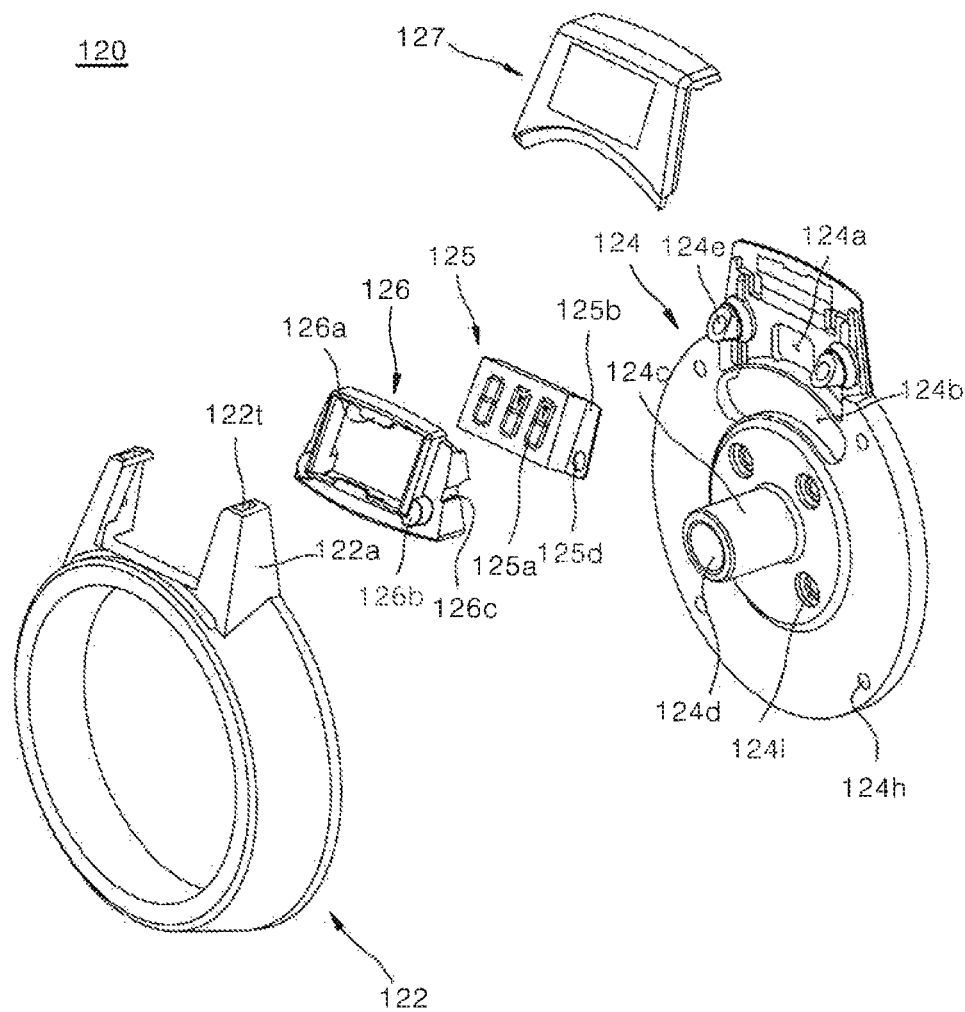
FIGS. 17 and 18 are the exploded perspective views showing example assembly structures of the knob ring.
Figure 18:
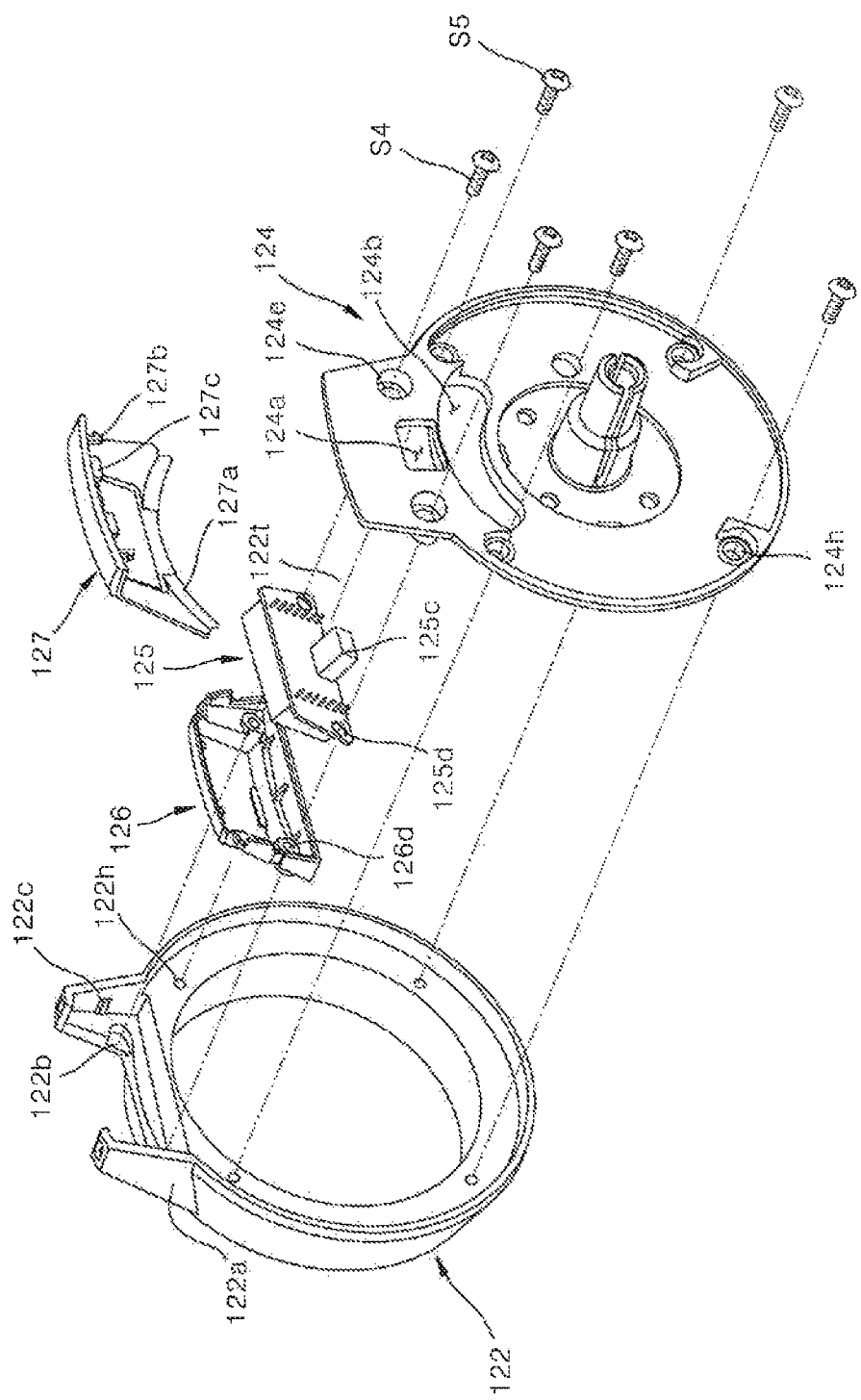

FIG. 16 is a perspective view showing an appearance in a state which the knob ring is assembled, and FIGS. 17 and 18 are the exploded perspective views for explaining an assembling structure of the knob ring.

As shown, the knob ring body 122 has a ring shape surrounding the rear surface of the knob, and the remaining portions except the portion penetrating through the knob shaft 116 at the center are covered by the knob ring back plate 124.

The knob ring body 122 has a protruding portion 122a that covers both sides of the display device 125 on the upper side. The protruding portion 122a provides a structure for fixing the display device 125 while securing to protect the side of the display device 125. In addition, the protruding portion 122a of the knob ring body 122 can be used as a handle when the user operates the knob ring body 122.

When rotating a circular product, the force to rotate only through the frictional force of the surface is transmitted. There are many cases that it is not easy to secure a frictional force in a kitchen environment having many cases that a lot of water is used and the gloves are used by wearing.

In this case, when the protruding portion 122a is on one side of the ring shape, by pushing it, the protruding portion in the rotating direction, the rotating force can be transmitted. For example, when the knob ring 120 is to be rotated in clockwise, the side of the left protruding portion 122a may be pressed to the right side. In some examples, when the knob ring 120 is to be rotated counterclockwise, the side of the right protruding portion can be pressed to the left.

The knob ring body 122 provides a knob ring back plate 124 and a fastening hole 122h for fastening. Although four fastening holes 122h are provided for firm and accurate fastening of the shown implementation, the number of fastening holes 122h may vary depending on the fastening structure, the size of the knob ring 120, etc.

When the protruding portion 122a is provided on the upper part of the knob ring body 122 and the display device 125 is inserted therebetween, both sides and the bottom surface of the display device 125 are surrounded by the knob ring body 122. In addition, the display cover 127 is coupled in a form of covering the upper surface of the display device 125 and the rear surface of the display device 125 is coupled to the knob ring back plate 124. As a result, all of six sides of the display device are wrapped, and provide the structure which the display device 125, which is vulnerable to moisture and impact, can be securely coupled to the knob ring 120.

A protrusion 122a and a groove 122b for constraining the display housing 126 to a center position are provided inside the protruding portion 122a of the knob ring body 122.

The knob ring body 122 may be made of a metal material like the knob body 112. The knob body 112 and the knob ring body 122 are the portions exposed to the appearance, and are the portions which the user's hands are repeatedly contacted and may be manufactured of a metal material for improving durability and appearance quality.

In some examples, the knob ring body 122 is fastened to the knob ring back plate 124 and the fastening bolt S5 is fastened at the knob ring back plate 124 side. It is for the fastening bolt S5 not to be exposed to the appearance, thereby resulting in an effect of improving the appearance quality.

The rear surface of the knob ring back plate 124 provides an inner circular plate area 124*j* in which the actuating member 170 is received and a donut-shaped outer circular plate area 124*k* formed outside the inner circular plate area 124*j*. A spacing plate 130 is received inside the outer circular plate area 124*k*.

The side of the inner circular plate area 124*j* surrounds and supports the outer circumferential surface of the actuating member 170 while the side of the outer circular plate area 124*k* surrounds and supports the outer surface of the spacing plate 130. Such a structure provides a structure that allows the knob ring 120 to stably rotate in both directions at the center position.

The spacing between the knob ring back plate 124 and the front panel 10 can be adjusted by adjusting the thickness of the spacing plate 130 and the recessed depth of the outer circular plate area.

For example, when the thickness of the spacing plate 130 is set to be 0.2 mm larger than the recessed depth of the outer circular plate area 124*k*, the spacing between the knob ring back plate 124 and the case is set to 0.2 mm.

This serves to prevent a scratch from being generated on the surface of the front panel 10 by directly rubbing to the knob ring back plate 124 on the surface of the front panel 10. Since the knob ring back plate 124 has a shape in which the upper portion arranged with the display device 125 is protruded, when the scratch is generated in this portion, even when the knob ring is in the origin position, the scratch portion can be exposed externally to left and right.

The display device 125 is fastened to the knob ring back plate 124. The display device 125 is provided with a fastening hole 125*d* and the knob ring back plate 124 is provided with a fastening hole 124*e* at a position corresponding to the fastening hole 125*d* of the display device 125.

In addition, the display housing 126 coupled to the display device 125 has a fastening boss 126*d* at a position aligned with the fastening holes 124*e* and 125*d*. A fastening bolt S4 inserted in the knob ring back plate 124 sequentially passes through the fastening hole 124*e* of the knob ring back plate 124 and the fastening hole 125*d* of the display device 125, and then, is fastened to the fastening boss 126*d* of the display housing 126. The knob ring back plate 124, the display device 125, and the display housing 126 are integrally fastened through the fastening bolt S4.

In other words, the fastening is made in a state that the display device 125 is fitted between the knob ring back plate 14 and the display housing 126. As described above, the knob ring body 122 may be made of a metal material. In order to prevent the display device 125 included with an electronic circuit from being a short circuit with the knob ring body 122, the display housing 126 may be made of an insulating material. Through this, stable operation performance of the display device 125 can be secured.

The display housing 126 may be formed as a frame form that surrounds the outer circumferential surface of the display device 125.

In addition, the fastening boss 126*d* of the display housing 126 forms the guide protrusion 126*b* to the front side of the display housing 126. The guide protrusion 126*b* is inserted into the receiving groove 122*b* provided on the rear surface of the protruding portion of the knob ring body 122 to provide a structure in which the display housing 126 can be coupled in a state aligned with the knob ring body 122.

Figure 19:
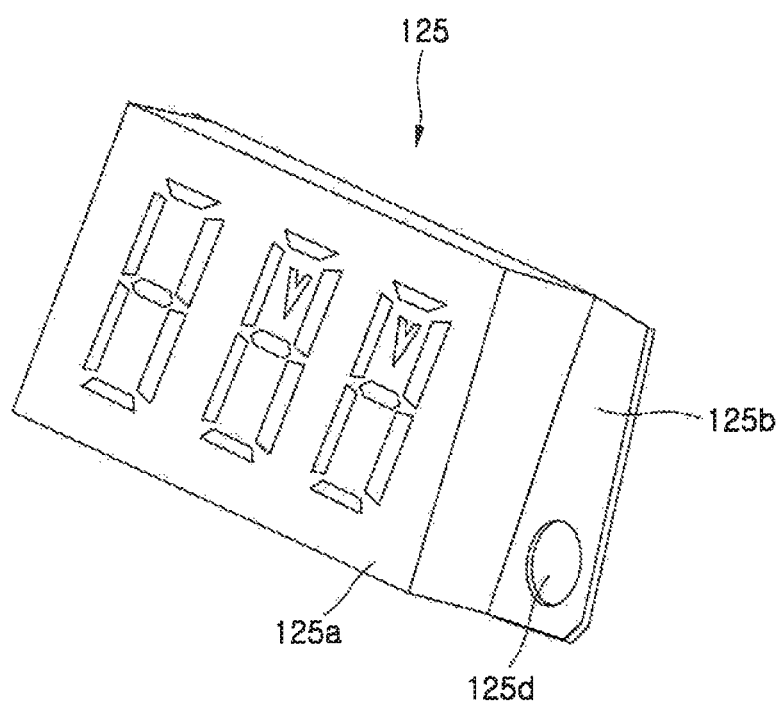
FIG. 19 is a perspective view of an example display device of an example knob assembly.
Figure 20:
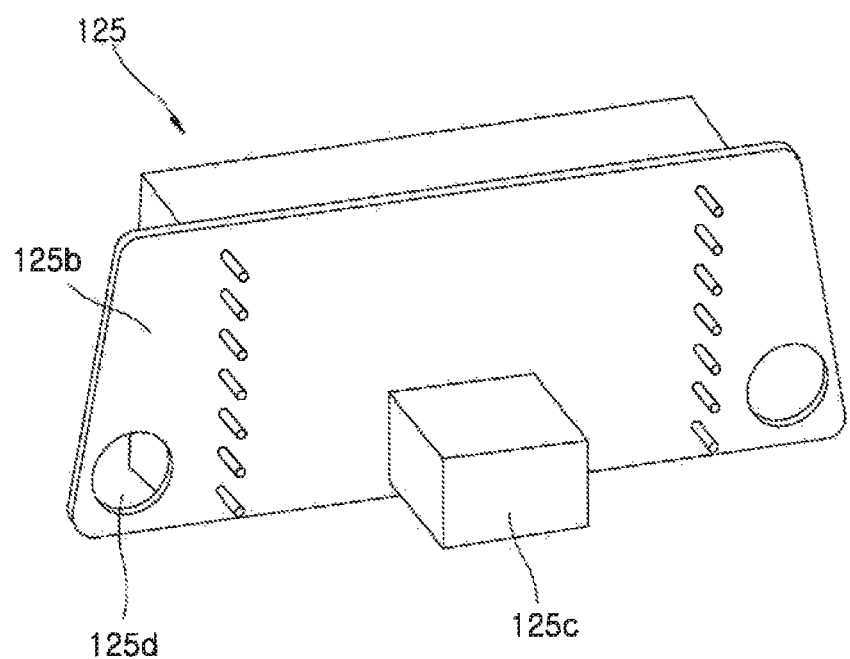
FIG. 20 is a perspective view showing a rear surface of an example display device.

FIG. 19 is a perspective view showing a display device, and FIG. 20 is a perspective view showing a rear surface of a display device of a knob assembly according to the present disclosure.

As shown, the display device 125 of the knob assembly according to the present disclosure includes a display board 125*b* and a display module 125*a*. A connector 125*c* is provided on the rear surface of the display board 125*b*. In addition, the display board 125*b* is formed larger than the display module 125*a* to the both sides. The display board 125*b* exposed to both sides of the display module 125*a* is provided with a fastening hole 125*d*.

The above described knob ring back plate 124, the display device 125, and the display housing 126 are fastened through the fastening hole 125*d*. The display module 125*a* may be configured to be of a type that the light is emitted.

Figure 21:
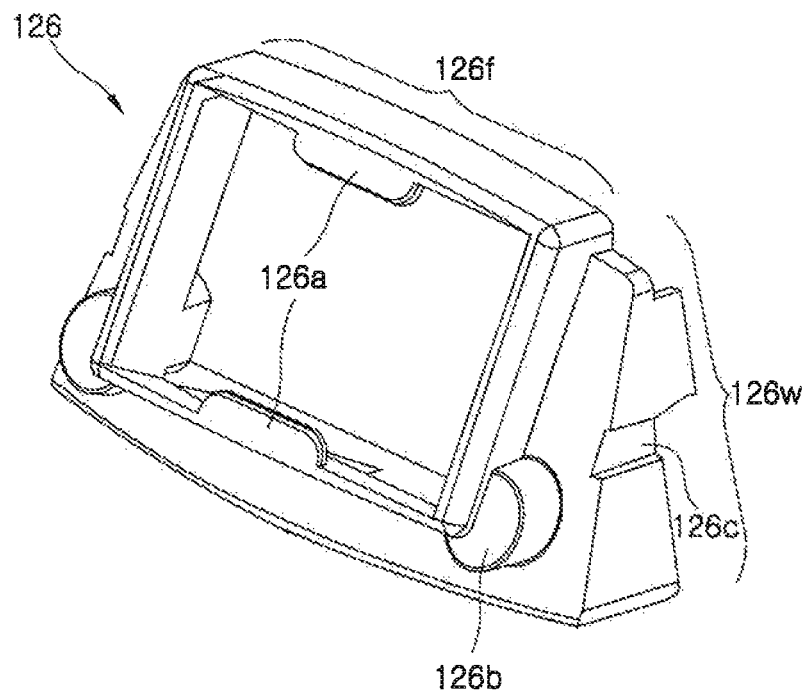
FIG. 21 is a perspective view showing an example display housing.
Figure 22:
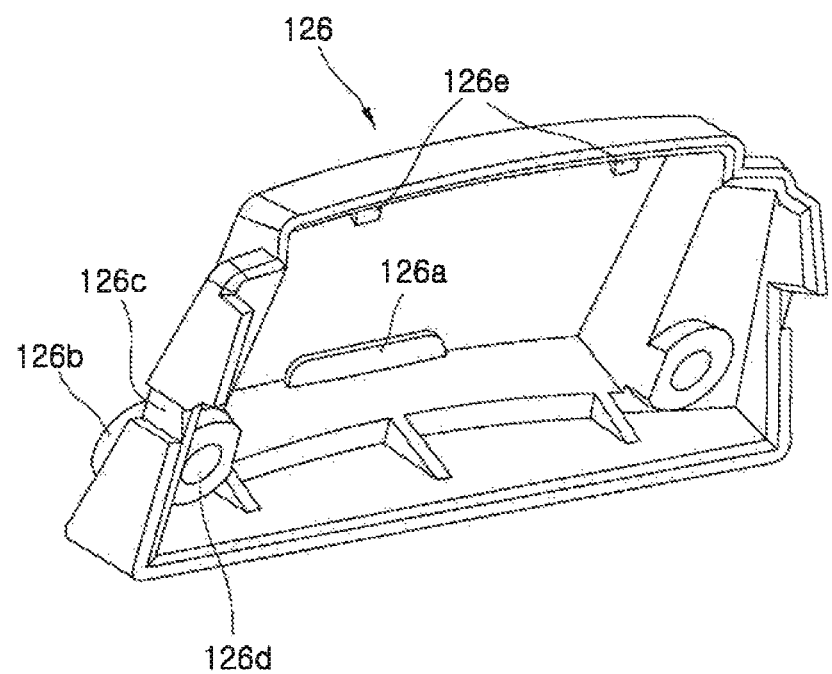
FIG. 22 is a perspective view showing a rear surface of the display housing.

FIG. 21 is a perspective view showing a display housing, and FIG. 22 is a perspective view showing a rear surface of a display housing.

The display housing 126 has a frame shape that surrounds the outer surface of the display device 125. The display housing 126 is coupled in a form of fitting with the display device 125, and the knob ring back plate 124 is fastened having the display device 125 therebetween by the fastening volt S4.

The display housing 126 includes a frame portion 126*f* surrounding the display module 125*a* of the display device 125 and a wing portion 126*w* surrounding the display board 125*b*.

The display housing 126 may be manufactured by a method of injection molding with a material having an insulating material. Insulation performance of the display housing 126 may provide protection for the display device 125 that includes electronic components.

The display housing 126 fixes the display device 125 and is coupled to the knob ring body 122.

The coupling of the display housing 126 and the knob ring body 122 is a structure for allowing the display housing 126 to be fixed in the center position with regard to the knob ring body 122 by a fitting coupling structure.

The display housing 126 is fastened to the knob ring back plate 124 by the fastening volt S4 having the display board 125*b* of the display device 125 therebetween and is not substantially fastened to the knob ring body 122. In addition, since the knob ring back plate 124 is fastened to the knob ring body 122, the display housing 126 has the structure of fastened to the knob ring body 122 through the knob ring back plate 124.

Since the display housing 126 is not directly fastened to the knob ring body 122, a structure for a position alignment with regard to the knob ring body 122 of the display housing 126 is needed.

For this, the present disclosure includes a guide protrusion 126*b* on the front surface of a wing portion 126*w* of the display housing 126, and provides a guide groove 126*c* on a side.

In addition, a front support portion 126*a* is provided on the forward side of the frame portion 126*f*. The front support portion 126*a* is protruded in a form of blocking the through hole exposed with the display device 125 and supports the front surface of the display module 125*a*, thereby serving to prevent the front surface of the display module 125*a* from being protruded at the display housing 126.

Referring to the rear surface of the display housing 126, the fastening boss 126*d* is provided. The fastening bolt S4 fastened through the knob ring back plate 124 is fastened to the fastening boss 126*d*. The fastening boss 126*d* is connected to the guide protrusion 126b on the front surface of the display housing 126 on a straight line. In other words, the fastening hole of the fastening boss 126d is connected to the inside the guide protrusion 126b.

In addition, a rear support portion 126e is provided on the rear surface of the frame portion of the display housing 126. The rear support portion 126e is supported on the front surface of the knob ring back plate 124 contacting with the rear surface of the display housing 126, thereby securing to prevent the knob ring back plate 124 from entering inside the display housing 126.

Figure 23:
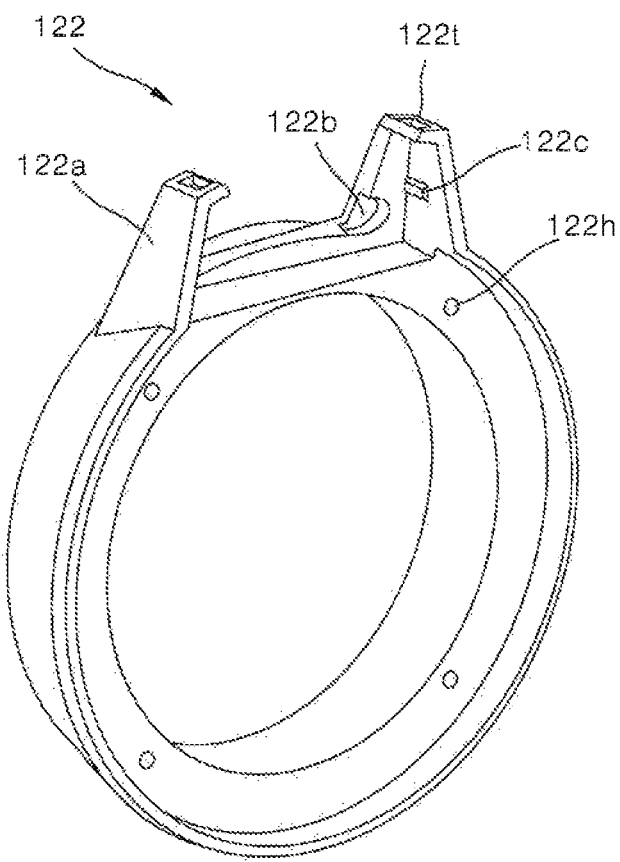
FIG. 23 is a perspective view showing a rear surface of an example knob ring of an example knob assembly.
Figure 24:
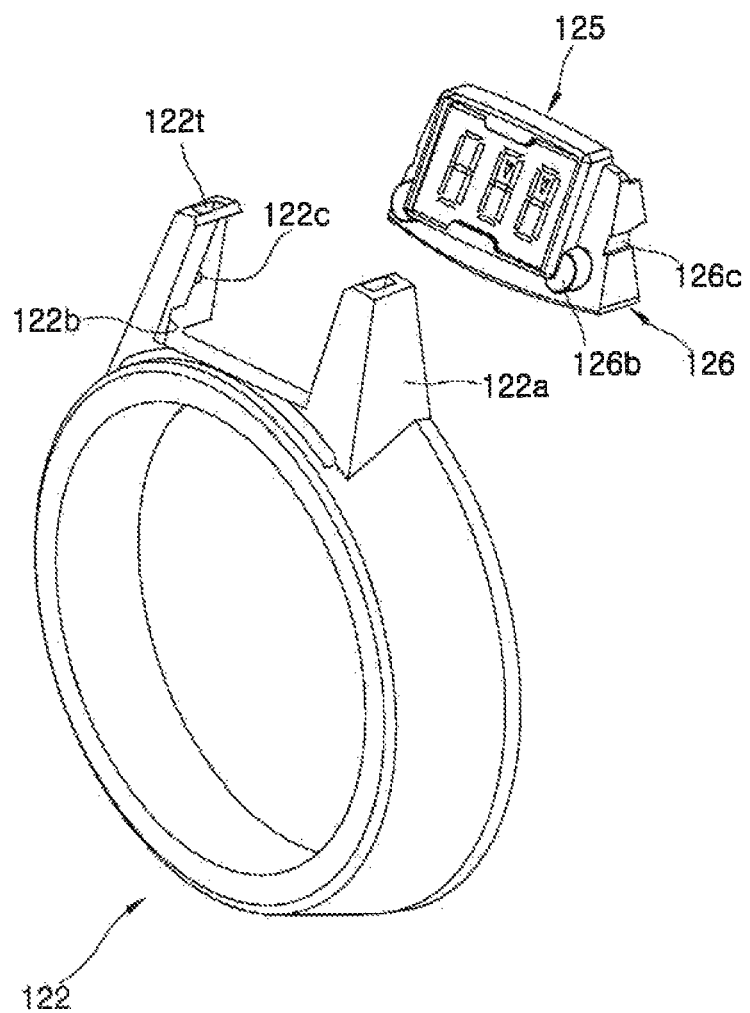
FIGS. 24 and 25 are the views showing example coupling structures, an example display device, and an example knob assembly.
Figure 25:
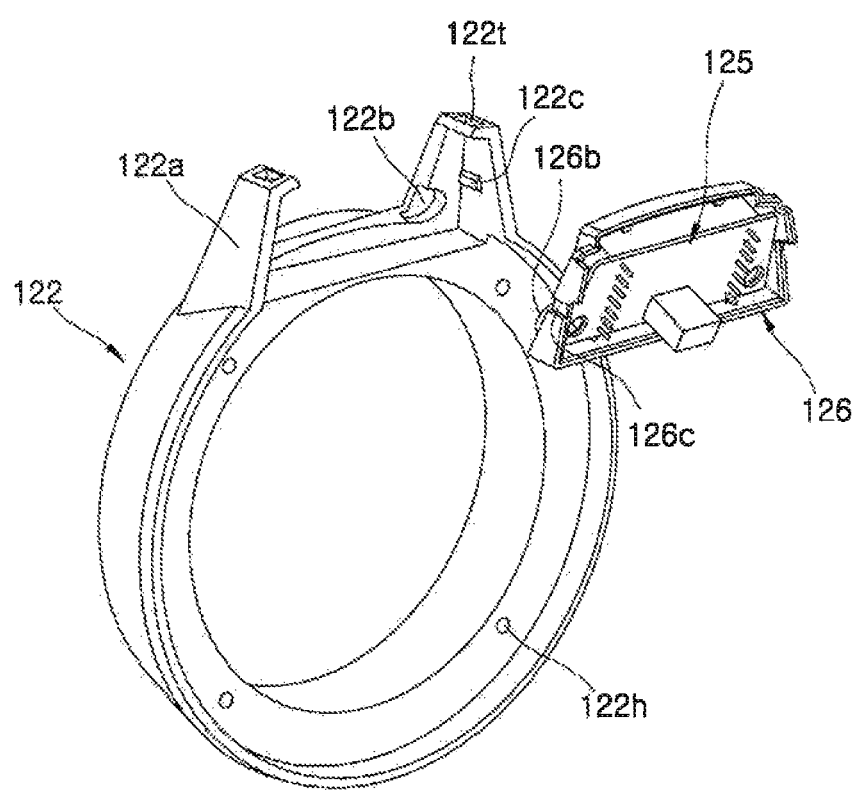

FIG. 23 is a perspective view showing a rear surface of a knob ring, and FIGS. 24 and 25 are the views for explaining a coupling structure of the display device and the knob ring of the knob assembly according to the present disclosure.

As shown, the knob ring body 122 is provided with a pair of protruding portion 122a at an upper portion. A display is coupled between the protrusion 122a.

The display device 125 is constrained to the knob ring body 122 through the display housing 126 described above.

The receiving groove 122b to which the guide protrusion 126b of the display housing 126 is provided inside the protruding portion 122a of the knob ring body 122 and the guide rail 122c to which a guide groove 126c of the display housing 126 is inserted is provided to the inner side of the protruding portion 122a.

As shown, the display housing 126 has the structure which is fitting coupled between the protruding portion 122a of the knob ring body 122 in a state of fitting the display device 125 to the display housing 126.

When the guide protrusion 126b of the display housing 126 is inserted into the receiving groove 122b of the knob ring body 122, it can prevent the up and down and left and right flow of the display housing 126.

In addition, the guide rail 122c of the knob ring body 122 is inserted into the guide groove 126c of the display housing 126 to guide the coupling of the display housings 126 and prevent the up and down directions deviation of the display housing 126.

In addition, a coupling hole 122h for fastening with the knob ring back plate 124 is provided on the rear surface of the knob ring body 122. In a state which the knob ring body 122 is directly fastened to the knob ring back plate 124 and the display device 125 is fastened to the knob ring back plate 124 together with the display housing 126, the knob ring back plate 124 is fastened to the knob ring body 122 and inserted into between the protruding protrusion 122a of the knob ring body 122 and fixed.

In some examples, the upper surface groove 122t is provided on the upper surface of the protruding portion 122a of the knob ring body 122. The upper surface groove 122t is a configuration for coupling with the display cover 127.

Figure 26:
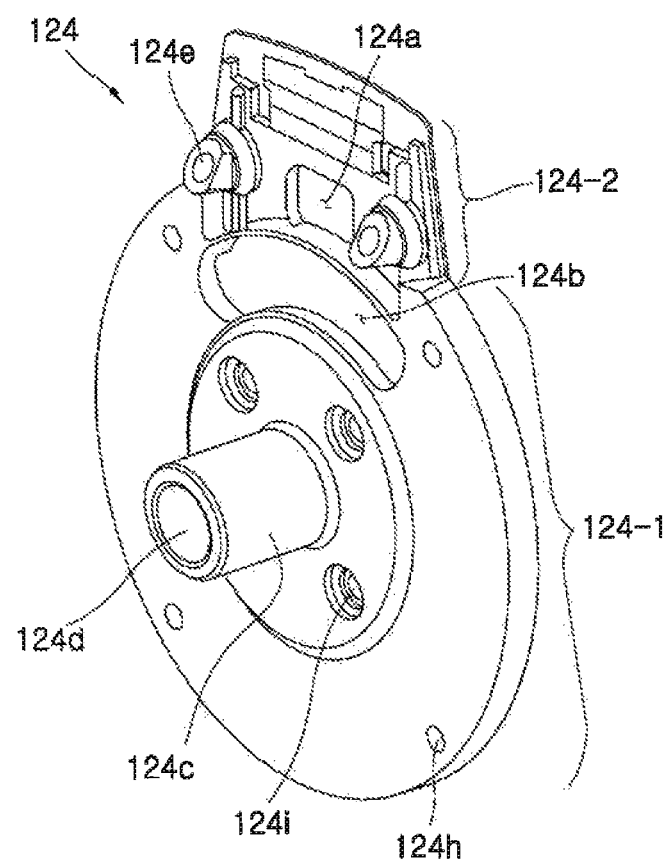
FIG. 26 is a perspective view showing an example knob ring back plate.
Figure 27:
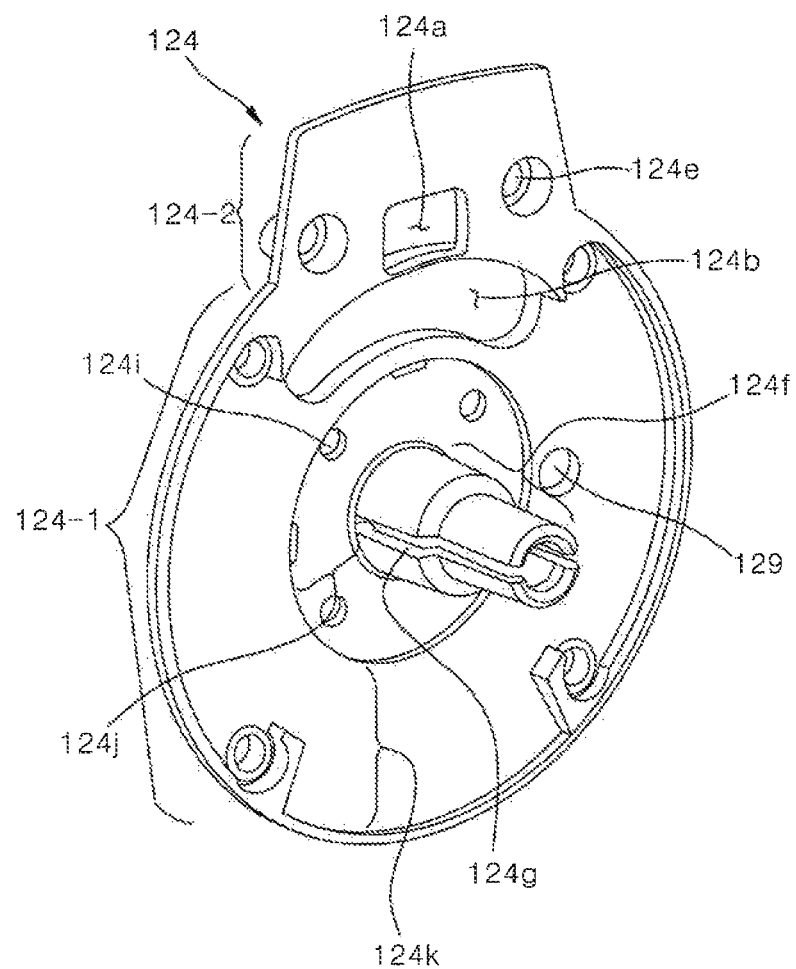
FIG. 27 is a perspective view showing a rear surface of the knob ring back plate.
Figure 28:
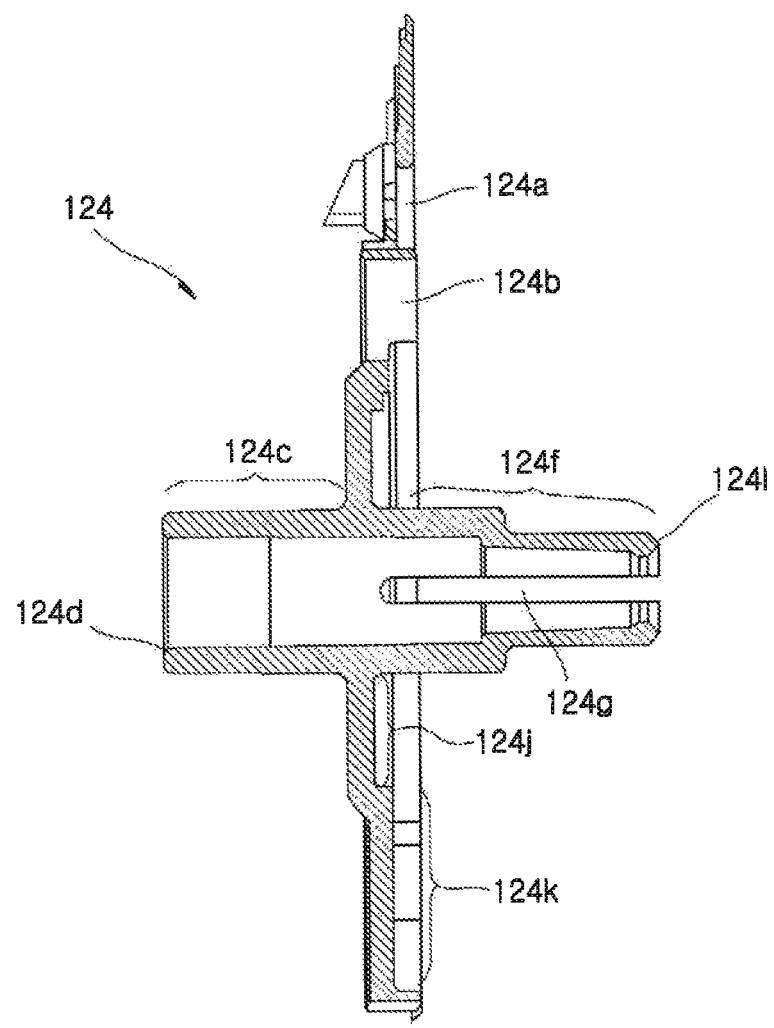
FIG. 28 is a longitudinal sectional view showing an example knob ring.

FIG. 26 is a perspective view showing a knob ring back plate, FIG. 27 is a perspective view showing a rear surface of a knob ring back plate, and FIG. 28 is a longitudinal sectional view of the knob ring back plate of the knob assembly in accordance with an exemplary implementation of the present disclosure.

As shown, the knob ring back plate 124 can be largely divided into three portion, a circular plate portion 124-1, an extended portion 124-2, and supporting pipe portion 124c, 124f.

The circular plate portion 124-1 has a circular plate shaped outer shape, and the extended portion 124-2 has a shape protruded outward so as to shield the rear surface of the protrusion of the knob body.

The supporting pipe portion includes an outer supporting pipe 124c protruded toward outside of the front panel and an inner supporting pipe 124f protruding toward inside of the front panel. The outer supporting pipe 124c and the inner support pipe 124f are formed on the same axis, and a knob shaft insertion hole 124d is formed therein.

The circular plate portion 124-1 includes an inner circular plate area 124j having a size corresponding to the actuating member 170 again and an outer circular plate area 124k having a size corresponding to the spacing plate 130.

The supporting pipe portion 124c, 124f is formed in a form protruded from the center of the circular plate portion 124-1 to both sides. The supporting pipe portions 124c, 124f serve to support the knob shaft 116 inserted therein. The knob shaft 116 and the supporting pipe portion 124c, 124f serves to mutually support. When the knob is operated, it is supported by the supporting pipe portion 124c, 124f to which the knob shaft is fixed. When the knob ring is operated, the supporting pipe portions 124c, 124f is supported by the knob shaft inserted therein.

The outer circular plate area 124k of the knob ring back plate 124 is provided with a fastening hole 124h for fastening with the knob body 112 and the inner circular plate area 124j is provided with the fastening hole 124i for fastening with the actuating member. Through this, the knob body 112 and the actuating member 170 are fastened with the knob ring back plate 124 as the medium.

In addition, the outer circular plate area 124k of the knob ring back plate 124 is provided with a bracket hole 124b through which the locking bracket penetrates and is coupled to the front panel. The bracket hole 124b is formed into an arc shape long hole by reflecting the rotation range of the knob ring.

In some examples, the inner supporting pipe 124f is divided into cut section 124g so as to have a flexibility. This is to allow the inner supporting pipe 124f to be smoothly assembled with other component during the assembly process.

The inner supporting pipe 124f is assembled in a form inserted inside the fixed frame 180 and the fixed pipe 190 are inserted inside, and at this time, when an outer diameter of the inner supporting pipe 124f is contracted, the assembly convenience can be improved. Therefore, the inner supporting pipe 124f is divided into the cut section 124g so that the outer diameter of the inner supporting pipe 124f can be contracted during the assembly process.

In some implementations, the cut section 124g cuts the inner supporting pipe 124f in the lateral direction. This results in an effect that the inner supporting pipe 124f can reduce the up and down external diameter in the up and down direction due to the pressure in the up and down direction during the assembling process.

The extended portion 124-2 is provided with a fastening hole 124e for fastening the display board 125b and the display housing 126 together. The fastening bolt S4 entering from the rear surface of the knob ring back plate 124 is fastened to the fastening boss 126d of the display housing 126 after passing through the fastening hole 125d of the display board 125b.

In addition, the extended portion 124-2 is provided with a wiring hole 124a through which the wiring connected to the connector 125c provided on the rear surface of the display board 125b passes. The assembling of the wiring is made after the assembly of the knob ring 120. After assembling the knob ring 120 to the front panel, the wiring is coupled to the connector 125c exposed through the wiring hole 124a.

The inner circular plate area 124j of the circular plate portion 124-1 has a shape protruded forward compared with the outer circular plate area 124k. This is such that the actuating member 170 is inserted into the inner circular plate area 124j so that the side of the actuating member can be supported by the side of the inner circular plate area 124j. A spacing plate 130 is received inside the outer circular plate area 124k so that the outer surface of the spacing plate 130 is supported by the side of the outer circular plate area 124k.

The knob ring back plate 124 has a complicated shape to be fastened to other configurations, and it is advantageous in manufacturing cost aspect to manufacture by injection molding.

Figure 29:
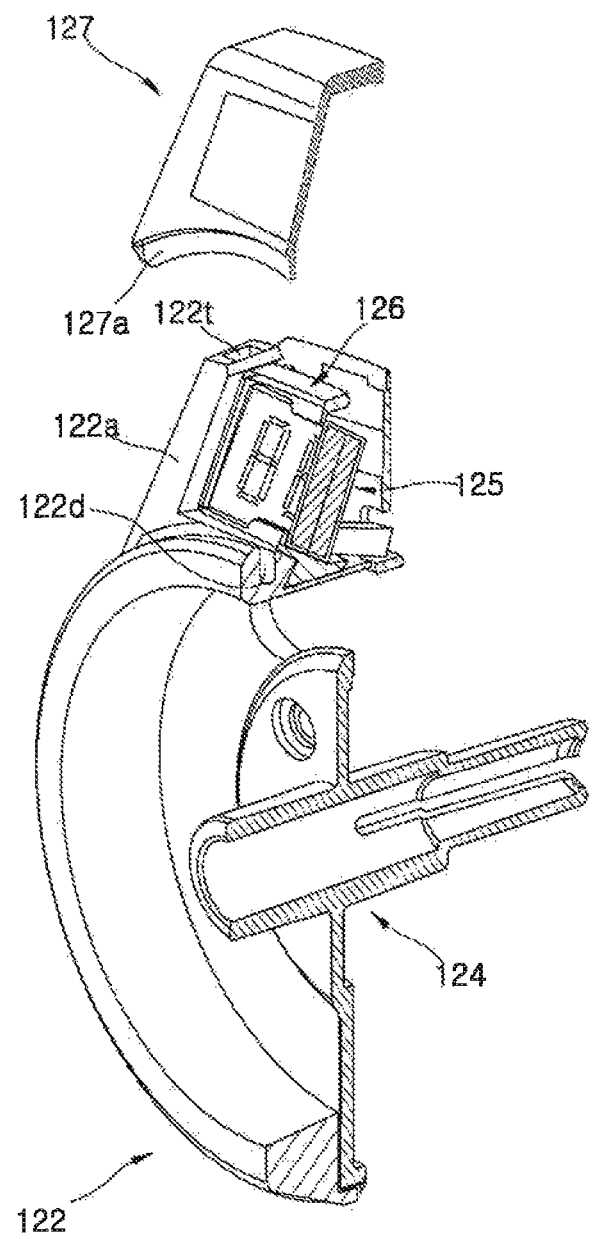
FIG. 29 is a view showing an assembly of an example display cover.
Figure 30:
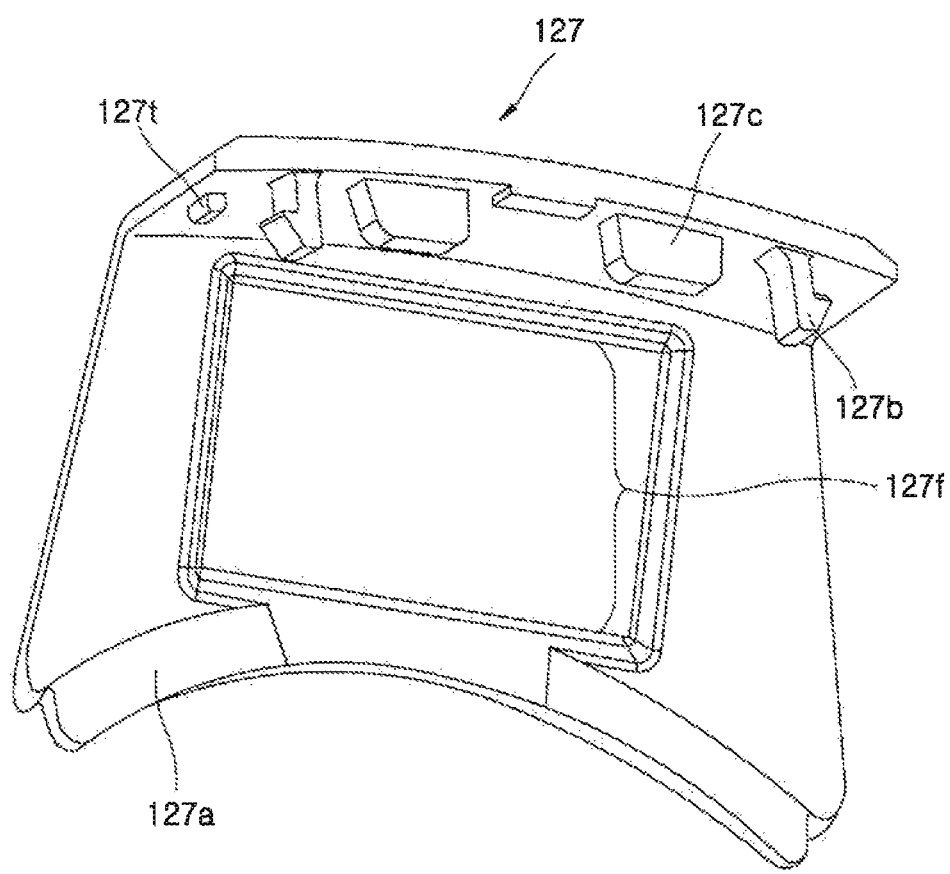
FIG. 30 is a perspective view illustrating an example display cover.
Figure 31:
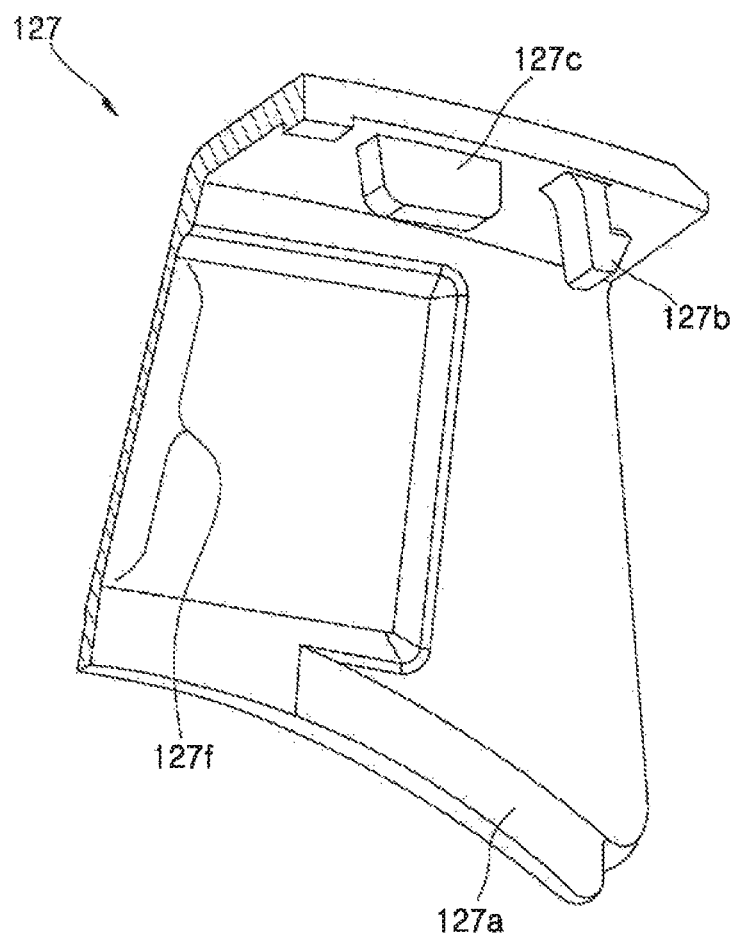
FIG. 31 is a half sectional view showing an example display cover.
Figure 32:
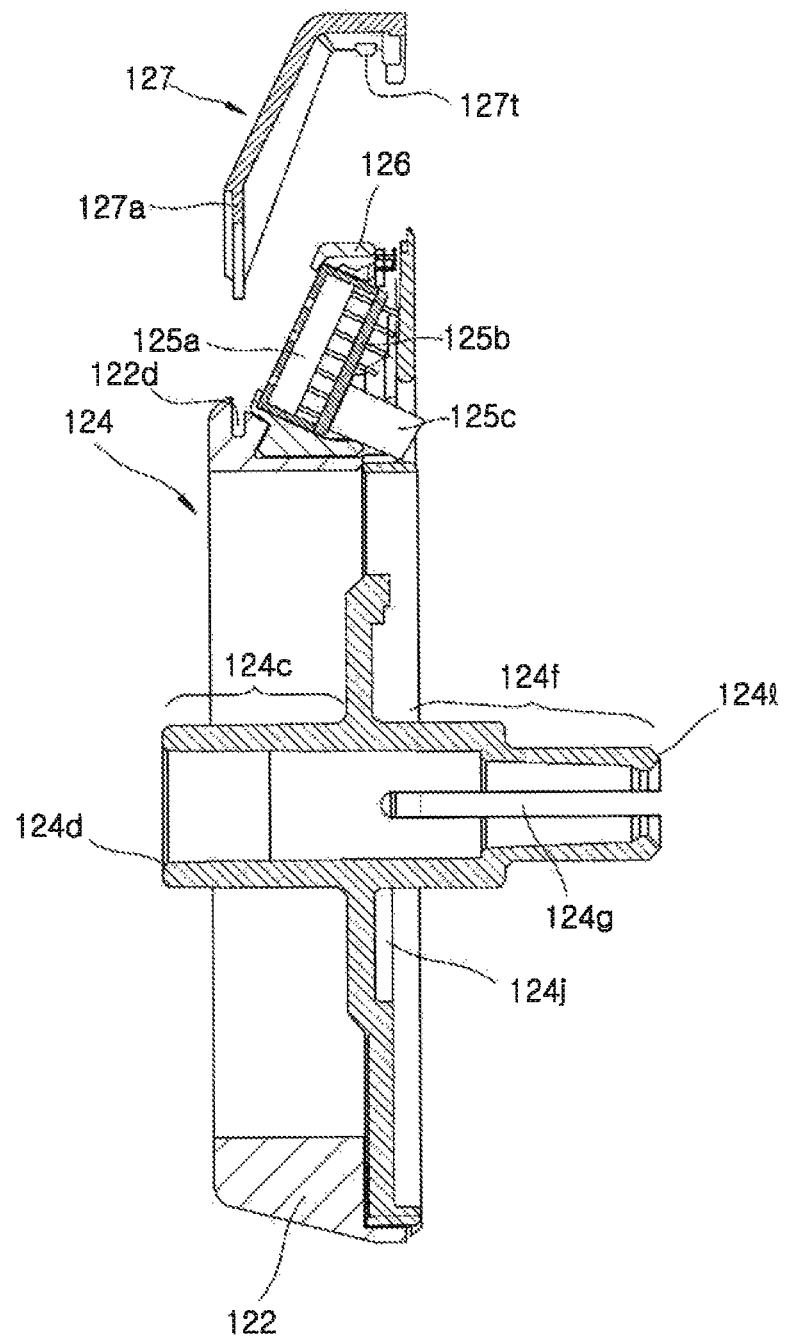
FIG. 32 is a sectional view showing an example state before the display cover of the knob assembly is coupled.
Figure 33:
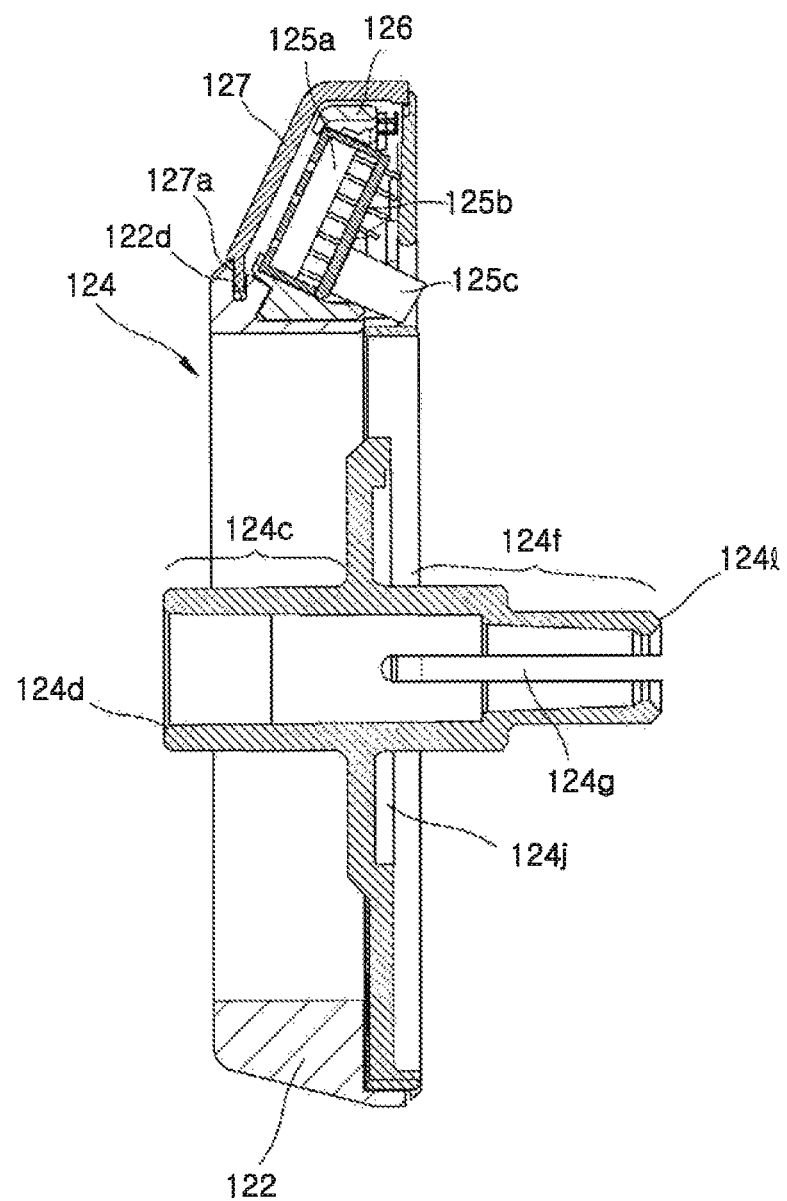
FIG. 33 is a cross-sectional view showing an example state in which an example display cover is coupled to the knob assembly.

FIG. 29 is a view for explaining the assembly of the display cover of the knob assembly in accordance with an exemplary implementation of the present disclosure, FIG. 30 is a perspective view showing the display cover of the knob assembly in accordance with an exemplary implementation of the present disclosure, FIG. 31 is a half cross sectional view showing the display cover of the knob assembly in accordance with an exemplary implementation of the present disclosure, FIG. 32 is a sectional view showing a state before the display cover of the knob assembly in accordance with an exemplary implementation of the present disclosure is coupled, and FIG. 33 is a sectional view showing a state which the display cover of the knob assembly in accordance with an exemplary implementation of the present disclosure is coupled.

As shown, the display cover 127 is configured to be coupled with the fitting coupling at the supper portion of the protrusion of the knob ring body 122 after the knob ring body 122, the knob ring back plate 124, the display device 125, and the display housing 126 are assembled.

The display cover 127 together with the knob ring body 122 forms the appearance of the knob ring.

The knob ring body 122 has a slot groove 122d into which the insertion protrusion 127a formed at a lower end of the display cover 127 is fitted. The insertion protrusion 127a is formed at the lower end of the front surface of the display cover 127 and is inserted into the slot groove 122d of the knob ring body 122. The insertion protrusion 127a of the display cover 127 is fitted into the slot groove 122d of the knob ring body 122 so that the surface of the display cover 127 aligns with the outer surface of the knob ring body 122 and is constrained. However, the insertion protrusion 127a is not fixed to the slot groove 122d, and thus, the fastening force is not generated due to the coupling of the insertion protrusion 127a and the slot groove 122d.

A pair of restraining protrusion 127b is provided on the upper bottom surface of the display cover 127. The restraining protrusion 127b is resiliently deformed and inserted into the protruding portion 122a of the knob ring body 122 and then restrained by the upper inner surface of the protruding portion 122a. The coupling force of the display cover 127 is secured by the restraining protrusion 127b.

In addition, a pair of side support protrusions 127t are provided on both sides of the upper bottom surface of the display cover 127. The side supporting protrusion 127t is fitted into the upper surface groove 122t provided on the upper surface of the knob ring body 122. The pair of side supporting protrusion 127t is constrained to the upper surface groove 122t provided in the protruding portion 122a in both sides, respectively and aligns the coupling of the knob ring body 122 with the display cover 127.

In addition, a rear surface supporting protrusion 127c is provided on the upper bottom surface of the display cover 127. The rear surface supporting protrusion 127c supports the front surface of the knob ring back plate 124 to align the coupling of the knob ring back plate 124 and the display cover.

In addition, the display cover 127 has a thin walled portion 127f having a thickness thinner than the other portion in a portion corresponding to the display portion area of the display module 125a.

In some implementations, since the display cover 127 may define the appearance, the display cover 127 may be made of a translucent material so as not to expose an inside complicated shape to the outside. By the way, the transmittance of the translucent material can be controlled by the thickness. When the portion corresponding to the display portion area of the display module 125a is made thinner than the other area, it is possible to reduce a change in brightness or color of light emitted from the display module 125a.

Next, the structure of the joint will be described.

Figure 34:
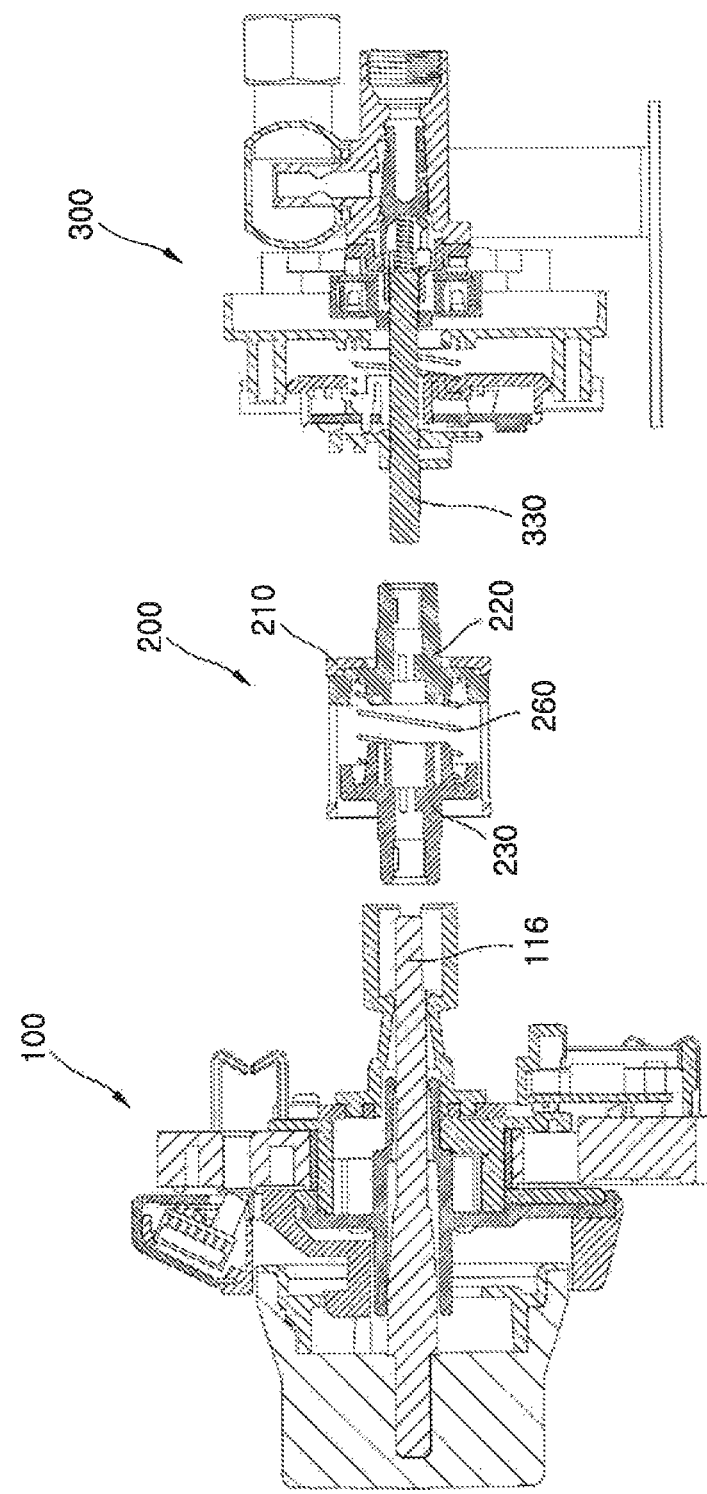
FIG. 34 is a cross-sectional view showing an example joint separated from the knob assembly.
Figure 35:
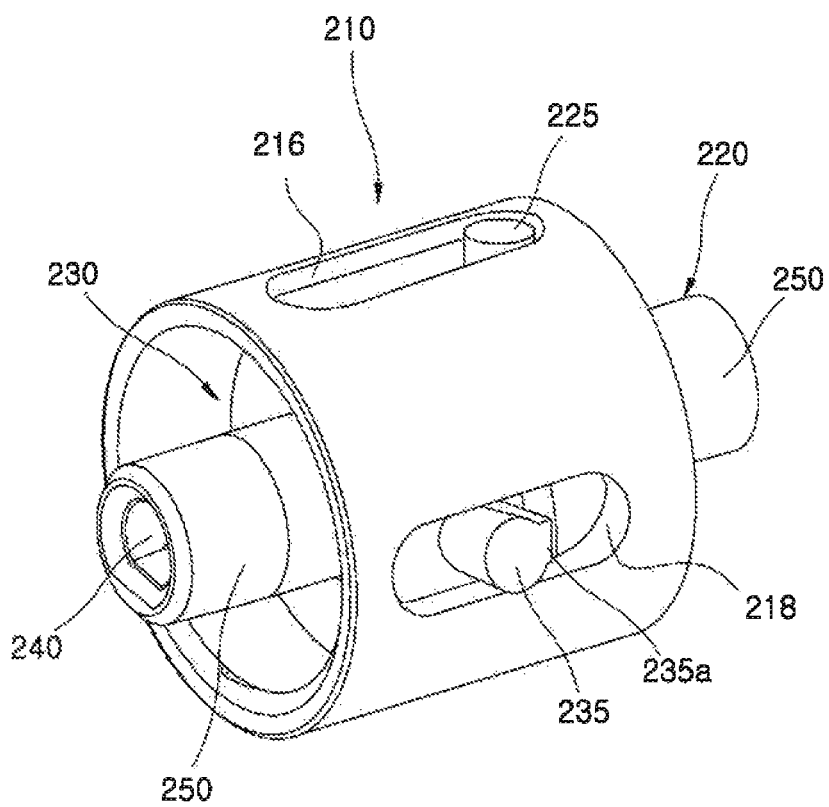
FIG. 35 is a perspective view showing an example joint of the knob assembly.
Figure 36:
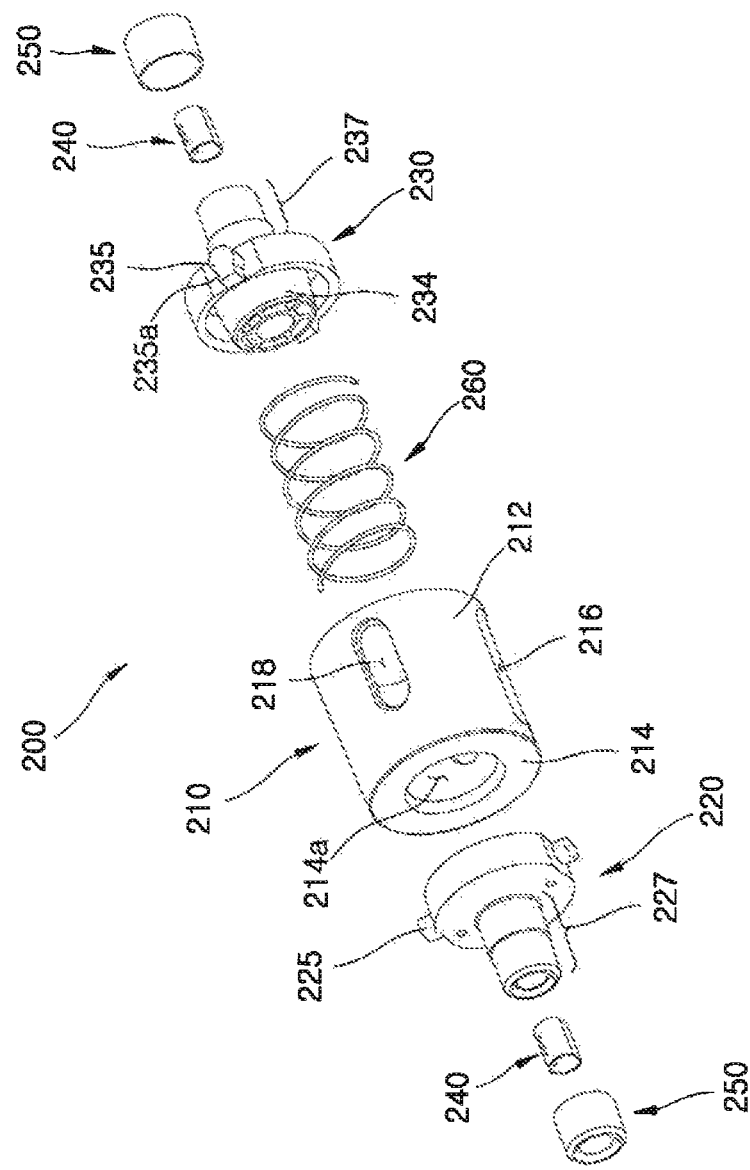
FIG. 36 is an exploded perspective view illustrating an example joint.
Figure 37:
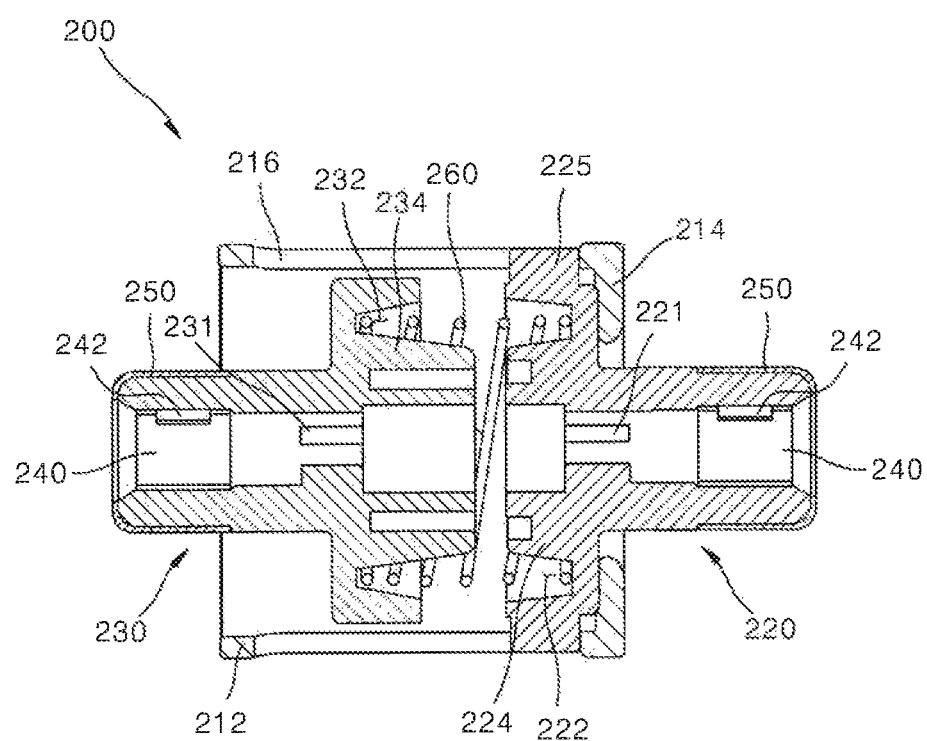
FIG. 37 is a longitudinal sectional view showing an example joint.
Figure 38:
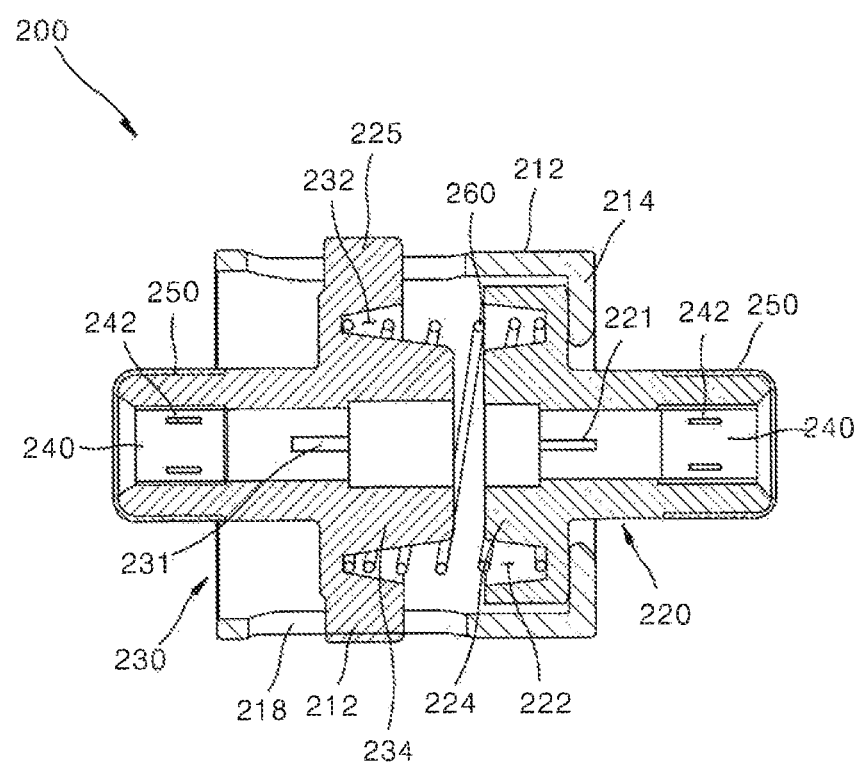
FIG. 38 is a transverse cross-sectional view showing an example joint.
Figure 40:
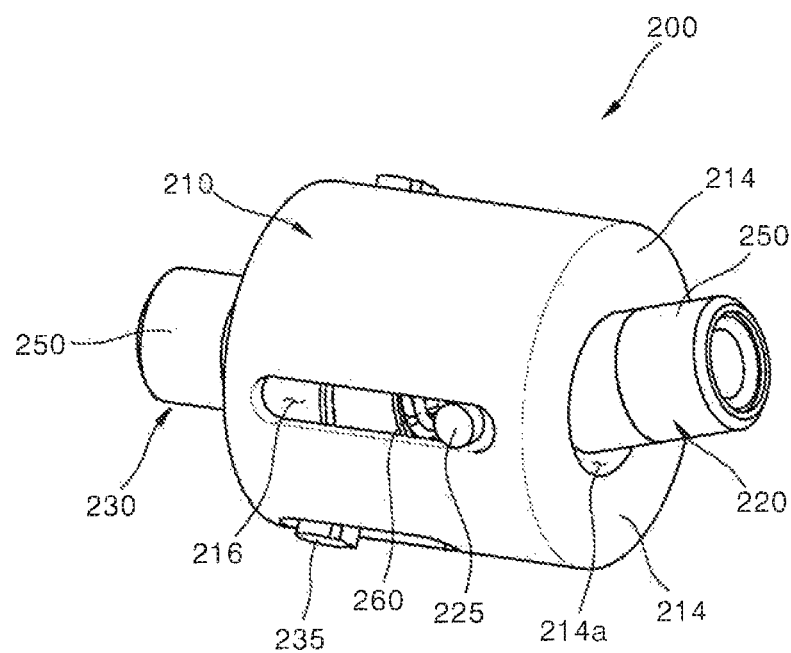
FIGS. 40 and 41 are the views illustrating rotating operation of the joint.
Figure 41:
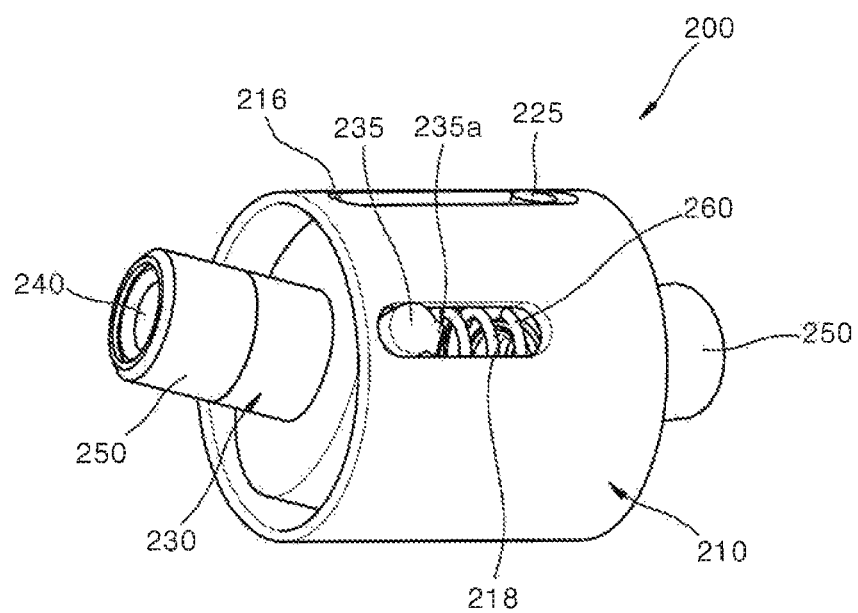

FIG. 34 is a cross section showing a state which the joint is separated from the knob assembly in accordance with an exemplary implementation of the present disclosure, FIG. 35 is a perspective view showing a joint of the knob assembly in accordance with an exemplary implementation of the present disclosure, and FIG. 36 is an exploded perspective view illustrating a joint of the knob assembly in accordance with an exemplary implementation of the present disclosure. FIG. 37 is a longitudinal cross section showing a joint of the knob assembly in accordance with an exemplary implementation of the present disclosure, FIG. 38 is a transverse sectional view showing the joint of the knob assembly in accordance with an exemplary implementation of the present disclosure, FIGS. 40 and 41 are the views for explaining a rotation operation of the joint of the knob assembly in accordance with an exemplary implementation of the present disclosure.

The joint 200 serves to connect the case assembly 100 and the valve assembly 300.

The joint 200 is fitted to the knob shaft 116 provided in the knob and the valve shaft 330 provided in the valve assembly.

The joint 200 is installed between the valve shaft 330 and the knob shaft 116 and connects the valve shaft 330 and the knob shaft 116, and it includes the joint housing 210 and the first shaft coupling portion 220, the second shaft coupling portion 230, a joint spring 260, a reinforcement insert ring 240, and a reinforcement cap 250.

The joint housing 210 has a predetermined length and is formed into a cylindrical shape formed with a hollow. At one side of the longitudinal direction of the joint housing 210, a hollow, that is, an insertion portion for opening the inner space of the joint housing 210 to the outside of the joint housing 210 is formed. In addition, a side plate portion 214 of blocking a longitudinal other side of the joint housing 210 is provided on the side facing with the insertion portion, that is, the longitudinal other side of the joint housing 210. A through hole 214a for opening the inner space of the joint housing 210 to the outside of the joint housing 210 is formed in the inner side of the side plate portion 214.

Also, a plurality of slots 216, 218 may be formed in the joint housing 210. Each slot 216, 218 is formed in a long hole shape extending along the longitudinal direction of the joint housing 210 and may be formed as the long hole shape having a predetermined width extending along the circumferential direction of the joint housing 210 and the predetermined length along the longitudinal direction of the joint housing 210.

According to the present implementation, the joint housing 210 is formed with a pair of first slot 216 and a pair of second slot 218.

The pair of first slot 216 is formed to be penetrated to the side of the joint housing 210, respectively, and viewed from longitudinal one side or other side of the joint housing 210, it is arranged to face each other.

In addition, the pair of second slot 218 is formed to be penetrated to the side of the housing forming a curved surface, respectively, and viewed from longitudinal one side or other side of the joint housing 210, it is arranged to face each other at a position different from the first slot 216.

That is, viewed from longitudinal one side or other side of the joint housing 210, the pair of first slot 216 and second slot 218 are arranged to form a cross shape.

The pair of first slot 216 arranged to face each other is inserted with the first coupling shaft 225 arranged to in a row to the first shaft coupling portion 220 such that the straight line direction movement and the rotation to the longitudinal direction of each joint housing 210 are possible. Further, the pair of second slot 218 arranged to face each other is inserted with the pair of the second coupling shaft 235 arranged in a row to the second shaft coupling portion 230 such that the straight line direction movement and the rotation to the longitudinal direction of the joint housing 210 are possible, respectively.

By the fitting coupling made between the pair of the first slot 216 and the first coupling shaft 225, the straight line direction movement and the rotation of the first shaft coupling portion 220 are possible to the joint housing 210. In addition, by the fitting coupling between the pair of the second slot 218 and the second coupling shaft 235, the straight line movement and the rotation of the second shaft coupling portion 230 can be coupled to the joint housing 210.

The first shaft coupling portion 220 is inserted to the inner space of the joint housing 210 through the insertion portion. Such first shaft coupling portion 220 is connected to any one of the valve shaft 330 and the knob shaft 116, and it includes the first coupling shaft 225 and the first shaft coupling pipe 227. In the present implementation, the first shaft coupling portion 220 is exemplified as being connected with the valve shaft 330.

The first shaft coupling portion 220 is inserted into the inner space of the joint housing 210 and coupled to the joint housing 210 by the pair of first coupling shaft 225 arranged in a row, and thus, it can be moved and rotated integrally with the first coupling shaft 225.

The first shaft coupling pipe 227 is formed to be extended to the longitudinal direction of the joint housing 210 and protruded outside the joint housing 210, and can be moved and rotated integrally with the first shaft coupling portion 220. The first shaft coupling pipe 227 is the part provided for connecting between the first shaft coupling portion 220 and the valve shaft 330, and the knob shaft 116 is coupled to the first shaft coupling pipe 227, and thus, the connection between the first shaft coupling pipe 220 and the valve shaft 330 is made.

The first shaft coupling pipe 227 is protruded to the outside the joint housing 210 via the longitudinal other side of the joint housing 210 and coupled with the valve shaft 330 from the outside the joint housing 210 and can be protruded to the outside the joint housing 210 by passing through the side plate portion 214 via the secured passage by the through hole 214a formed to be penetrated inside the side plate portion 214.

According to the present implementation, the rotation of the first shaft coupling portion 220 is made about the first coupling shaft 225 by the rotation of the first coupling shaft 225, a direction to which the end of the first shaft coupling pipe 227 faces can be changed as an angle by which the first shaft coupling portion 220 is rotated. Hereinafter, the direction to which the end of the first shaft coupling pipe 227 faces will be expressed as a position of the first shaft coupling portion 220 is changed.

The second shaft coupling portion 230 is inserted into the inner space of the joint housing 210 through the insertion portion and arranged between the insertion portion and the first shaft coupling portion 220. The second shaft coupling portion 230 is connected to other one of the valve shaft 330 and the knob shaft 116 and may include a second coupling shaft 235 and a second shaft coupling pipe 237. In the present implementation, the second shaft coupling portion 230 is illustrated as being connected to the knob shaft 116.

The second shaft coupling portion 230 is inserted into the inner space of the joint housing 210 and is coupled to the joint housing 210 by a pair of second coupling shafts 235 arranged in a row, and can be moved and rotated integrally with the second coupling shaft 235.

The second shaft coupling pipe 237 is formed to extend in the longitudinal direction of the joint housing 210 and is protruded to the outside the joint housing 210, and can be moved and rotated integrally with the second shaft coupling portion 230. The second shaft coupling pipe 237 is the portion provided for the connection between the second shaft coupling portion 230 and the knob shaft 116. The knob shaft 116 is coupled to the second shaft coupling pipe 237, and thus, the connection between second shaft coupling portion 230 and the knob shaft 116 can be made.

The second shaft coupling pipe 237 protrudes to the outside of the joint housing 210 through longitudinal one side of the joint housing 210 and is coupled to the knob shaft 116 from the outside the joint housing 210, and may be protruded to the outside the joint housing 210 through the secured passage by the insertion portion.

According to the present implementation, when the rotation of the second shaft coupling portion 230 is made about the second coupling shaft 235 by the rotation of the second coupling shaft 235, the direction to which the end of the second shaft coupling pipe 237 faces may be changed by the angle at which the second shaft coupling portion 230 is rotated. Hereinafter, the direction to which the end of the second shaft coupling pipe 237 changes will be expressed as a change in the posture of the second shaft coupling portion 230.

The joint spring 260 is inserted into the inner space of the joint housing 210 through the insertion portion and arranged between the first shaft coupling portion 220 and the second shaft coupling portion 230. The joint spring 260 provides elastic force for recovering the positions of the first shaft coupling portion 220 and the second coupling portion 230 changed by the straight line direction movement of the shaft coupling portion 220, 230, and a posture of the first shaft coupling portion 220 and the second shaft coupling portion 230 changed by the rotation of the shaft coupling pipe 227, 237.

In the present implementation, the joint spring 260 is illustrated as including a coil spring formed to have a length extended along the longitudinal direction of the joint housing 210. Longitudinal one side of the joint spring 260 is coupled to the first shaft coupling portion 220 and the longitudinal other side of the joint spring 260 is coupled to the second shaft coupling portion 230. The joint spring 260 is provided such that an elastic stretch to the longitudinal direction and the elastic bending deformation to the rotational direction of the first shaft coupling portion 220 or the second shaft coupling portion 230.

The inner surfaces of the first shaft coupling portion 220 and the second shaft coupling portion 230 facing each other, for example, the outer surface of the support boss 224, 234 is formed with a fitting groove 222, 232 fitting coupled on the longitudinal both sides of the joint spring 260.

Both ends of the joint spring 260 becomes a state received in the fitting groove 222 provided in the first shaft coupling portion 220 and the fitting groove 232 provided in the second shaft coupling portion 230. In addition, since the supporting boss 224 of the first shaft coupling portion 220 and the support boss 234 of the second shaft coupling portion 230 become an inserted state inside the joint spring 260, the elastic force is provided to the direction which the spacing between the first shaft coupling portion 220 and the second shaft coupling portion 230 is spaced apart in a state to which the joint spring 260 is stably fixed.

In the joint 200, the first shaft coupling portion 220 is rotatably coupled to the joint housing 210 in any one of the up and down direction and the left and right direction, and the second shaft coupling portion 230 is rotatably coupled to the joint housing 210 in the other one direction of the up and down direction and the left and right direction.

That is, the joint 200 of the present implementation can transmit the rotational motion of the knob shaft 116 to the valve shaft 330 while connecting the valve shaft 330 and the knob shaft 116 with one flexible shaft in a form which the first shaft coupling portion 220 is connected to the valve shaft 330 and the second shaft coupling portion 230 is connected to the knob shaft 116.

When the direction to which the valve shaft 330 extends does not coincide or align with the direction to which the knob shaft 16 extends due to the tolerance of the valve shaft 330 generated in the valve assembly 300, with regard to the joint 200, as a posture of at least any one of the first shaft coupling portion 220 and the second shaft coupling portion 230 changes, the connecting angle between the first shaft coupling portion 220 and the second shaft coupling portion 230 is changed, thereby absorbing the tolerance of the valve shaft 330 generated in the valve assembly 300.

At this time, in the process of connecting the joint 200 to the valve shaft 330 and the knob shaft 116, the operator does not have to adjust the connection angle between the first shaft coupling portion 220 and the second shaft coupling portion 230. When the valve shaft 330 and the knob shaft 116 are connected to both ends of the joint 200 so that the postures of the first shaft coupling portion 220 and the second shaft coupling portion 230 are changed to a state for suitable to connect the valve shaft 330 and the knob shaft 116.

In some examples, since the postures of the first shaft coupling portion 220 and the second shaft coupling portion 230 can be maintained or changed according to the situation by the elastic force provided by the joint spring 260, separate work for fixing these postures may not be required.

In some example, the joint 200 according to the implementation of the present disclosure also serves to transmit a longitudinal motion of the shaft.

Figure 39:
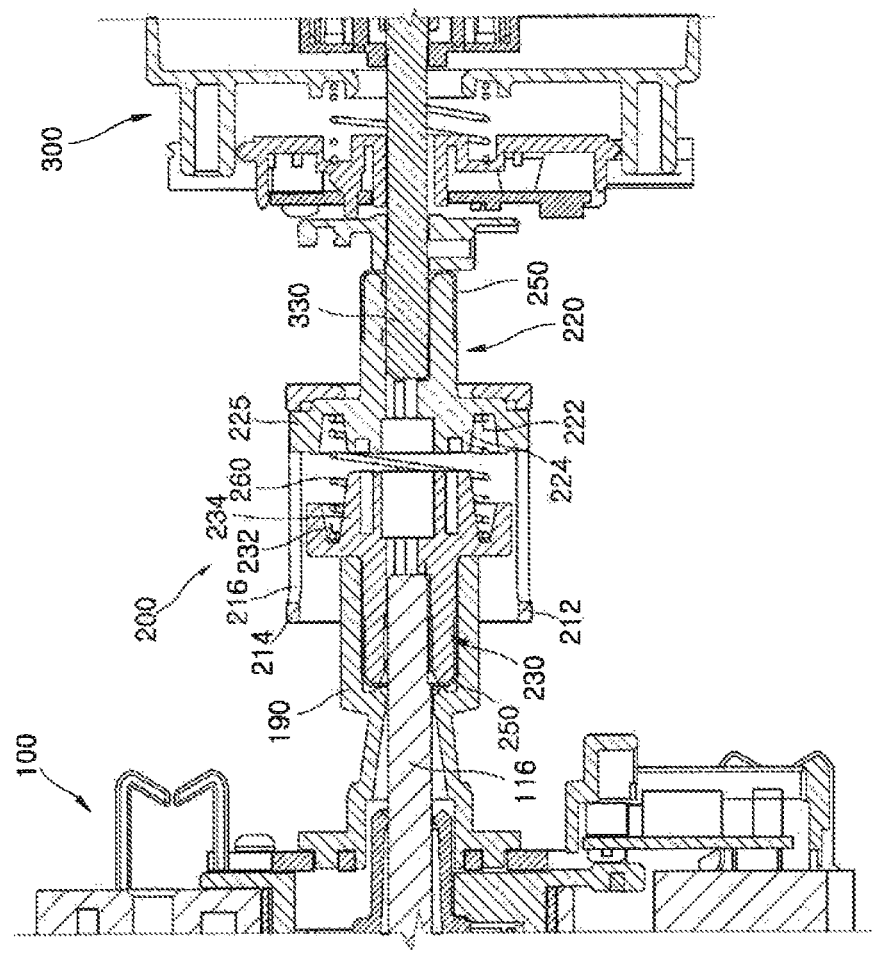
FIG. 39 is a cross-sectional view showing an example joint portion.

As shown in FIG. 39, in a state which the joint 200 is assembled to the knob assembly, it has the state which the joint spring 260 is compressed. At this time, the support boss 224 of the first shaft coupling portion 220 and the support boss 234 of the second shaft coupling portion 230 are spaced apart from by a predetermined spacing. However, when the stroke in which the knob is pushed is greater than the spacing between the supporting boss 224, 234, the axial motion of the first shaft coupling portion 220 is transmitted to the motion of the second shaft coupling portion 230, and thus, the valve shaft 330 can be pushed.

The structure may result in an effect that the longitudinal error of the shaft can be absorbed at a spacing between the supporting boss 224, 234 even when the longitudinal error or the tolerance of the shaft is generated in a manufacturing process of the knob shaft 116 or the valve shaft 330.

The reinforcement cap 250 is coupled to the outside the shaft coupling pipe 227, 237 and a reinforcement insert ring 240 is coupled inside the shaft coupling pipes 227, 237. The reinforcement cap 250 and the reinforcement insert ring 240 can be coupled in a fixing method.

The knob shaft 116 and the valve shaft 330 inserted into the shaft coupling pipe 227, 237 have a D-shaped cross section. The shaft coupling pipe 227, 237 is continuously subjected to a torsion torque in a state which the knob shaft 116 and the valve shaft 330 are coupled. The first shaft coupling portion 220 and the second shaft coupling portion 230 may be manufactured by an injection molding method using a synthetic resin material. In this case, the shaft coupling pipe 227, 237 is a synthetic resin material. In some examples, it is general that the knob shaft 116 and the valve shaft 330 are the metal material.

When the torsion torque is continuously subjected in a state which the knob shaft 116 having a D-shaped cross section and the valve shaft 330 are coupled inside the shaft coupling pipe 227, 237 which is the synthetic resin material, the shaft coupling pipe 227, 237 can be damaged.

In order to secure the durability of the shaft coupling pipe 227, 237, it has the structure that the reinforcement cap 250 of metal material surrounds the outer circumferential surface of the shaft coupling pipe 227, 237, and the reinforcement insert ring 240 surrounds the inner circumferential surface of the shaft coupling pipe 227, 237.

Such structure reinforces the strength of the shaft coupling pipe 227, 237, thereby improving the durability of the joint 200.

In some examples, the reinforcement insert ring 240 is provided with a slit 242. The slit 242 serves to secure the flexibility such that it can be restored to the original shape after the cross section of the reinforcement insert ring 240 is changed by corresponding to the rotating valve shaft 330 or the knob shaft 116, even when the valve shaft 330 or the knob shaft 116 having the D-shaped cross section is rotated inside the reinforcement insert ring 240 having the D-shaped cross section.

In addition, inside the shaft coupling pipe 227, 237 is provided with a blocking protrusion 221, 231 for limiting the coupling depth of the knob shaft 116 or the valve shaft 330. The knob shaft 116 and the valve shaft 330 contact with the blocking protrusions 221, 231 so that it cannot be inserted beyond the above, thereby adjusting the coupling depth between the knob shaft 116 and the valve shaft 330. The blocking protrusion 221, 231 serves to transmit the axial motion of the knob shaft 116 to the first shaft coupling portion 220 and transmit the axial motion of the second shaft coupling portion 230 to the valve shaft 330.

The joint 200 having the above-described configuration can be assembled in the following manner.

Firstly, the first shaft coupling portion 220 is tilted and inserted inside the joint housing 210 through the insertion hole and then the first coupling shaft 225 is fitted into the first slot 216 to make the assembly of the joint housing 210 and the first shaft coupling portion 220. At this time, when the rotation direction of the first shaft coupling portion 220 is left and right direction, the direction of tilting the first shaft coupling portion 220 in order to insert the first shaft coupling portion 220 inside the joint housing 210 is up and down direction.

Then, after inserting the joint spring 260 inside the joint housing 210 through the insertion portion, the second shaft coupling portion 230 is inserted by tilting, and then the second coupling shaft 235 is fitted into the second slot 218, so as to form an assembly between the joint housing 210 and the second shaft coupling portion 230. At this time, when the rotation direction of the second shaft coupling portion 230 is the up and down directions, in order to insert the second shaft coupling portion 230 inside the joint housing 210, the direction of tilting the second shaft coupling portion 230 is the left and right directions.

In this process, the joint springs 260 can be stably coupled to the first shaft coupling portion 220 and the second shaft coupling portion 230 in a state that the longitudinal both sides thereof are fitted into the fitting groove 222 and the longitudinal both sides of the movement are constrained.

As described above, the assembly of the joint 200 according to the present implementation is made by fitting the first shaft coupling portion 220 to the joint housing 210 and assembling it, and inserting the joint spring 260 to the joint housing 210, and subsequently, fitting the second shaft coupling portion 230 to the housing and assembling it.

For example, the assembly of the joint 200 can be easily and quickly made only by a sequential fitting operation without using separate fastening structure or an adhesive. In this example, since the joint 200 includes only four parts, the manufacturing and the management of the part is easy and the assembly of the joint 200 can be made more easily and quickly.

In some implementations, when the assembly of the joint 200 is completed, the fitting coupling state of the first shaft coupling portion 220 and the second shaft coupling portion 230 is stably maintained by the elastic force provided by the joint spring 260, and thus, the assembly of the joint 200 is not optionally released during use of the joint 200.

The joint 200 serves to absorb the position error of the valve shaft 330 between the knob shaft 116 and the valve shaft 330 and provides the structure that the rotation of the first shaft coupling portion 220 and the second shaft coupling portion 230 is possible in order to absorb the position error of the valve shaft 330. However, it needs a structure for limiting the rotation range of the first shaft coupling portion 220 and the second shaft coupling portion 230, that is, the posture change range of the first shaft coupling portion 220 and the second shaft coupling portion 230 within the necessary range, according to the property of the product which the joint 200 is installed.

The posture change range of the first shaft coupling portion 220 is determined by the size of the through hole 214a. For example, the first shaft coupling portion 220 can be rotated only within a range in which interference between the inner circumferential surface of the first shaft coupling pipe 227 and the side plate portion 214 is not generated, and the further rotation of the first shaft coupling portion 220 is limited from the point in which the interference between the inner circumferential surface of the first shaft coupling pipe 227 and the side plate portion 214 is generated. Therefore, the posture change range of the first shaft coupling portion 220 is determined by the size of the through hole 214a whose the first shaft coupling portion 22y determines the size of the passage for passing through the side plate portion 214.

In other words, the rotation of the first shaft coupling portion 220, that is, the posture change of the first shaft coupling portion 220 is limited to the range between the point which the interference between the inner circumferential surface of the side plate portion 214 and the first shaft coupling pipe 227 at the time of one direction rotation of the first shaft coupling portion 220 and the point which the interference between the inner circumferential surface of the side plate portion 214 and the first shaft coupling pipe 227 is made at the time of the other side rotation of the first shaft coupling portion 220.

According to the present implementation, the size of the through hole 214a is determined such that the inner diameter of the side plate portion 214 formed with the through hole 214a is larger than the outer diameter of the first shaft coupling pipe 227 and is smaller than the inner diameter of the joint housing 210. At this time, the size of the through hole 214a can be suitably adjusted depending on the posture change range of the first shaft coupling portion 220 to be established. That is, by increasing the size of the through hole 214a close to the inner diameter of the joint housing 210, the posture change range of the first shaft coupling portion 220 can be enlarged, and by reducing the size of the through hole 214a close to the outer diameter of the first shaft coupling pipe 227, the posture change range of the first shaft coupling portion 220 can be reduced.

The second coupling shaft 235 provided in the second shaft coupling portion 230 may include a stopper 235a.

The stopper 235a is formed so as to be protruded outside the second coupling shaft 235 and the position inside the second slot 218 in accordance with the rotation of the second coupling shaft 235 is changed. The stopper 235a is arranged inside the second slot 218 such that the interference with the inner wall of the joint housing 210 formed by the second slot 218 at a set position is made.

According to the present implementation, the second slot 218 is formed with a width corresponding to the outer diameter of the second coupling shaft 235 (the outer diameter except the stopper). That is, the second slot 218 is formed so that the width of the second slot 218 and the outer diameter of the second coupling shaft 235 are identical, the coupling between the second shaft coupling portion 230 and the joint housing 210 can be made without generating a rattling when the second shaft coupling portion 230 moves and rotates on the joint housing 210 and it can be applied to even the coupling between the first shaft coupling portion 220 and the joint housing 210.

In addition, the stopper 235a is formed so as to be protruded toward the inside of the second slot 218 and is formed to be protruded with narrower width than the width of the second slot 218. Thus formed stopper 235a is rotated together with the second coupling shaft 235 when the rotation of the second coupling shaft 235 is made, and when the rotation of the second coupling shaft 235 is made by the predetermined angle or more, it is interfered with the inner wall of the joint housing 210 formed by the second slot 218, thereby limiting further rotation of the second coupling shaft 235.

In other words, the rotation of the second shaft coupling portion 230, that is, the posture change of the second shaft coupling portion 230 is limited to the range between the point which the interference between the inner wall of the joint housing 210 and the stopper 235a at the time of one direction rotation of the second shaft coupling portion 230 is made and the point which the interference between the inner wall of the joint housing 210 and the stopper 235a is made at the time of the other direction rotation of the second shaft coupling portion 230.

As another example, instead of providing the stopper 235a on the second coupling shaft 235, the structure for the posture change range limitation of the second shaft coupling portion 230 may be formed in a form identical to the structure for limiting the posture change range of the first shaft coupling portion 220.

That is, a structure for limiting the posture change range of the second shaft coupling portion 230 may be formed in a form of adjusting the posture change range of the second shaft coupling portion 230 by covering the side plate portion 214 on longitudinal one side portion of the joint housing 210 and adjusting the size of the through hole 214a formed in the inner side of the side plate portion 214.

However, when the structure for limiting the posture change range of the second shaft coupling portion 230 is formed as such form, unlike the side plate portion 214 integrally formed with the joint housing 210 at the longitudinal other portion of the joint housing 210, the side plate portion at longitudinal one side portion of the joint housing 210 has to be provided in the form of separate cap shaped part form separable from the joint housing 210.

When even the side plate portion of longitudinal one side portion of the joint housing 210 is integrally formed with the joint housing 210, the passage to be inserted inside the joint housing 210 in order to assembly the parts such as the first shaft coupling portion 220, the second shaft coupling portion 230, and the joint spring 260 are blocked.

However, as such, when the side plate portion of one side portion in the longitudinal direction of the joint housing 210 is provided in the form of separate cap-shaped part, the number of parts for manufacturing the joint 200 is added to that extent, and as the number of parts is added, the process for manufacturing it is added. Therefore, the part management is much more difficult and the cost and time required for the manufacturing of the joint 200 is increased to that extent.

In consideration of this point, instead of adding the part in separate cap shape, by taking the structure of adding the stopper 235a for limiting the rotation of the second coupling portion 230 as the protrusion form integrally formed with the second coupling shaft 235, the joint 200 of the present implementation forms the structure of adjusting the posture change range of the second shaft coupling portion without adding separate part.

In some implementations, the joint 200 of the present implementation may be a structure that can be assembled with four parts including the fewer number of parts, for example, the joint housing 210, the first shaft coupling portion 220, the second shaft coupling portion 230, and the joint spring 260. In this case, the part management and the assembly work may be facilitated, and cost and time required for the manufacturing of the joint 200 may be reduced.

Figure 42:
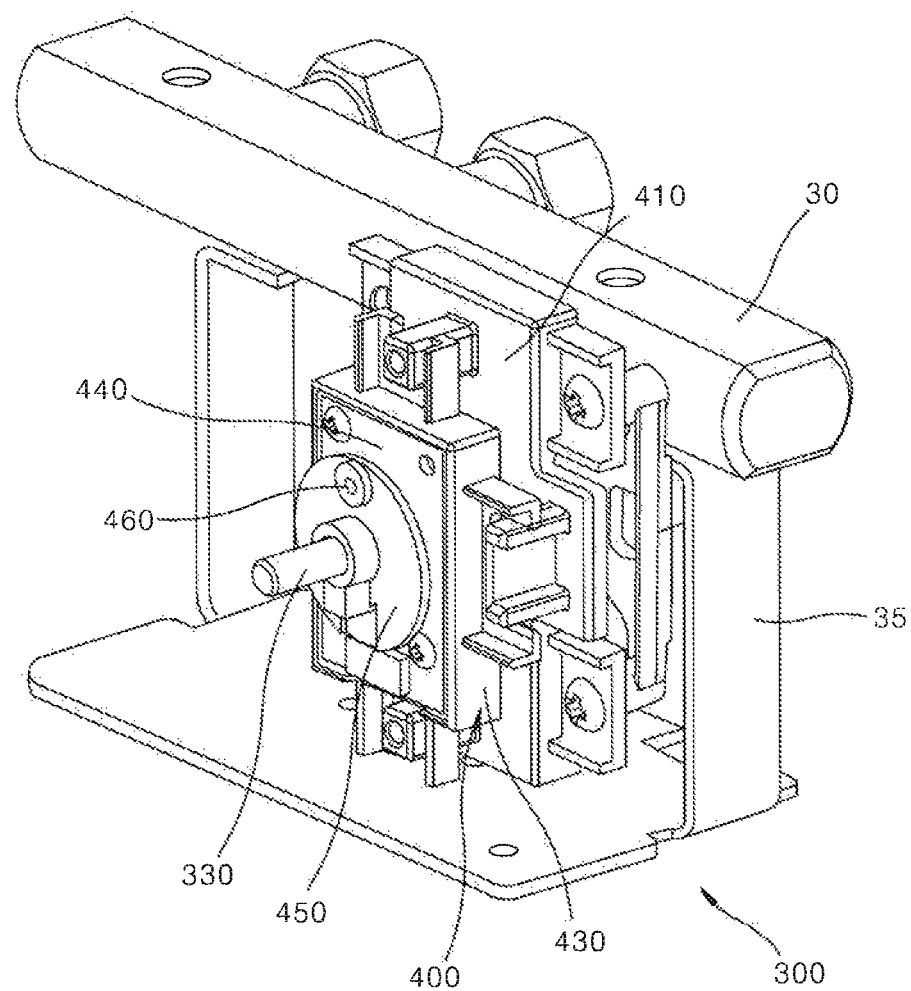
FIG. 42 is a perspective view of an example valve assembly.
Figure 43:
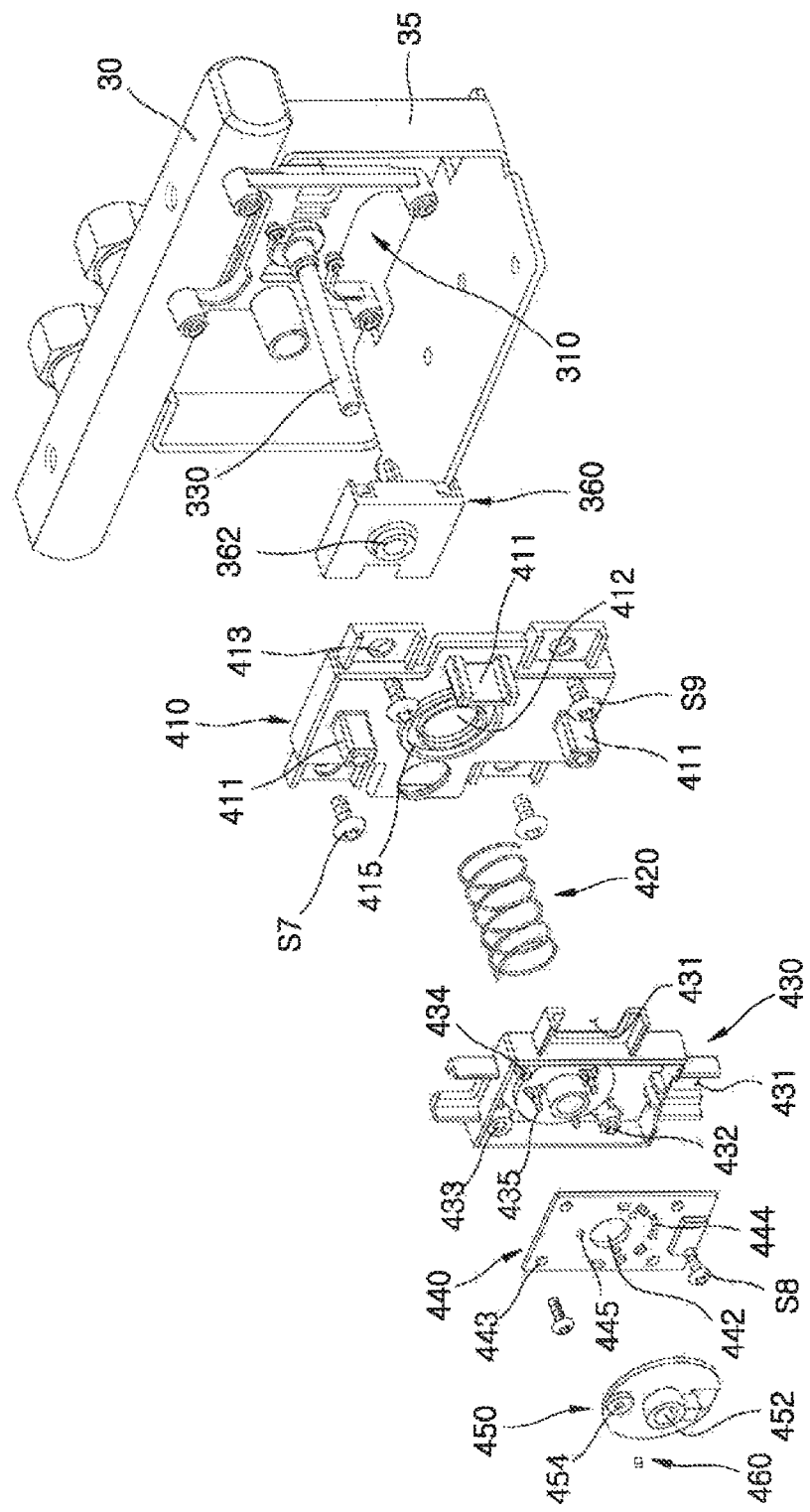
FIG. 43 is an exploded perspective view showing the valve assembly.

FIG. 42 is a perspective view showing a valve assembly of the knob assembly in accordance with an exemplary implementation of the present disclosure, and FIG. 43 is a perspective view showing a state in which the valve assembly of the knob assembly in accordance with an exemplary implementation of the present disclosure is separated.

As shown, the valve assembly 300 includes a valve 310 coupled to the gas pipe frame 35 and the gas pipe 30, an ignition switch 360 fitted to the valve shaft 330 of the valve 310, and the knob sensor 400.

The knob sensor 400 includes a knob sensor plate 410 fastened to the valve 310, a knob sensor housing 430 movably coupled to the knob sensor plate 410 in an axial direction, a sensor spring 420 providing the elastic force between the knob sensor housing 430 and the knob sensor plate 410, a knob sensor board 440 having the Hall sensor 444 and fastened to the knob sensor housing 430, and a rotating plate 450 coupled with a knob sensor magnet 460 which is coupled to the valve shaft, rotates integrally with the valve shaft, and sensed by the Hall sensor 444.

The ignition switch 360 has a valve shaft coupling hole 362 having a D-shaped cross section, and is coupled to the valve shaft. Therefore, the ignition switch 360 receives the rotational force of the valve shaft, so that the on/off state of the valve shaft can be switched by the rotational angle. When the valve shaft is rotated by a predetermined angle, the ignition switch 360 becomes on state, it servers to making a spark be generated in the burner.

Figure 44:
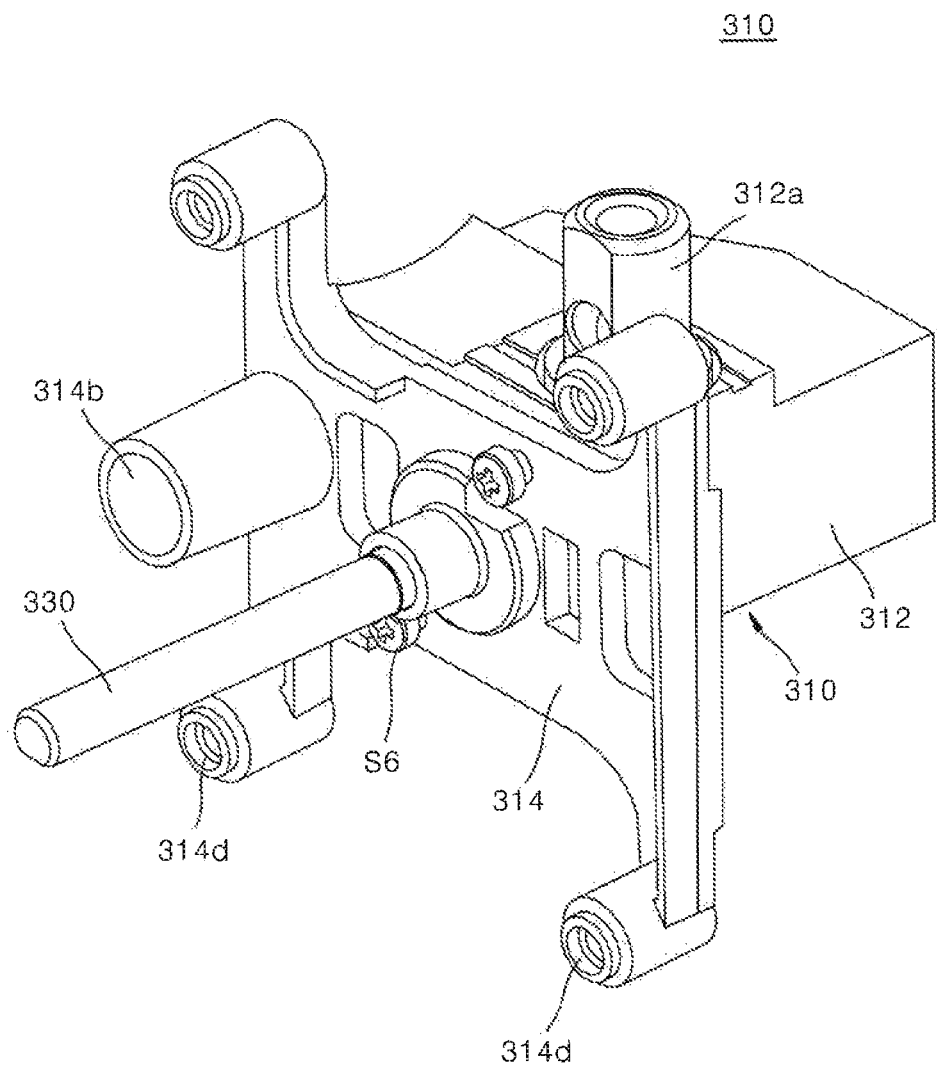
FIG. 44 is a perspective view showing an example valve.
Figure 45:
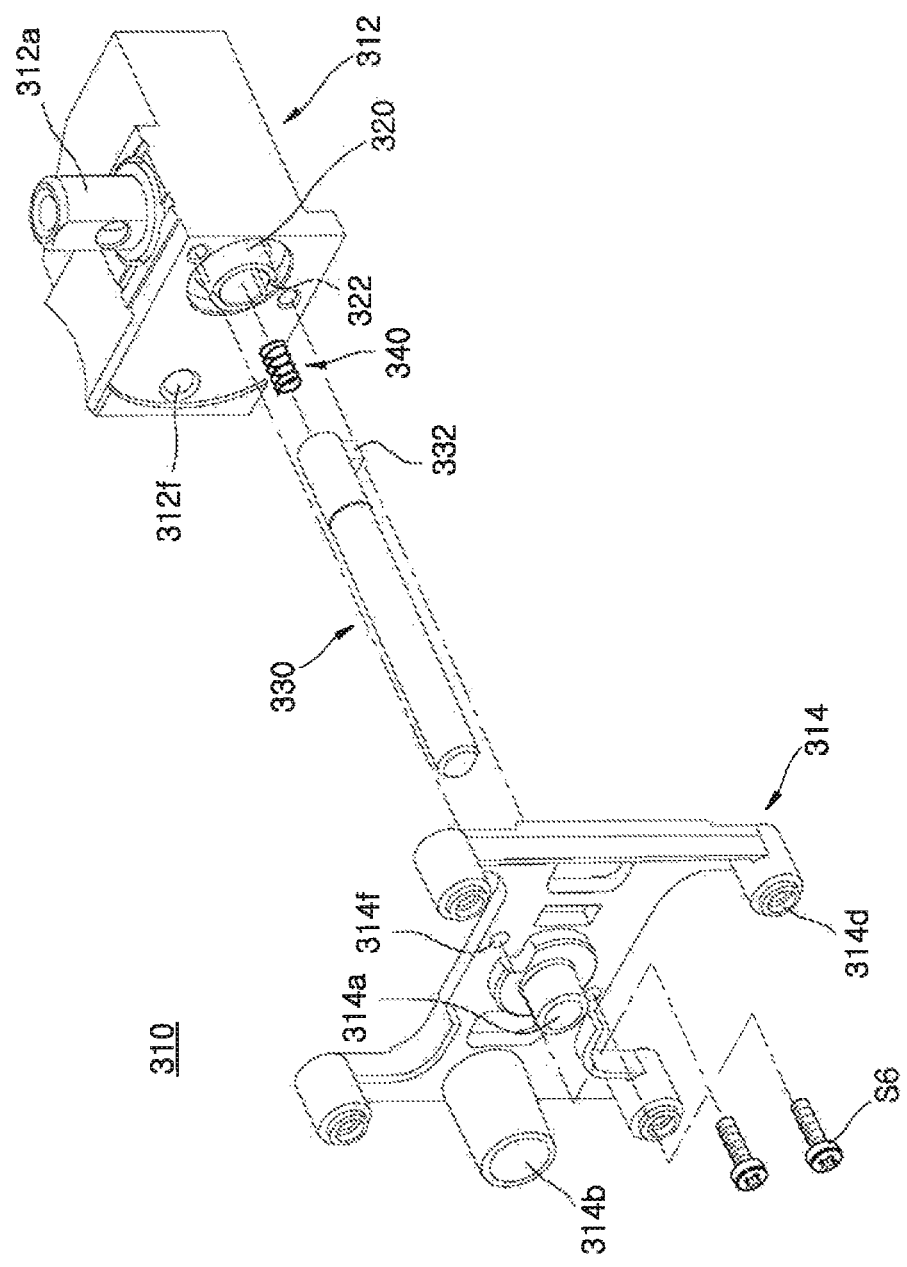
FIG. 45 is an exploded perspective view showing an example valve.
Figure 46:
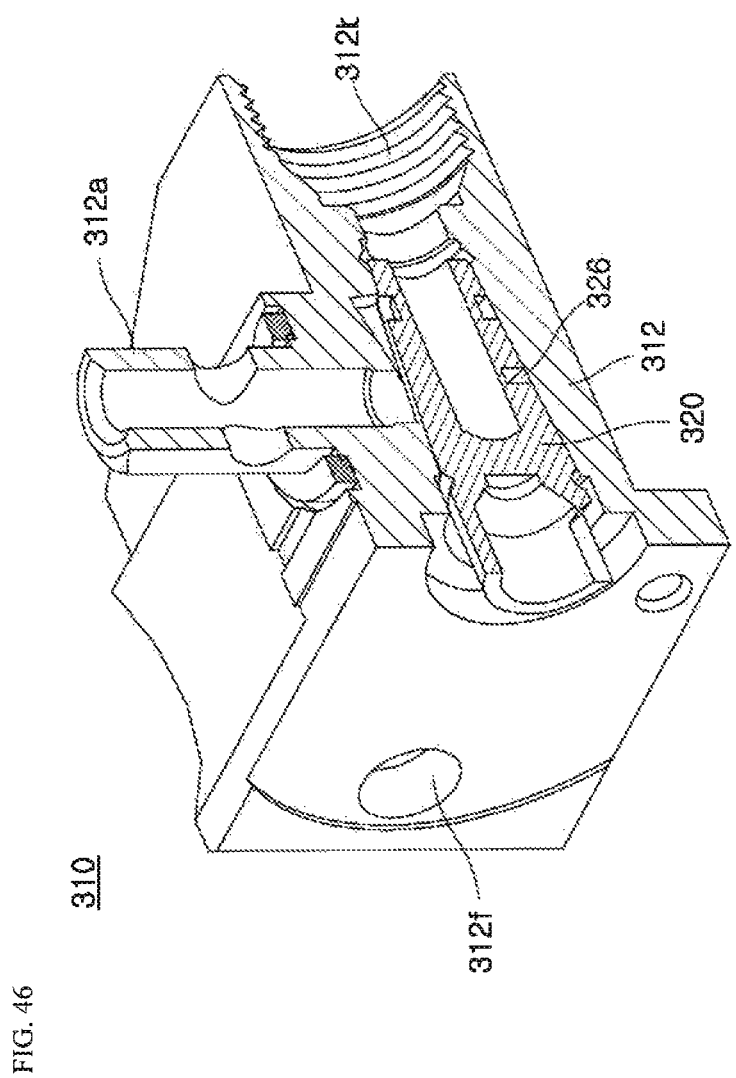
FIG. 46 is a longitudinal sectional view showing an example valve.
Figure 47:
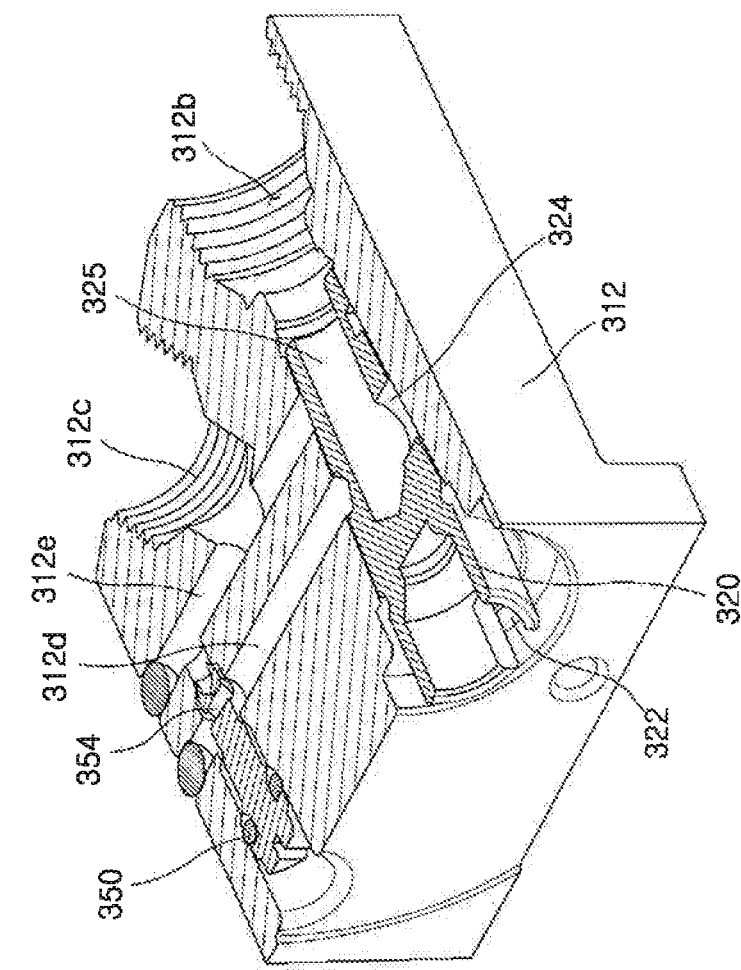
FIG. 47 is a transverse cross-sectional view showing an example valve.

FIG. 44 is a perspective view of showing a valve, FIG. 45 is an exploded perspective view of a valve, FIG. 46 is a longitudinal sectional view of a valve of a knob assembly according to the present disclosure, and FIG. 47 is a transverse cross-sectional view of a valve.

As shown, the valve 310 includes a valve body 312, a valve cap 314, a main adjustment piece 320, a valve shaft 330, a valve spring 340, and an auxiliary adjustment piece 350.

The main adjustment piece 320 and the auxiliary adjustment piece 350 are arranged inside the valve body 312.

The valve body 312 includes an inflow pipe 312a connected to the gas pipe, and a first gas supply pipe connecting portion 312b connected to the burner, and a second supply pipe connecting portion 312c.

In addition, inside the valve body 312, the first flow path 312d connecting the outer circumferential surface space of the main adjustment piece 320 and the auxiliary adjustment piece 350, and the second flow path 312e connecting the auxiliary adjustment piece 350 and the second supply pipe connecting portion 312c.

The main adjustment piece 320 and the auxiliary adjustment piece 350 have the rotation center parallel to the longitudinal direction of the valve shaft and arranged inside the valve body 312.

The main adjustment piece 320 includes a connection hole 325 formed from the rear surface to the front surface, an opening and closing hole 324 penetrating through the inner and outer circumferential surface of the connection hole 325, and a groove 326 formed along the outer circumferential surface in one side of the opening and closing hole 324.

The auxiliary adjustment piece 350 may include a T-shaped adjustment hole 354 capable of adjusting the amount which gas supplied through the first flow path 312d to the second flow path 312e.

The main adjustment piece 320 has a structure for adjusting the gas supply flow rate according to the degree of which the opening and closing hole 324 and the inflow pipe 312a are overlapped. Gas introduced through the opening and closing hole 324 is supplied to the first gas supply pipe connection portion 312b through the connection hole 325.

At this time, gas supplied through the groove 326 formed on the outer circumferential surface of the main adjustment piece 320 is also supplied through the first flow path 312d. In gas supplied through the first flow path 312d, the flow rate supplied to the second supply pipe connecting portion 312c is adjusted according to the overlapped degree of an adjustment hole 354 of the auxiliary adjustment piece 350 and the first flow path 312d.

The main adjustment piece 320 is adjusted by the valve shaft 330 and the auxiliary adjustment piece 350 is adjusted by separate tool such as a driver.

The auxiliary adjustment piece 350 is for fine adjustment of the amount of gas to be supplied, and may not be adjusted after one adjustment according to the installation environment, and may be adjusted by a service engineers rather than being adjusted by the user.

If an access to the auxiliary adjustment piece 350 is not easy, an excessive disassembly operation of the cooking appliance may be needed for the repair engineers to adjust the auxiliary adjustment piece 350.

Figure 57:
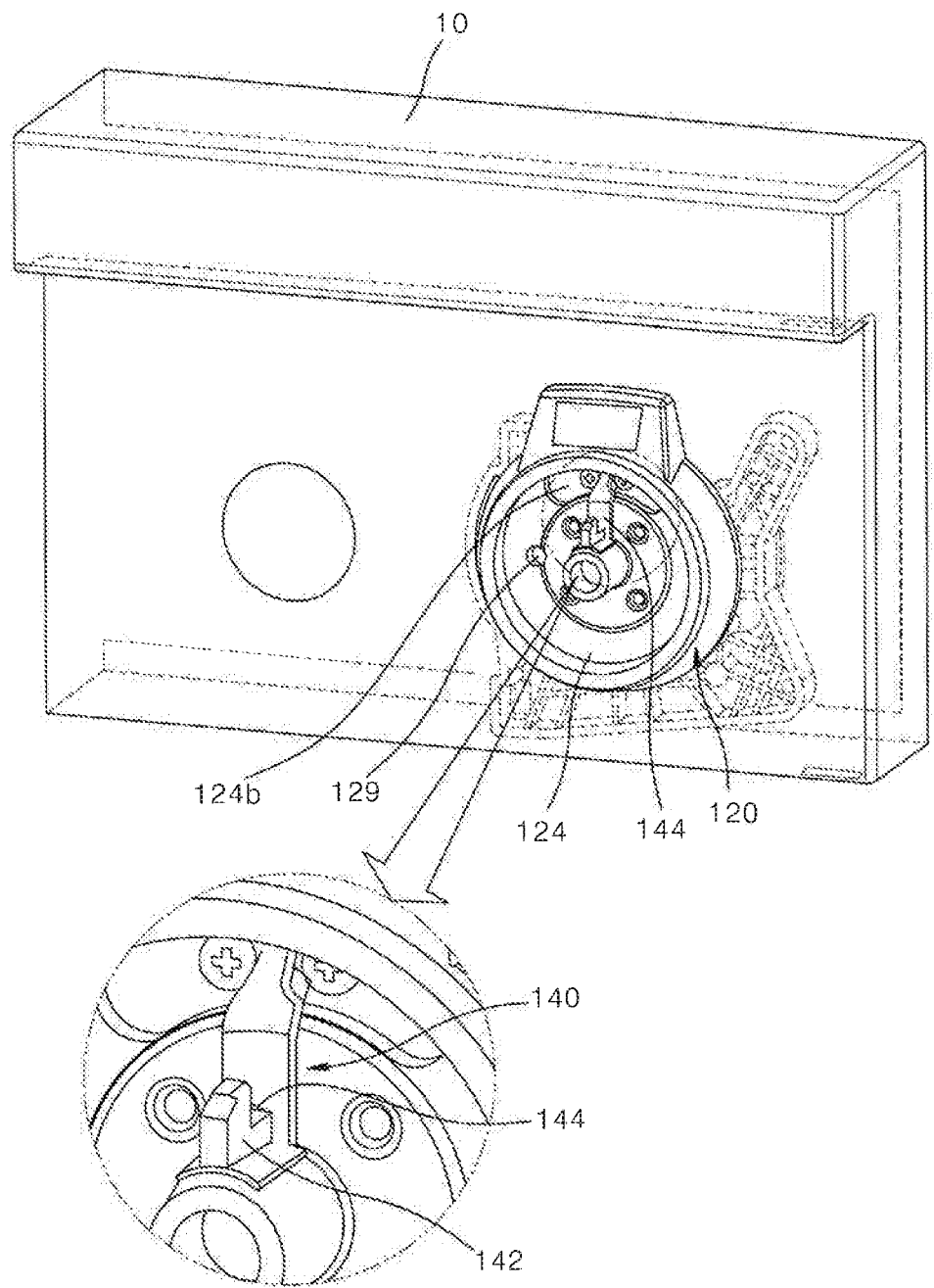
FIG. 57 is a perspective view showing an example state in which the knob of the knob assembly is separated.

In the present disclosure, the auxiliary adjustment piece 350 is arranged adjacent to one side of the main adjustment piece 320, and after separating the knob, the service hole 129 in FIG. 57 may provide an access to the auxiliary adjustment piece 350.

The main adjustment piece 320 has a key groove 322 into which a key 332 provided on the valve shaft 330 is inserted and a valve spring 340 is arranged between the main adjustment piece 320 and the valve shaft 330. The valve spring 340 provides the elastic force to a direction which the valve shaft 330 is spaced apart from the main adjustment piece 320, and provides a structure that the rotation of the valve shaft 330 is transmitted to the main adjustment piece 320 by pressing the valve shaft 330 in a axial direction and inserting the key 332 of the valve shaft 330 to a key groove 322 of the main adjustment piece 320.

The assembly process of the valve 310 is made method by coupling the main adjustment piece 320 and the auxiliary adjustment piece 350 to the valve body 312, and fastening the valve cap 314 in the valve body 312 in a state that the valve spring 340 and the valve shaft 330 are fitted into the main adjustment piece 320. The fastening of the valve cap 314 and the valve body 312 may be made by the method of penetrating the fastening hole 314f formed in the valve cap 314 and fastening to the fastening hole 314f formed in the valve body 312 by using the fastening volt S6.

The valve cap 314 according to the present disclosure includes a sensor fixed portion 314d for fixing the knob sensor 400 described below, and a service hole 314b of providing a path in which the tool is accessible with the auxiliary adjustment piece 350. The service hole 314b is provided with the knob assembly provided in the front of the valve 310 and the front panel is provided with the service hole aligned with the service hole 314b. The sensor fixed portion 314d is fastened with the knob sensor plate 410 of the knob sensor 400.

Figure 48:
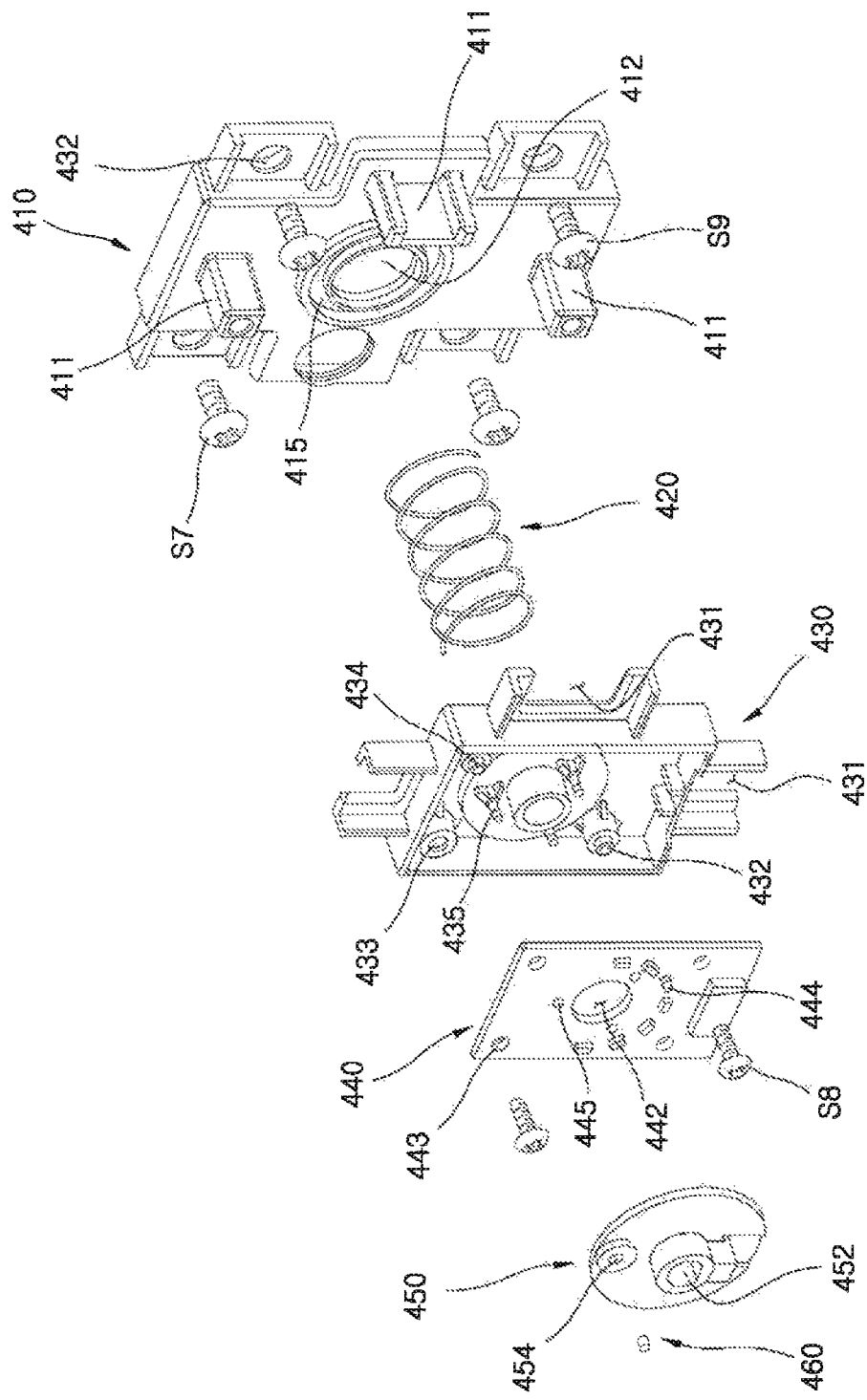
FIG. 48 is an exploded perspective view showing an example knob sensor.
Figure 49:
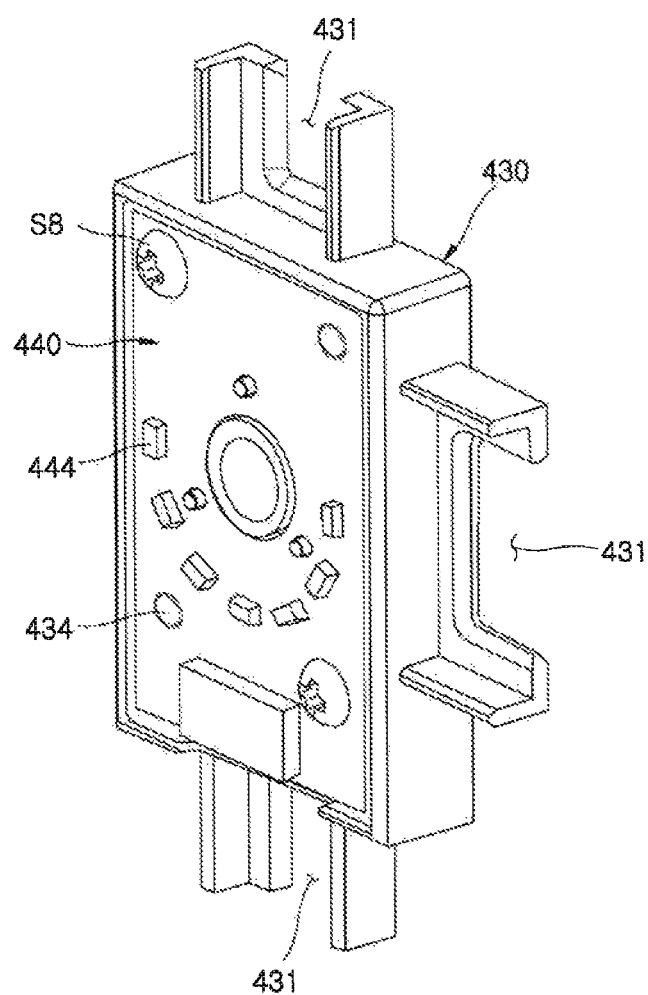
FIG. 49 is a perspective view showing an example knob sensor board.
Figure 50:
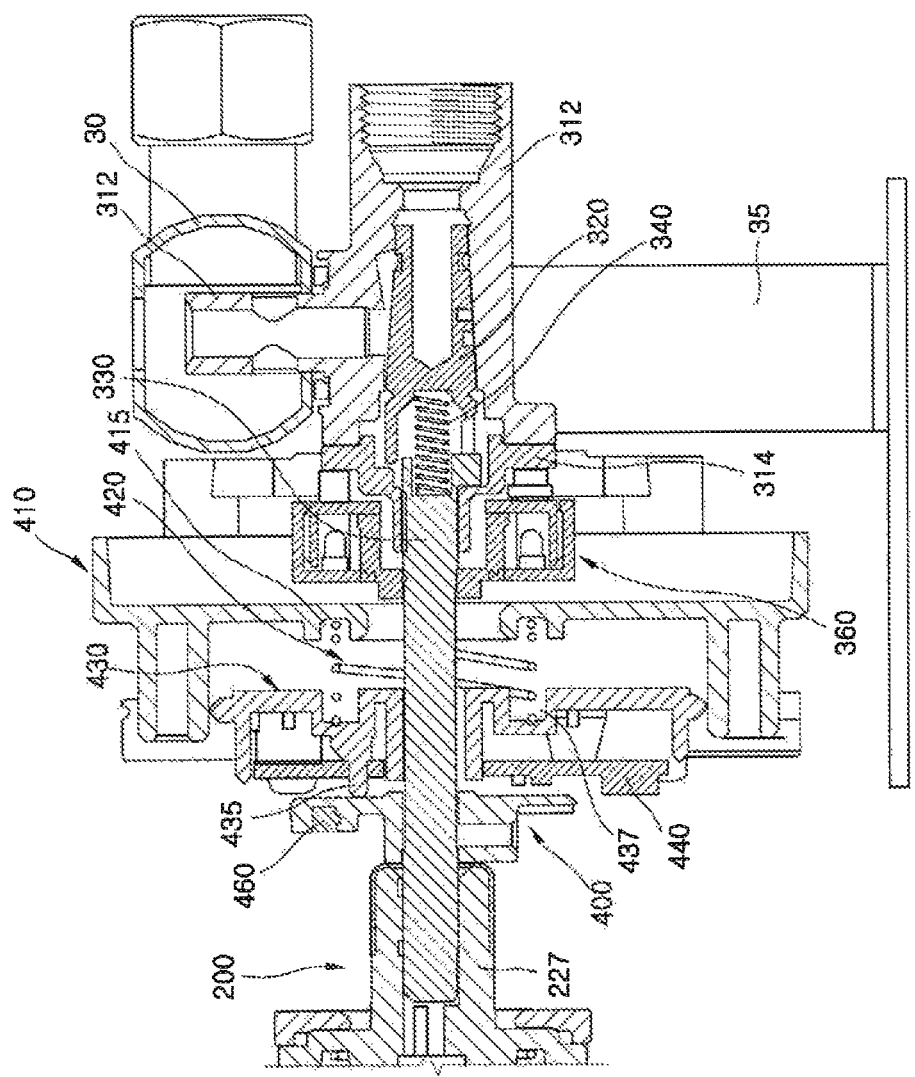
FIGS. 50 and 51 are the sectional views showing example operations of the valve assembly.
Figure 51:
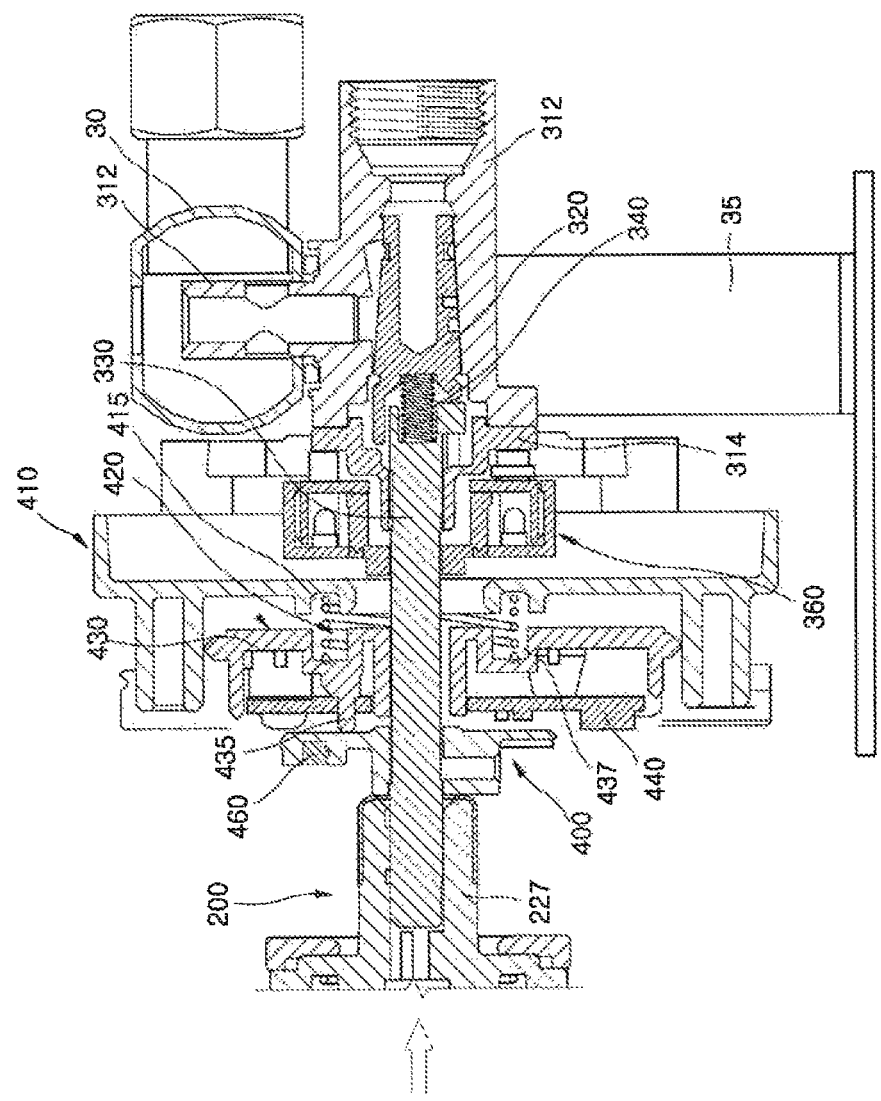

FIG. 48 is an exploded perspective view showing a knob sensor of the knob assembly in accordance with an exemplary implementation of the present disclosure, FIG. 49 is a perspective view showing a state which the knob sensor board of the knob assembly in accordance with an exemplary implementation of the present disclosure is assembled to the knob sensor housing, and FIGS. 50 and 51 are the cross sectional views for explaining the operation of the valve assembly of the knob assembly of the present disclosure.

As shown, the knob sensor 400 includes a sensor plate 410, a sensor spring 420, a knob sensor housing 430, a knob sensor board 440, and a rotating plate 450.

The sensor plate 410 provides a fastening hole 432 to be fastened to the valve cap 314 described above. The sensor plate 410 is fixed to the valve cap 314 and serves to fix the position of the sensor housing 430 and to support the sensor spring 420 that provides the elastic force to the sensor housing 430.

The fastening hole 432 of the sensor plate 410 is fastened to the fastening hole 314d of the valve cap (314 in FIG. 44) using a fastening bolt S7.

The sensor plate 410 provides a valve shaft hole 412 at a central portion. Since the sensor plate 410 should not be affected by the pressing or rotation of the valve shaft 330, the valve shaft through hole 412 has an inner diameter larger than the outer diameter of the valve shaft 330.

A spring fixed portion 415 in which the sensor spring 420 is seated to the outside of the valve shaft through hole 412 is provided. The rear end side of the sensor spring 420 is inserted into the spring fixed portion 415 and the portion is fixed. The sensor spring 420 provides an elastic force in a direction in which the knob sensor housing 430 positioned in front of the sensor plate 410 is spaced apart from the sensor plate 410. It is such that the knob sensor board 440 mounted on the knob sensor housing 430 and the rotating plate 450 arranged in front of the knob sensor board 440 to maintain the predetermined spacing.

Since the sensor plate 410 has a structure in which the elastic force of the sensor spring 420 is repeatedly applied, three or more points are fastened to the valve cap 314 for stable fastening, for instance. In some examples, the sensor plate 410 may maintain a fixed state correctly in a predetermined posture.

In some implementations, the sensor plate 410 provides a plurality of guide protrusions 411 protruded forward. The guide protrusion 411 is inserted into a guide portion 431 provided in the knob sensor housing 430 so that the knob sensor housing 430 can maintain a predetermined posture.

In some examples, three or more guide protrusions 411 are arranged at the circumference of the valve shaft through hole 412. The knob sensor housing 430 can move forward and rearward to the longitudinal direction of the valve shaft 330 while maintaining the state parallel to the sensor plate 410 by the guide protrusion 411.

The knob sensor housing 430 serves to fix the knob sensor board 440 and to maintain the rotating plate 450 and the knob sensor board 440 at a predetermined spacing.

The knob sensor 400 is operated in a principle of sensing the rotational angle of the valve shaft 330 by sensing the position of the knob sensor magnet 460 provided in the rotating plate 450 via the plurality of Hall sensors 444 arranged radially to the knob sensor board 440.

Referring to FIG. 49, seven Hall sensors 444 are arranged on the knob sensor board 440 so as to have a radially equal spacing. The rightmost Hall sensor below the rightmost is referred to as the first, and others are referred to as the second to the seventh Hall sensor.

The knob sensor 400 constitutes an absolute coordinate in such a manner that a signal of a different kind is generated for each Hall sensor 444 and the position of the knob sensor magnet 460 is sensed by using the absolute coordinate configured as such.

For example, regardless of the position immediately before the knob sensor magnet 460, if a finally received signal is a signal generated by the $n^{th}$ Hall sensor, the position of the knob sensor magnet 460 is sensed as a position corresponding to the $n^{th}$ Hall sensor area.

Therefore, even when the operation of the knob is rapidly made, finally, the final position of the knob sensor magnet 460 can be precisely sensed in a state when the rotation of the knob handle is completed, thereby accurately grasping the fire power thus set.

When the knob sensor 400 has a method of using a relative coordinate which is a method that senses a position change from a position immediately before the knob sensor magnet 460, when the knob is rotated at a very high speed, a problem may be generated that the position sensing of the knob sensor magnet 460 may not be made properly.

For example, in order for the position of the knob sensor magnet 460 moved from the position corresponding to the first Hall sensor area to the position corresponding to the seventh Hall sensor area to be accurately recognized, on state change in the second to the seventh Hall sensors has to be made sequentially. When the movement of the knob sensor magnet 460 is made at a rapid speed, on status change in some Hall sensor cannot be made, and in this case, the error can be generated in the positioning of the knob sensor magnet 460. In this case, the error of recognizing the position of the knob sensor magnet 460 as the position corresponding to the area between the second Hall sensor and the sixth Hall sensor, or recognizing that the rotation of the knob is not made.

In some examples, the rotating plate 450 may be fixed to rotate together with the valve shaft 330. In other examples, the knob sensor board 440 may maintain a predetermined posture regardless of the rotation of the valve shaft 330.

In some examples, the valve shaft 330 not only rotates but also moves forward and backward even in the axial direction. The rotating plate 450 fixed to the valve shaft 330 moves along with the movement of the valve shaft 330. Hereinafter, the direction in which the valve shaft 330 is moved to the inner side of the cooking appliance by pushing the knob is referred to as backward, and the opposite direction is referred to as forward.

When the rotating plate 450 is moved backward, the knob sensor housing 430 positioned at the rear of the rotating plate 450 is pushed by the rotating plate 450 and moved to the inside the cooking appliance.

When the valve shaft 330 moves forward due to the restoring force of the valve spring, the rotating plate 450 also moves forward. At this time, since the knob sensor housing 430 is not affected by the movement of the valve shaft 330, it moves forward with the rotating plate 450 by the restoring force of the sensor spring 420 provided between the knob sensor housing 430 and the knob sensor plate 410.

Therefore, the knob sensor housing 430 is also moved forward and backward in response to the forward and backward movement of the rotating plate 450, so that the spacing between the rotating plate 450 and the knob sensor housing 430 is maintained constant. As a result, the spacing between the knob sensor magnet 460 provided on the rotating plate 450 and the Hall sensor 444 provided on the knob sensor board 440 fastened to the knob sensor housing 430 can be maintained constant.

In some examples, the spacing between the knob sensor board 440 and the rotating plate 450 may be set by a plurality of support protrusion 435 provided on the knob sensor housing 430. In some examples, three support protrusions 435 may be arranged with a spacing of 120°. Since three points can define a plane, when forming three support protrusions, the support protrusion 435 may contact the rotating plate 450 to maintain a constant spacing between the rotating plate 450 and the knob sensor housing 430.

The center of the knob sensor board 440 is provided with a valve shaft through hole 442 through which the valve shaft 330 is penetrated, and the periphery thereof is provided with the support protrusion through hole 445 through which the support protrusion 435 provided on the knob sensor housing 430 is penetrated.

The knob sensor board 440 may be coupled to the knob sensor housing 430 through a fastening bolt S8 and a fastening protrusion 434. In the case of the illustrated implementation, the knob sensor board 440 is provided with four fastening holes 443 and the knob sensor housing 430 is provided with two fastening holes 433 and two fastening protrusions 434, and it is the structure which two points are fastened to the fastening bolt S8 and other two points are fixed to the fastening protrusion 434, but the number of the fastening of the fastening bolt S8 can be increased and decreased.

Referring to FIGS. 50 and 51, when the knob is pushed, the joint 200 is moved to the right in the figure, the sensor spring 420 and the valve spring 340 are compressed by the movement of the joint 200, and the valve shaft 330 and the knob sensor housing 430 in which the rotating plate 50 and the knob sensor board 440 are fastened together, and are moved together to the right.

When the pushing force is removed, by the restoring force of the valve spring 340 and the sensor spring 420, the valve shaft 330, the knob sensor housing 430 to which the knob sensor board 440 is fastened, and the rotating plate 450 are restored to the original position.

The knob sensor plate 410 is fastened to the valve cap 314 and the sensor spring 420 provides elastic force in a direction to closely attach the knob sensor housing 430 to the rotating plate 450. Therefore, the rotating plate 450 contacts with the first shaft coupling pipe 227 of the joint 200, and in the knob sensor housing 430, the support protrusion 435 contacts with the rotating plate 450.

A state which the supporting protrusion 435 of the knob sensor housing 430 contacts with the rotating plate 450 is always maintained in a state before the knob is pushed such as FIG. 50, or in a state when the knob is pushed as show in FIG. 51.

Therefore, in spite of the axial movement of the valve shaft, the knob sensor plate 410 and the rotating plate 450 of the knob sensor can always maintain the predetermined spacing, and thus, the spacing between the knob sensor magnet 460 arranged to the rotating plate 450 and the Hall sensor 444 arranged at the knob sensor plate 410 can be maintained constantly. Such structure improves the operation reliability of the knob sensor 400.

Figure 52:
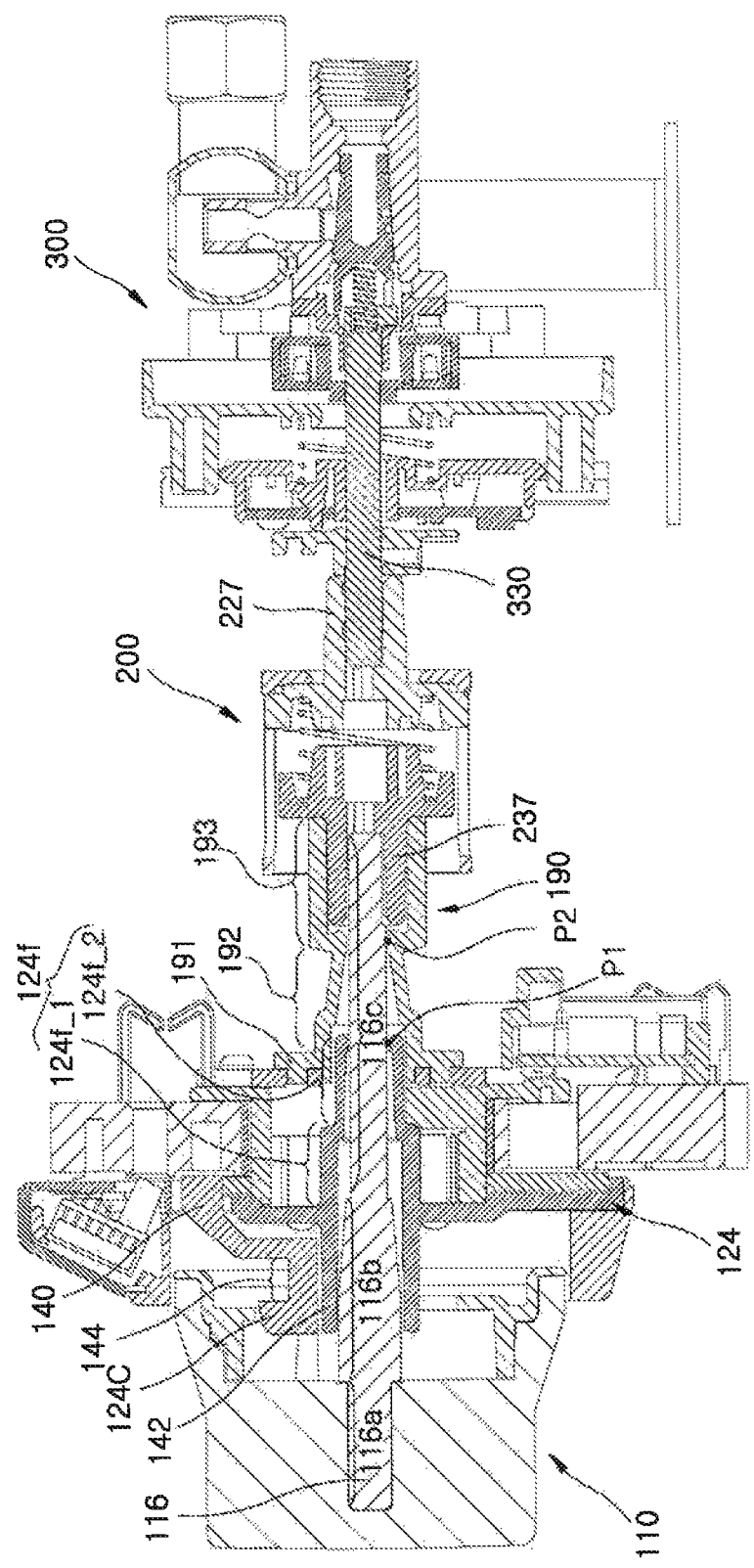
FIG. 52 is a longitudinal sectional view showing an example operation and supporting structure of the knob assembly.

FIG. 52 is a longitudinal sectional view for explaining the operation and supporting structure of the knob of the knob assembly in accordance with an exemplary implementation of the present disclosure.

First, the support structure of the knob 110 will be reviewed. The knob 110 has the structure which penetrates through the inner support pipe 124f and the outer supporting pipe 124c of the knob ring 120, and penetrates through the fixed pipe 190, and fitting coupled to the first shaft coupling portion of the joint 200.

The knob shaft 116 is supported at the first support point P1 on the inner surface of the inner supporting pipe and may be supported at the second supporting point P2 inside the fixed pipe 190. The rotational force of the knob shaft 116 is transmitted to the second shaft coupling portion 230 of the joint 200 to which the end is fastened, and the knob ring 120 and the fixed pipe 190 merely perform the function of supporting the knob shaft 116, and the rotational force of the knob shaft 116 is not received.

In some examples, in order to improve the assembly convenience of the knob shaft 116, the knob shaft 116 includes a large diameter portion 116a starting from a portion to which the knob ring body is coupled, a small diameter portion 116c starting from an end coupled to the joint, and a tapered portion 116b whose outer diameter is reduced therebetween.

A portion of the large diameter portion 116a and the first tube part 192 are received in the outer supporting pipe 124c of the knob ring 120.

The outer supporting pipe 124c of the knob ring back plate 124 is formed to have an inner diameter corresponding to the large diameter portion 116a and the inner supporting pipe 124f of the knob ring back plate 124 is formed with the first portion 124f_1 having the inner diameter corresponding to the large diameter portion 116a and the second portion 124f_2 having the inner diameter corresponding to the small diameter section. Such structure results in an effect of capable of smoothly inserting the knob shaft 116 to the outer supporting pipe 124f.

In addition, a first supporting point P1 is formed on the inner circumferential surface of the second portion 124f_2.

In some implementations, it provides the structure that the small diameter portion 116c of the knob shaft 116 protruded to the inner supporting pipe 124f is again supported at the second supporting point P2 inside the fixed pipe 190 and two points are supported as a whole. The fixed pipe 190 includes a fixed circular plate portion 191 fastened to the fixed frame, the first tube part 192 extending from the fixing circular plate portion and having a shape which the inner diameter is reduced, and the second tube part surrounding the second shaft coupling pipe 237 of the joint 200. In some examples, the second tube part 193 has an incision portion 193a formed in the longitudinal direction of the shaft so that the second shaft coupling pipe 237 can be easily coupled to the second tube part 193.

The knob shaft 116 has the structure fitting coupled to the second shaft coupling pipe 237 of the joint 200 inside the second tube part 193 of the fixed pipe 190, after penetrating through the outer supporting pipe 124c and the inner supporting pipe 124f of the knob ring back plate 124, and at this time, the supporting of the knob shaft 116 are made at a first supporting point P1 arranged inside the inner supporting pipe 124f and the second point P2 arranged inside the fixed pipe 190.

Figure 53:
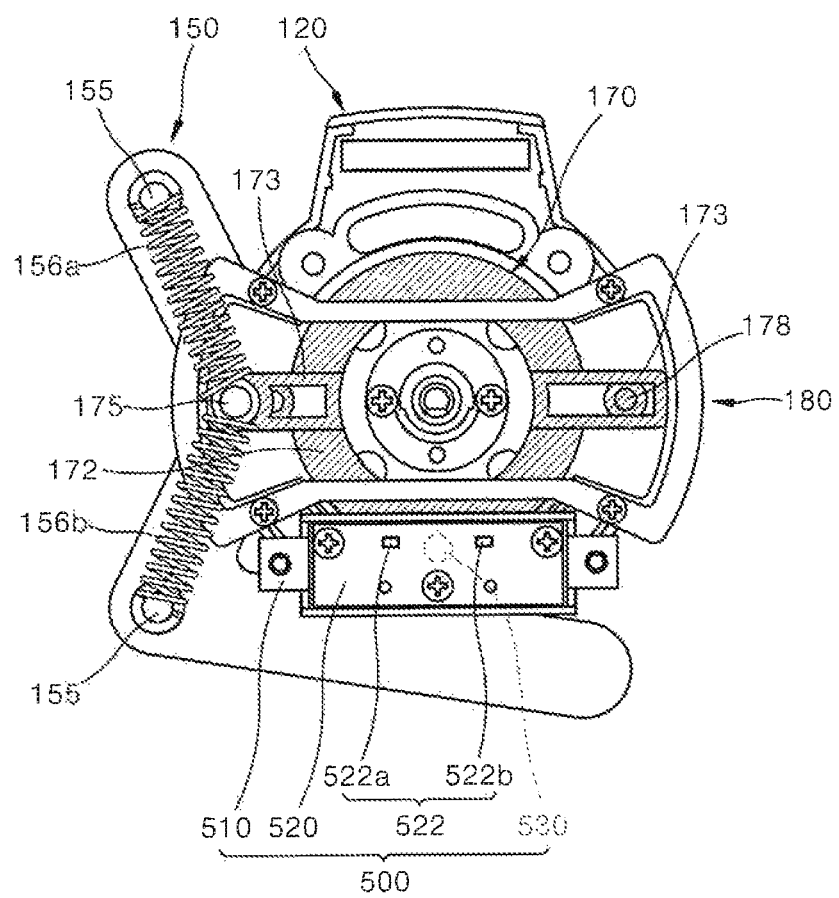
FIG. 53 is a rear view showing the example knob ring.
Figure 54:
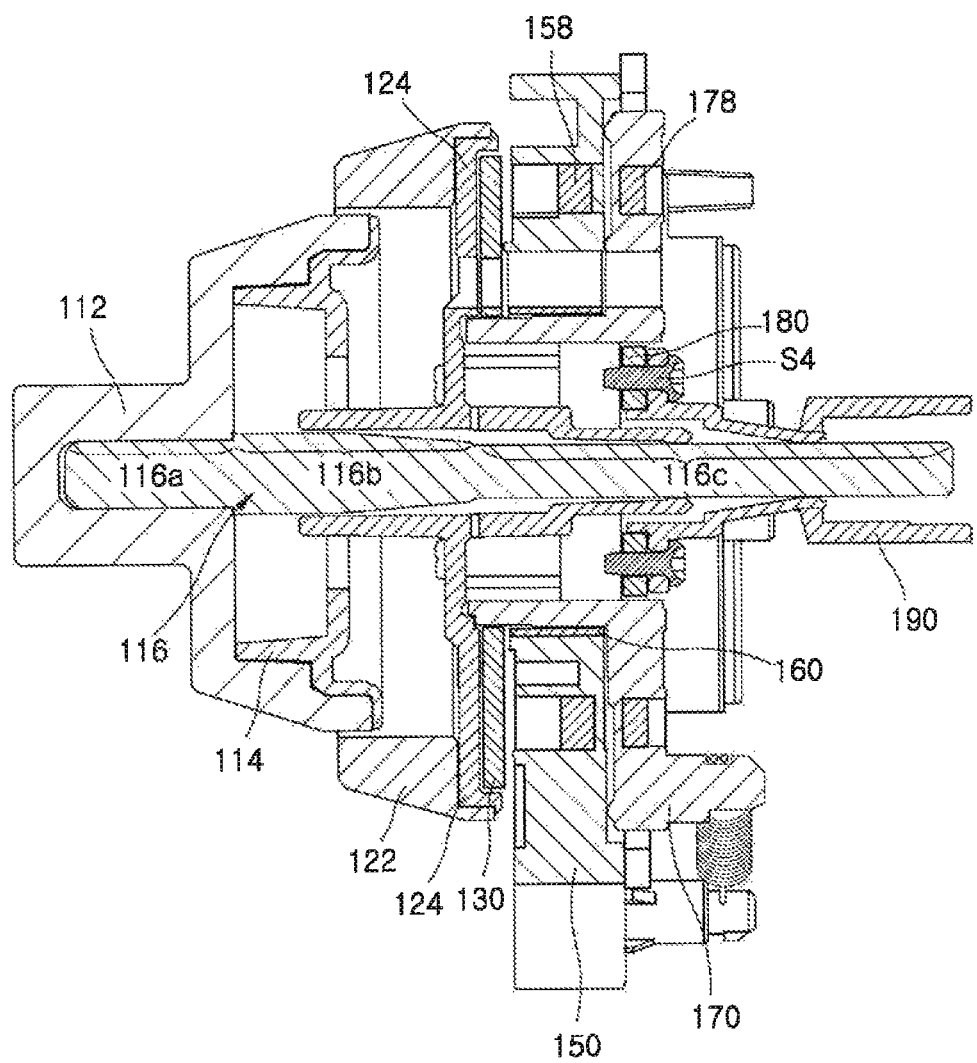
FIG. 54 is a transverse cross-sectional view showing an example coupling state of knob ring of the knob assembly.
Figure 55:
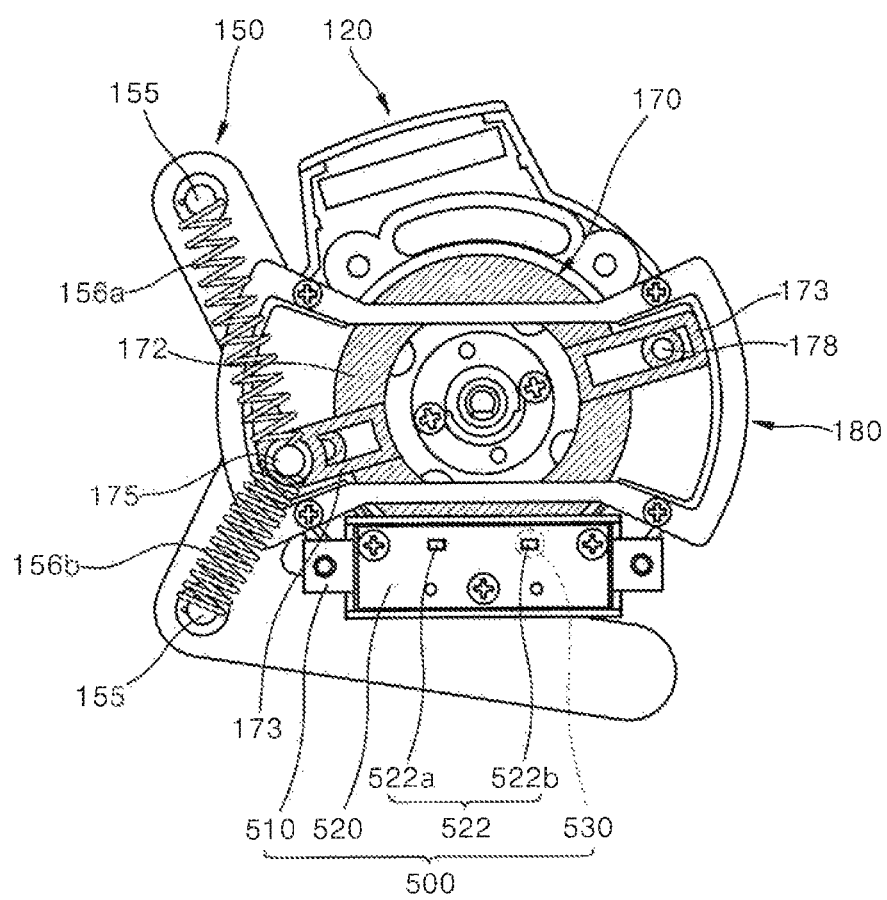
FIGS. 55 and 56 are views showing example operations of the knob ring.
Figure 56:
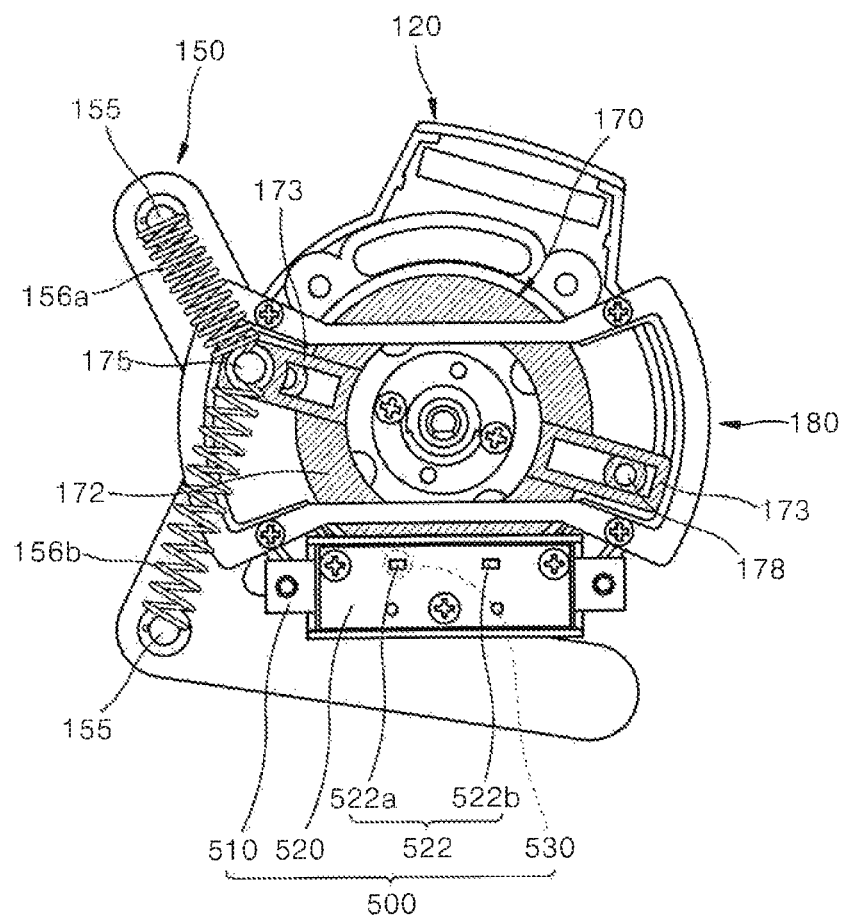

FIG. 53 is a rear view showing a knob ring of the knob assembly in accordance with an exemplary implementation of the present disclosure, FIG. 54 is a transverse cross-sectional view showing the coupling state of the knob ring of the knob assembly in accordance with an exemplary implementation of the present disclosure, and FIGS. 55 and 56 are the views for explaining the operation of the knob ring of the knob assembly in accordance with an exemplary implementation of the present disclosure.

The knob 110 and the knob ring 120 are coupled to the front surface of the front panel 10 and the support frame 150 and the actuating member 170 and the fixed frame 180 are coupled to the rear surface of the front panel 10.

The support frame 150 is fastened to the rear surface of the front panel 10 and the actuating member 170 penetrates through the front panel 10 and is fastened to the knob ring 120. At this time, the rotation center of the actuating member 170 is arranged to coincide with the rotation center of the knob 110. The actuating member 170 serves to constrain the rotation center of the knob 110 to be at a center position with regard to the front panel 10. For example, when the actuating member 170 is fixed in the center position about the front panel 10, the knob 110 can be fixed in the correct position with regard to the front panel 10.

The actuating member 170 is inserted inside the support frame 150 and some are protruded to the front surface of the front panel 10 through the front panel 10. The front of the actuating member 170 is protruded to the front surface of the front panel which the operating portion 171 having the cylindrical shape is formed and the operating portion 171 is formed longer than the thickness of the support frame 150.

The inner circular plate area 124j of the knob ring back plate 124 is coupled with the operating portion 171 of the actuating member 170 protruded to the front surface of the front panel 10. The knob ring 120 is coupled to the actuating member 170 supported by the support frame 150, and, consequently, the supporting structure in which the knob ring 120 is supported by the support frame 150 is formed.

The operation of the knob ring 120 can be recognized by the rotation of the actuating member 170 rotated connected with the rotation of the knob ring 120. Since the knob ring 120 is the part exposed to the outside the front panel 10, a knob ring sensor 500 for sensing the operation of the knob ring 120 being installed around the knob ring 120 from the outside of the front panel 10 is externally not good.

In view of the above, in the present implementation, the knob ring sensor 500 is installed around the actuating member 170 inside the front panel 10, and the knob ring sensor 500 installed as such can sense the rotation of the knob ring 120 in a manner of sensing the rotation of the actuating member 170 inside the front panel 10.

In some examples, the knob assembly structure of the present implementation is provided with a fixed frame 180 for preventing the actuating member 170 from being deviate to the rear surface so that the actuating member 170 can stably operate.

The fixed frame 180 is provided as the form across the rear surface of the actuating member 170 and is fixed to the support frame 150. The fixed frame 180 makes the actuating member 170 not be deviated to the rear surface while limiting the rotation range of the actuating member 170 within the designated range. And the extended portion 173 of the actuating member 170 can be moved only within the pivotable region 182 of the fixed frame 180.

According to the present implementation, the actuating member 170 has an extended portion 173 formed to be extended outwardly the circular plate portion 172 formed on the rear surface, and the extended portion 173 is formed inside the fixed frame 180.

As such, the extended portion 173 arranged inside the fixed frame 180 can move within a movable region within the fixed frame 180, and, from the point interfered with the upper side inner wall and the lower side inner wall of the fixed frame 180, the movement thereof is limited.

As such, when the movement range of the extended portion 173 is limited by the fixed frame 180, the rotation angle in both directions of the actuating member 170 can be limited within the predetermined range.

By applying the structure in which the extended portion 173 is provided on both sides of the actuating member 170 and the movement range limitation of each extended portion 173 is made at the same position, the rotational range limit of the actuating member 170 can be made more stably.

In addition, the actuating member 170 is coupled to a pair of restoring springs 156a, 156b that provide an elastic force to return the actuating member 170 to the initial position, which is rotated from its initial position to spaced position.

The actuating member 170 and the knob ring 120 are integrally rotated so that the knob ring 120 maintains the initial position due to the elastic force of the restoring spring 156 connected to the actuating member 170. Further, the knob ring 120 maintaining the initial position as the above can rotate clockwise or counterclockwise at a predetermined angle. When the external force is released in the rotated state, it can be returned to the initial position by the restoring force which the restoring spring 156a, 156b provides.

For example, when the actuating member 170 is rotated in the counterclockwise by the operation of the knob ring 120, as shown in FIG. 54, the first restoring spring 156a of the pair of restoring springs provides the elastic force working clockwise so that the actuating member 170 can be returned to its initial position. Further, the second restoring spring 156b, which is the other one of the pair of restoring springs 156 provides the elastic force working counterclockwise such that the actuating member 170 is returned to the initial position, when the actuating member 170 is rotated clockwise by the operation of the knob ring 120, as shown in FIG. 10.

In some examples, referring to FIG. 54, the restoring magnet 158, 178 is provided at the corresponding portion to each other of the support frame 150 and the circular plate portion 172 of the actuating member 170, respectively. The restoring magnet 158 is arranged such that the restoring magnet 178 provided in the actuating member 170 and the restoring magnet 158 provided in the support frame 150 are aligned when the actuating member 170 is in the origin. The restoring magnet 158, 178 is arranged such that a different polarity from each other is arranged in order to work an attraction mutually.

The restoring magnet 158 provided in the support frame 150 is fitted coupled from the left side to the right side in the drawing and is fitted and coupled from the right side to the left side in the drawing of the restoring magnet 178 provided on the actuating member 170. This is for the attraction working between the restoring magnets 158, 178 to work in the direction in which the restoring magnet 158, 178 is inserted into the groove. Such structure results in an effect of preventing the restoring magnet 158, 178, which is tilted by fitting the restoring magnet 158, 178, from deviating without using separate adhesive.

The knob ring sensor magnet 530 is provided to change the position by being connected with the rotation of the actuating member 170 and the knob ring sensor 500 senses a position change of the knob ring sensor magnet 530, thereby sensing the rotation of the knob ring 120, and, senses the rotation of the knob ring 120 connected to the actuating member 170.

The knob ring sensor magnet 530 is the configuration which is the sensing subject of the knob ring sensor 500 and installed on the actuating member 170. In the present implementation, it is exemplified as for the knob ring sensor magnet 530 to be installed at the circular plate portion 172 of the actuating member 170. In FIGS. 55, 56, the knob ring sensor magnet 530 is covered at the rear side of the knob ring sensor board 520, and the knob ring sensor magnet 530 is shown in a dotted line in the above Figures.

The knob ring sensor magnet 530 is installed on the circular plate portion 172 and installed so as to be arranged on one side of the circular plate portion 172 facing the knob ring sensor 500. The position of the knob ring sensor magnet 530 installed as such can be changed in a form that it is rotated together with the actuating member 170 when rotating the actuating member 170.

In the present implementation, it is exemplified that the knob ring sensor magnet 530 is arranged at a position adjacent to the outer circumferential surface of the circular plate portion 172. The position of the knob ring sensor magnet 530 arranged at such a position can be changed by drawing a trajectory similar to the shape of the outer circumferential surface of the circular plate portion 172 which is circular shape when rotating the actuating member 170.

The knob ring sensor 500 is provided to sense a position change of the knob ring sensor magnet 530 and is fastened to the support frame 150 at the rear surface of the actuating member 170.

As an example, the knob ring sensor 500 may include a knob ring sensor housing 510, a knob ring sensor board 520, and Hall sensor 522a, 522b.

The knob ring sensor housing 510 is installed to be fixed to the support frame 150 or, for example, to the lower side of the frame main body portion 141. The knob ring sensor housing 510 is installed with the knob ring sensor board 520 connected to the controller of the cooking appliance.

In the present implementation, the knob ring sensor board 520 is installed on the knob ring sensor housing 510 and is illustrated as being installed on the side facing the frame main body portion 141 and the knob ring sensor magnet 530. Further, a sensor for sensing the position change of the knob ring sensor magnet 530 is installed on the knob ring sensor board 520.

The knob ring sensor 500 having the above-described configuration senses the position of the knob ring sensor magnet 530 in a non-contact manner, like the knob sensor 400. For this, the knob ring sensor magnet 530 includes a magnetic member of generating a magnetic force, and the knob ring sensor 500 includes a Hall sensor 522 of sensing the magnetic force of the magnetic member adjacent with a predetermined distance. The Hall sensor 522 is installed on the knob ring sensor board 520. When the knob ring sensor magnet 530 approaches the Hall sensor 522 within a predetermined distance, it senses the magnetic force of the knob ring sensor magnet 530, and generates a signal corresponding thereto.

The knob ring sensor 500 includes a plurality of Hall sensors 522 and the plurality of Hall sensors 522 are arranged to be spaced apart at a predetermined spacing along the rotation path of the knob ring sensor magnet 530.

That is, when rotating the actuating member 170, when the knob ring sensor magnet 530 is rotated in the circular trajectory similar to the shape of the outer circumferential surface of the circular plate portion 172, the knob ring sensor 500 is arranged in a form which the plurality of Hall sensors 522 are positioned on the arc corresponding to the rotation trajectory of the knob ring sensor magnet 530.

In the present implementation, it is exemplified that a pair of Hall sensors 522a and 522b are arranged on the knob ring sensor 500, and the arrangement of the Hall sensor 522a, 522b and the knob ring sensor magnet 530 is made in a form positioning between the pair of the Hall sensors 522 when the knob ring 120 and the actuating member 170 are in the initial position.

According to it, at the time of one direction rotation of the knob ring 120, the knob ring sensor magnet 530 approaches to any one (hereinafter referred to as "left side Hall sensor") of the pair of Hall sensors 522, and the sensing about the knob ring sensor magnet 530 in the corresponding Hall sensor 522a is made, and at the time of the other direction of the knob ring 120, the knob ring sensor magnet 530 approaches to the other one (hereinafter referred to as "the right side Hall sensor") of the pair of Hall sensors 522, and the sensing about the knob ring sensor magnet 530 in the corresponding Hall sensor 522b is made.

When the knob ring 120 is provided to provide a timer function, and the knob ring 120 is rotated in one direction, the knob ring sensor magnet 530 approaches within the predetermined distance to the left Hall sensor 522a, the sensing with regard to the knob ring sensor magnet 530 in the left Hall sensor 522a is made, and accordingly, the operation of the knob ring 120 for the time operation initiation is sensed by the knob ring sensor 500 such that the operation of the timer can be proceeded.

In addition, the knob ring is rotated to the other direction, the knob ring sensor magnet 530 approaches within the predetermined distance to the right Hall sensor 522b and the sensing with regard to the knob ring sensor magnet 530 in the right Hall sensor 522b is made, and accordingly, the operation of the knob ring 120 for the time operation initiation is sensed such that the operation of the timer can be proceeded.

In the present implementation, it is exemplified as generating a different kind of signal for each Hall sensor 522. That is, the signal generated by the left Hall sensor 522a is different from the signal generated by the right Hall sensor 522b.

By using this, the function of the knob ring 120 may be configured such that the set time of the timer is set differently according to the rotation direction of the knob ring 120 and the function of the knob ring 120 may be configured such that each different function is provided according to the rotation direction of the knob ring 120.

As an example, the function of the knob ring 120 may be configured such that the set time of the timer is set in a 10 minutes unit at the time of one direction rotation, and the set time of the timer is set in 1 minute unit at the time of the other direction rotation.

In addition, when maintaining the state rotated in one direction for a predetermined time or more, the set time can be continuously increased. For example, when the knob ring 120 is rotated to the right, the timer set time is increased by 10 minutes unit, and the knob ring 120 is rotated to the left and then immediately returned (hereinafter, referred to as a click), in the case of increasing by the timer set time by 1 minute unit, when the state rotated to the right is maintained for a predetermined time (for example, 3 seconds) or more (hereinafter referred to as long pushing), the timer set time is continuously increased in 10 minutes unit.

In other words, the timer set time of one unit can be increased by a short click, and the continuous increase of the timer set time can be made through a long push.

Since this click and long push all can be applied to the left and right direction of both sides, four signals can be set using two Hall sensors.

In some cases, two of four signals may be used as a signal for the timer time setting, and the remaining two signals may be used as a signal for setting other function such as selecting a cooking mode.

As another example, the function of the knob ring 120 may be configured such that a timer is set at the time of one way rotation of the knob ring 120 and the release of the timer set is released at the time of the other direction rotation of the knob ring 120.

As still another example, the function of the knob ring 120 may be configured such that the timer function is provided at the time of one direction rotation of the knob ring 120 and other function is provided other than the timer function at the time of the other direction timer function.

In some examples, the signal generated through the Hall sensor 522 may be provided as basic information for grasping information output through the display device 125.

For example, by using a signal generated from the left Hall sensor as basic information, information such as whether to initiate the timer operation, the timer time, etc., can be grasped, and information thus grasped can be displayed in a form of letters, graphics, or colors through the display device 125.

Figure 58:
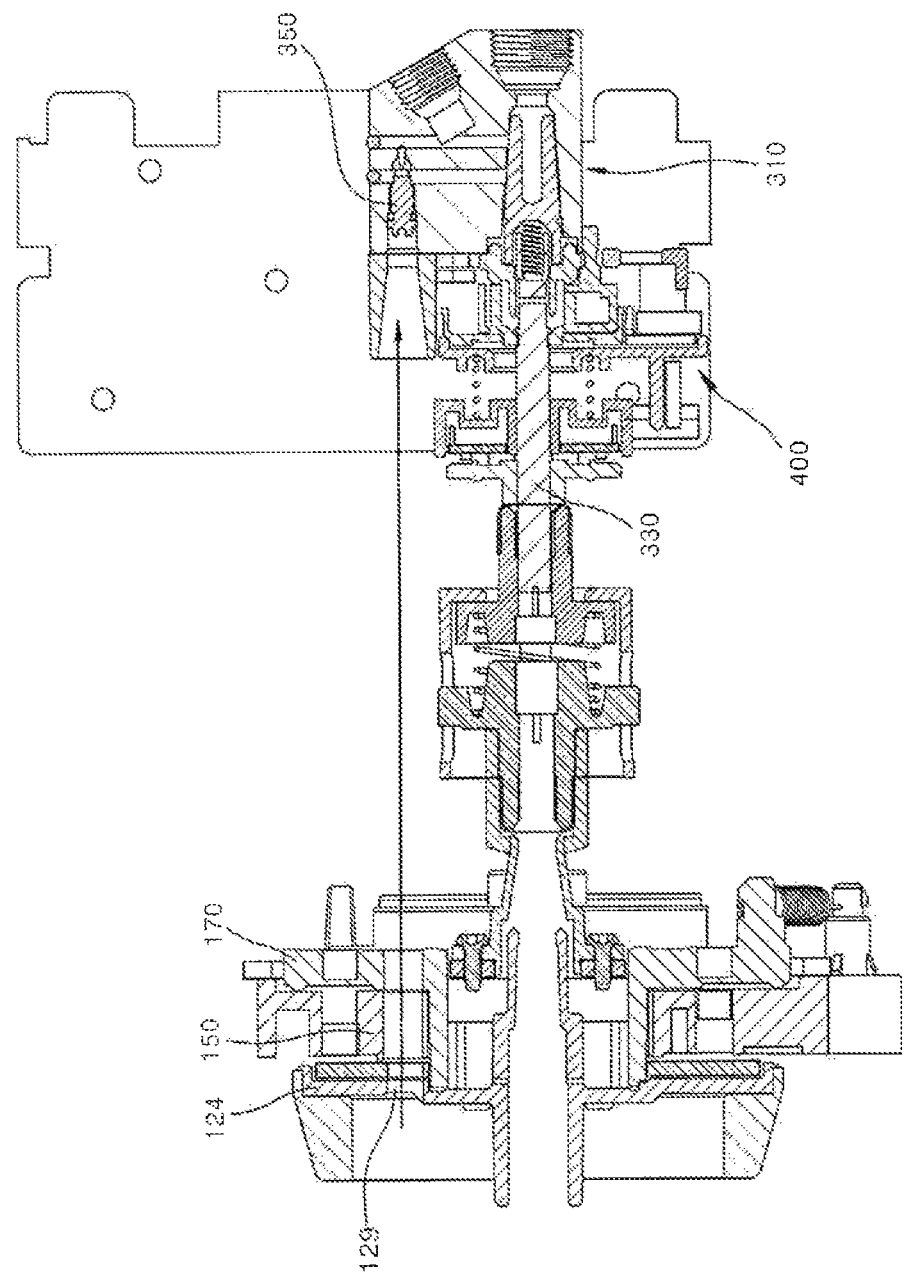
FIG. 58 is a transverse cross-sectional view showing an example state in which an example knob is separated from the knob assembly.

FIG. 57 is a perspective view showing a state in which the knob of the knob assembly in accordance with an exemplary implementation of the present disclosure is separated, and FIG. 58 is a transverse cross-sectional view in a state which the knob of the knob assembly in accordance with an exemplary implementation of the present disclosure with the knob is separated.

The knob assembly according to the present disclosure can be separated by pulling the knob. When the knob is separated, the knob ring back plate 124, which was covered by the knob, is exposed to the outside.

Referring to FIG. 57, it can be seen that the locking bracket 140 passes through the bracket hole 124b of the knob ring back plate 124 and is fastened to the front panel 10. At this time, a knob passage groove 144 is formed in the rear of the locking piece 142 of the locking bracket 140.

In a state which the knob is not pushed, the engaging surface (114d in FIG. 9) of the knob back plate is adjacent to the right side of the locking piece 142 of the locking bracket 140. When the knob is pushed, the engagement surface (144d in FIG. 9) is adjacent to the right side of the knob passage groove 144 of the locking bracket 140. Therefore, the knob can be rotated only when the knob is pushed.

A service hole 129 is provided on the left of the knob ring back plate 124. The service hole 129 is formed in a position aligned with the auxiliary adjustment piece 350 of the valve 310 in a straight line.

A tool such as the driver can be entered through the service hole 129 to adjust the auxiliary adjustment piece 350 of the valve 310.

The service hole 129 is formed to penetrate through the knob ring back plate 124, the front panel 10, the support frame 150, and the actuating member 170, as shown in FIG. 58.

Such structure results in an effect of improving the convenience of maintenance by separating only the knob without separating the front panel 10 and adjusting the auxiliary adjustment piece 350 of the valve 310.

In some examples, the spacing between the valve shaft 330 and the service hole 129 has to be set in consideration of the size of the joint 200 and the knob sensor 400. When the radius of the joint 200 is larger than the spacing between the valve shaft 330 and the service hole 129, the joint interferes on the path of the service hole 129.

Likewise, when the radius of the knob sensor 400 is larger than the spacing between the valve shaft 330 and the service hole 129, the knob sensor 400 interferes on the path of the service hole 129. Of course, the service hole 129 may also be penetrated also in the knob sensor 400.

An adjustment of the auxiliary adjustment piece 350 using the service hole 129 may not be generally made, but may be sometimes necessary in the case of manual adjustment by a user. In some cases, the front panel 10 may be disassembled to operate the auxiliary adjustment piece 350, which may be difficult to be performed by the user and may need to be performed by a service engineer. In some examples, when the knob may be separated, as described in the present disclosure, to operate the auxiliary adjustment piece 350, a user may perform an adjustment of the auxiliary adjustment piece 350.

While the present disclosure has been described with reference to the implementations shown in the drawings, it will be understood that it is merely illustrative and many variations and equivalent other implementation are possible from the above for those skilled in the art. Therefore, the true technical protection range of the present disclosure should be defined by claims below.

What is claimed is:

1. A knob assembly for an appliance, the knob assembly comprising:
a support frame that is configured to be fastened at a rear side of a front panel of the appliance;
an actuating member coupled rotatably to the support frame at the rear side of the front panel;
a knob ring that comprises:
a knob ring back plate configured to be arranged at a front side of the front panel of the appliance and that is coupled to the actuating member through a front panel through-hole in the front panel and through a support frame through-hole in the support frame, and to rotate the actuating member according to a rotation of the knob ring;
a knob ring body that forms an outer appearance of the knob ring at the front side of the front panel, and that provides a handling portion that protrudes in a radial direction from the knob ring body, and that is configured to be rotatably operated by a user;
a knob ring sensor that is configured to sense a rotation operation of the knob ring body; and
a display device which is arranged at the handling portion that protrudes from the knob ring body and that is configured to display information based on a sensing of the rotation operation of the knob ring body by the knob ring sensor;
a knob which is configured to be arranged at the front side of the front panel, and arranged annularly within at least part of the knob ring and configured to be rotatably operated by the user independently of the knob ring.

2. The knob assembly according to claim 1, further comprising a display housing that at least partially covers a front of the display device and provides insulation between the knob ring body and the display device.

3. The knob assembly according to claim 2, wherein the display device comprises a display module and a display board to which the display module is mounted, and
wherein the knob assembly further comprises a fastening that is fastened in the knob ring back plate and penetrates through the display board to fasten to the display housing.

4. The knob assembly according to claim 2, wherein one of the display housing or the knob ring has a groove and the other of the display housing or the knob ring has a protrusion that fits into the groove in a state in which the display housing and the knob ring are aligned.

5. The knob assembly according to claim 1, wherein the handling portion of the knob ring body comprises a pair of protrusions that protrude in the radial direction from the knob ring body and that receive the display device therebetween.

6. The knob assembly according to claim 5, further comprising a display cover that covers a front surface and an upper surface of the display device in a state in which the display device is fixed between the protrusions.

7. A cooking appliance, comprising:
a front panel that defines a surface of the cooking appliance;
a support frame fastened at a rear side of the front panel;
an actuating member coupled rotatably to the support frame at the rear side of the front panel;
a knob ring that comprises:
a knob ring back plate that is arranged at a front side of the front panel and that is coupled to the actuating member through a front panel through-hole in the front panel and through a support frame through-hole in the support frame, and that is configured to rotate the actuating member according to a rotation of the knob ring;
a knob ring body that forms an outer appearance of the knob ring at the front side of the front panel, and that is configured to be rotatably operated by a user;
a knob ring sensor that is configured to sense a rotation of the knob ring body;
a display device which is arranged at an upper central region of the knob ring body, and that rotates integrally with the rotation of the knob ring body, and that is configured to display information based on a sensing of the rotation of the knob ring body by the knob ring sensor;
a valve which is fixed inside the cooking appliance and that controls, via a valve shaft, a flow of gas supplied to a burner of the cooking appliance;
a knob that protrudes in a forward direction from the knob ring and is configured to be rotatably operated by the user independently from the knob ring, and that rotates a knob shaft that is connected to the valve shaft.

8. The cooking appliance according to claim 7, further comprising a display housing that couples to and at least partially covers the display device,
wherein the display housing is fastened to the knob ring back plate,
wherein the knob ring back plate is fastened to the knob ring body and the display device is coupled to the knob ring body.

9. The cooking appliance according to claim 7, wherein the display device comprises a display part that is configured to display the information, and wherein the display device is arranged with the display part facing in a forward direction at a partial incline in an upward direction.

10. The cooking appliance according to claim 7, further comprising a display cover which is coupled to the knob ring body and that forms an outer appearance of the knob ring body.

11. The cooking appliance according to claim 10, wherein the display cover comprises a thin walled portion having a thickness that is thinner than a portion of the display cover around the thin walled portion, wherein in a state in which the display cover and the display device are coupled to the knob ring body, the thin walled portion is arranged at a location corresponding to a display area of the display device.

12. The cooking appliance according to claim 7, wherein the knob ring back plate defines a wiring hole through which a wiring of the display device passes, and the wiring hole has an arc shape corresponding to a range of rotation of the wiring as the display device rotates with the knob ring.

13. A knob assembly for an appliance, the knob assembly comprising:
a knob that is configured to be arranged at a front side of a front panel of the appliance, and to rotate based on a first operation by a user;
a knob shaft that is coupled to the knob to rotate according to rotation of the knob, and that extends through a through-hole that is formed through the front panel; and
a knob ring that is configured to be arranged at the front side of the front panel of the appliance with at least a portion of the knob ring arranged annularly around the knob, and the knob ring configured to, based on a second operation by the user, rotate independently of the rotation of the knob, the knob ring comprising:

a knob ring body that forms an outer appearance of the knob ring and that comprises a handling portion protruding in a radial direction from the knob ring body; and a knob ring sensor that is configured to sense a rotation of the knob ring; and a display device that is arranged in the handling portion of the knob ring body and that is configured to display information based on a sensing of the rotation operation of the knob ring body by the knob ring sensor.

14. The knob assembly of claim 13, further comprising:
an actuating member that is configured to be arranged at a rear side of the front panel and that is coupled to the knob ring through the front panel to rotate integrally with, and to transmit a rotating operation of, the knob ring to the rear side of the front panel, the actuating member further configured to limit an operating range of rotation of the knob ring.

15. The knob assembly of claim 14, further comprising:
a knob ring back plate configured to be arranged at the front side of the front panel of the appliance and that is coupled to the actuating member through a front panel through-hole provided in the front panel and to rotate the actuating member according to a rotation of the knob ring.

16. The knob assembly of claim 15, wherein the knob ring body is fastened to the knob ring back plate, and
wherein the display device is fastened to at least one of the knob ring back plate or the knob ring body.

17. The knob assembly of claim 13, wherein the handling portion of the knob ring body comprises a pair of protrusions that protrude in the radial direction from the knob ring body and that receive the display device therebetween.

18. The knob assembly of claim 13, wherein the display device comprises a display part that is configured to display the information and that is arranged to face in a forward direction at a partial incline in an upward direction.

19. The knob assembly of claim 13, wherein the knob ring comprises a supporting pipe through which the knob shaft extends through the knob ring and through the through-hole of the front panel.

20. The knob assembly of claim 13, further comprising a display housing that at least partially covers a front of the display device and provides insulation between the knob ring body and the display device.

* * * * *